US008041371B1

(12) United States Patent  
Fujisaki

(10) Patent No.: US 8,041,371 B1
(45) Date of Patent: *Oct. 18, 2011

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 12/854,892

(22) Filed: Aug. 12, 2010

Related U.S. Application Data

(63) Continuation of application No. 11/688,913, filed on Mar. 21, 2007, now Pat. No. 7,856,248, which is a continuation of application No. 10/710,600, filed on Jul. 23, 2004.

(60) Provisional application No. 60/481,426, filed on Sep. 26, 2003.

(51) Int. Cl.
H04M 1/00 (2006.01)

(52) U.S. Cl. .......... 455/456.1; 455/414.1; 455/555; 455/566; 455/466

(58) Field of Classification Search .......... 455/556.1, 455/550.1, 414.1, 566, 466
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,446,904 A | 8/1995 | Belt et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,559,554 A | 9/1996 | Uekane et al. | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,758,280 A | 5/1998 | Kimura | |
| 5,772,586 A | 6/1998 | Heinonen et al. | |
| 5,778,304 A | 7/1998 | Grube et al. | |
| 5,802,460 A | 9/1998 | Parvulescu et al. | |
| 5,805,672 A | 9/1998 | Barkat et al. | |
| 5,812,930 A | 9/1998 | Zavrel | |
| 5,844,824 A | 12/1998 | Newman et al. | |
| 5,902,349 A | 5/1999 | Endo et al. | |
| 5,916,024 A | 6/1999 | Von Kohorn | |
| 5,918,180 A | 6/1999 | Dimino | |
| 5,959,661 A | 9/1999 | Isono | |
| 6,009,336 A | 12/1999 | Harris et al. | |
| 6,011,973 A | 1/2000 | Valentine et al. | |
| 6,043,752 A | 3/2000 | Hisada et al. | |
| 6,081,265 A | 6/2000 | Nakayama et al. | |
| 6,115,597 A | 9/2000 | Kroll et al. | |
| 6,128,594 A | 10/2000 | Gulli et al. | |
| 6,144,848 A | 11/2000 | Walsh et al. | |
| 6,148,212 A | 11/2000 | Park et al. | |
| 6,198,942 B1 | 3/2001 | Hayashi et al. | |

(Continued)

*Primary Examiner* — David Q Nguyen

(57) ABSTRACT

The communication device which includes a voice communicating means, an automobile controlling means, a caller ID means, a call blocking means, an auto time adjusting means, a calculating means, a word processing means, a startup software means, a stereo audio data output means, a digital camera means, a multiple language displaying means, a caller's information displaying means, a communication device remote controlling means, a shortcut icon displaying means, a voice recognition means, and a voice tag means.

3 Claims, 1 Drawing Sheet

U.S. PATENT DOCUMENTS

Figure 1:
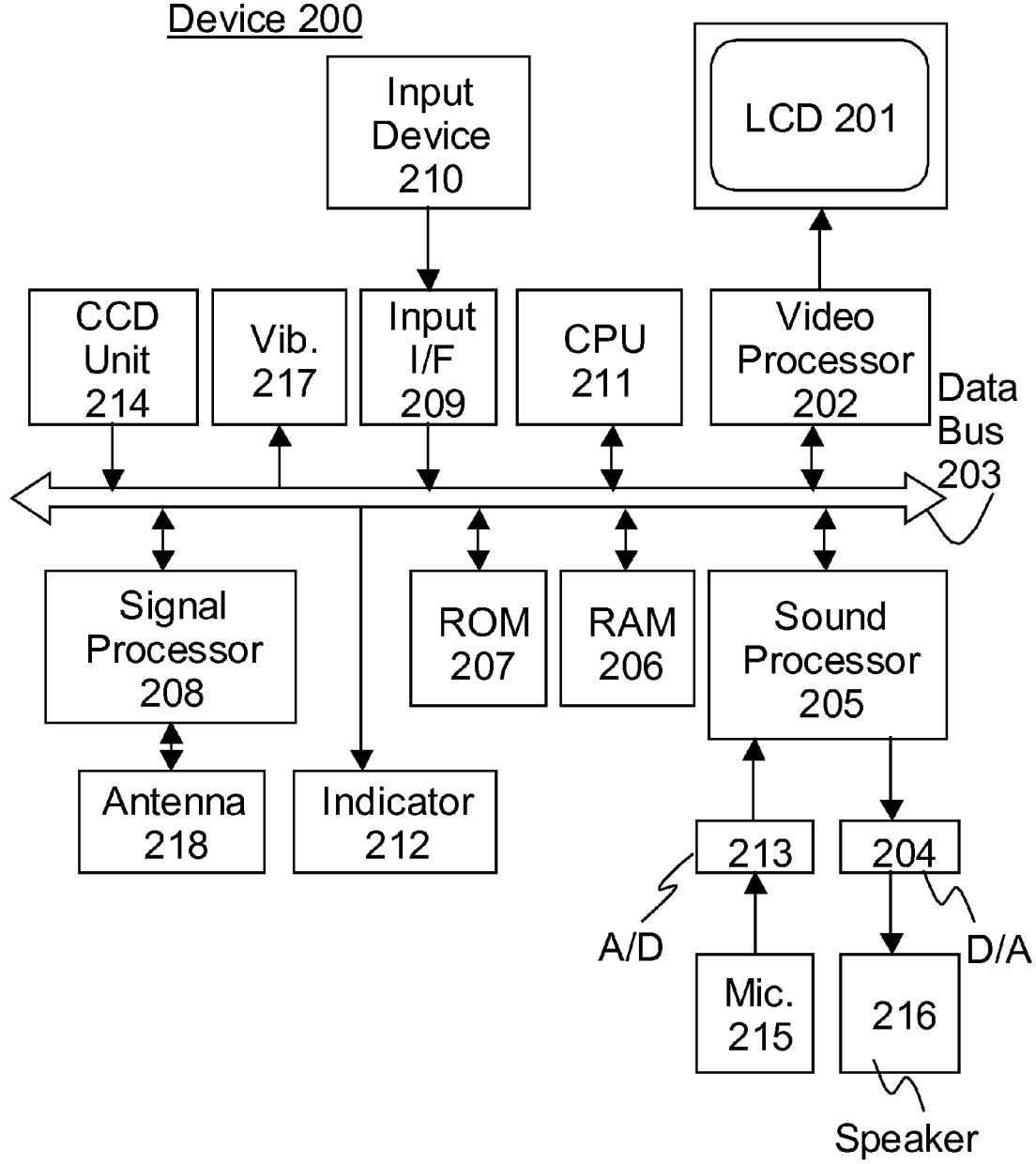

| | | |
|---|---|---|
| 6,202,060 B1 | 3/2001 | Tran |
| 6,216,013 B1 | 4/2001 | Moore et al. |
| 6,216,158 B1 | 4/2001 | Luo et al. |
| 6,223,029 B1 | 4/2001 | Stenman et al. |
| 6,225,944 B1 | 5/2001 | Hayes |
| 6,236,832 B1 | 5/2001 | Ito |
| 6,243,039 B1 | 6/2001 | Elliot |
| 6,249,720 B1 | 6/2001 | Kubota et al. |
| 6,253,075 B1 | 6/2001 | Beghtol et al. |
| 6,265,988 B1 | 7/2001 | LeMense et al. |
| 6,285,317 B1 | 9/2001 | Ong |
| 6,292,666 B1 | 9/2001 | Siddiqui et al. |
| 6,292,747 B1 | 9/2001 | Amro et al. |
| 6,311,077 B1 | 10/2001 | Bien |
| 6,332,122 B1 | 12/2001 | Ortega et al. |
| 6,333,684 B1 | 12/2001 | Kang |
| 6,366,651 B1 | 4/2002 | Griffith et al. |
| 6,366,782 B1 | 4/2002 | Fumarolo et al. |
| 6,374,221 B1 | 4/2002 | Haimi-Cohen |
| 6,385,466 B1 | 5/2002 | Hirai et al. |
| 6,385,541 B1 | 5/2002 | Blumberg et al. |
| 6,405,033 B1 | 6/2002 | Kennedy, III et al. |
| 6,411,198 B1 | 6/2002 | Hirai et al. |
| 6,411,822 B1 | 6/2002 | Kraft |
| 6,415,138 B2 | 7/2002 | Sirola et al. |
| 6,421,470 B1 | 7/2002 | Nozaki et al. |
| 6,421,602 B1 | 7/2002 | Bullock et al. |
| 6,430,498 B1 | 8/2002 | Maruyama et al. |
| 6,442,404 B1 | 8/2002 | Sakajiri |
| 6,445,802 B1 | 9/2002 | Dan |
| 6,477,387 B1 | 11/2002 | Jackson et al. |
| 6,486,867 B1 | 11/2002 | Kopp et al. |
| 6,487,422 B1 | 11/2002 | Lee |
| 6,512,919 B2 | 1/2003 | Ogasawara |
| 6,519,566 B1 | 2/2003 | Boyer et al. |
| 6,526,293 B1 | 2/2003 | Matsuo |
| 6,529,742 B1 | 3/2003 | Yang |
| 6,532,035 B1 | 3/2003 | Saari et al. |
| 6,538,558 B2 | 3/2003 | Sakazume et al. |
| 6,542,750 B2 | 4/2003 | Hendrey et al. |
| 6,542,814 B2 | 4/2003 | Polidi et al. |
| 6,553,310 B1 | 4/2003 | Lopke |
| 6,567,745 B2 | 5/2003 | Fuchs et al. |
| 6,567,984 B1 | 5/2003 | Allport |
| 6,600,975 B2 | 7/2003 | Moriguchi et al. |
| 6,606,504 B1 | 8/2003 | Mooney et al. |
| 6,611,753 B1 | 8/2003 | Millington |
| 6,615,186 B1 | 9/2003 | Kolls |
| 6,618,704 B2 | 9/2003 | Kanevsky et al. |
| 6,622,018 B1 | 9/2003 | Erekson |
| 6,631,271 B1 | 10/2003 | Logan |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,681,120 B1 | 1/2004 | Kim |
| 6,690,932 B1 | 2/2004 | Barnier et al. |
| 6,701,148 B1 | 3/2004 | Wilson et al. |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,531 B1 | 4/2004 | Lee et al. |
| 6,738,643 B1 | 5/2004 | Harris |
| 6,738,711 B2 | 5/2004 | Ohmura et al. |
| 6,763,226 B1 | 7/2004 | McZeal, Jr. |
| 6,772,174 B1 | 8/2004 | Pettersson |
| 6,779,030 B1 | 8/2004 | Dugan et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,819,939 B2 | 11/2004 | Masamura |
| 6,820,055 B2 | 11/2004 | Saindon et al. |
| 6,836,654 B2 | 12/2004 | Decotignie |
| 6,865,372 B2 | 3/2005 | Mauney et al. |
| 6,883,000 B1 | 4/2005 | Gropper |
| 6,891,525 B2 | 5/2005 | Ogoro |
| 6,895,084 B1 | 5/2005 | Saylor et al. |
| 6,895,256 B2 | 5/2005 | Harma et al. |
| 6,895,259 B1 | 5/2005 | Blank nee Keller et al. |
| 6,898,321 B1 | 5/2005 | Knee et al. |
| 6,898,765 B2 | 5/2005 | Matthews, III et al. |
| 6,901,383 B1 | 5/2005 | Ricketts et al. |
| 6,904,298 B2 | 6/2005 | Arai et al. |
| 6,912,544 B1 | 6/2005 | Weiner |
| 6,922,630 B2 | 7/2005 | Maruyama et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,968,184 B2 | 11/2005 | Criss et al. |
| 6,968,206 B1 | 11/2005 | Whitsey-Anderson |
| 6,992,699 B1 | 1/2006 | Vance et al. |
| 6,999,802 B2 | 2/2006 | Kim |
| 7,003,598 B2 | 2/2006 | Kavanagh |
| 7,007,239 B1 | 2/2006 | Hawkins et al. |
| 7,012,999 B2 | 3/2006 | Ruckart |
| 7,028,077 B2 | 4/2006 | Toshimitsu et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,117,152 B1 | 10/2006 | Mukherji et al. |
| 7,117,504 B2 | 10/2006 | Smith et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Enzmann et al. |
| 7,142,810 B2 | 11/2006 | Oesterling |
| 7,190,880 B2 | 3/2007 | Cookson et al. |
| 7,218,916 B2 | 5/2007 | Nonami |
| 7,224,851 B2 | 5/2007 | Kinjo |
| 7,233,795 B1 | 6/2007 | Ryden |
| 7,239,742 B2 | 7/2007 | Ohtani et al. |
| 7,251,255 B1 | 7/2007 | Young |
| 7,260,416 B2 | 8/2007 | Shippee |
| 7,266,186 B1 | 9/2007 | Henderson |
| 7,274,952 B2 | 9/2007 | Hayashi |
| 7,426,264 B1 | 9/2008 | Henderson |
| 7,489,768 B1 | 2/2009 | Strietzel |
| 7,551,899 B1 | 6/2009 | Nicolas et al. |
| 2001/0000249 A1 | 4/2001 | Oba et al. |
| 2001/0005826 A1 | 6/2001 | Shibuya |
| 2001/0011293 A1 | 8/2001 | Murakami et al. |
| 2001/0029425 A1 | 10/2001 | Myr |
| 2001/0035829 A1 | 11/2001 | Yu et al. |
| 2001/0037191 A1 | 11/2001 | Furuta et al. |
| 2001/0041590 A1 | 11/2001 | Silberfenig et al. |
| 2002/0002705 A1 | 1/2002 | Byrnes et al. |
| 2002/0004701 A1 | 1/2002 | Nakano |
| 2002/0006804 A1 | 1/2002 | Mukai et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036642 A1 | 3/2002 | Kwon et al. |
| 2002/0038219 A1 | 3/2002 | Yanay et al. |
| 2002/0039914 A1 | 4/2002 | Hama et al. |
| 2002/0047787 A1 | 4/2002 | Mikkola et al. |
| 2002/0049742 A1 | 4/2002 | Chan et al. |
| 2002/0055350 A1 | 5/2002 | Gupte et al. |
| 2002/0058497 A1 | 5/2002 | Jeong |
| 2002/0058531 A1 | 5/2002 | Terasaki et al. |
| 2002/0065037 A1 | 5/2002 | Messina et al. |
| 2002/0065604 A1 | 5/2002 | Sekiyama |
| 2002/0066115 A1 | 5/2002 | Wendelrup |
| 2002/0068585 A1 | 6/2002 | Chan et al. |
| 2002/0068599 A1 | 6/2002 | Rodriguez et al. |
| 2002/0082059 A1 | 6/2002 | Nariai et al. |
| 2002/0085700 A1* | 7/2002 | Metcalf .................. 379/210.01 |

| Pub. No. | Date | Name | | Pub. No. | Date | Name |
|---|---|---|---|---|---|---|
| 2002/0094806 A1 | 7/2002 | Kamimura | | 2003/0222762 A1 | 12/2003 | Beigl et al. |
| 2002/0098857 A1 | 7/2002 | Ishii | | 2003/0224760 A1 | 12/2003 | Day |
| 2002/0102960 A1 | 8/2002 | Lechner | | 2003/0227570 A1 | 12/2003 | Kim et al. |
| 2002/0103872 A1 | 8/2002 | Watanabe | | 2003/0229900 A1 | 12/2003 | Reisman |
| 2002/0110246 A1 | 8/2002 | Gosior et al. | | 2003/0236866 A1 | 12/2003 | Light |
| 2002/0115469 A1 | 8/2002 | Rekimoto et al. | | 2004/0003307 A1 | 1/2004 | Tsuji |
| 2002/0120589 A1 | 8/2002 | Aoki | | 2004/0029640 A1 | 2/2004 | Masuyama et al. |
| 2002/0120718 A1 | 8/2002 | Lee | | 2004/0033795 A1 | 2/2004 | Walsh et al. |
| 2002/0123336 A1 | 9/2002 | Kamada | | 2004/0034692 A1 | 2/2004 | Eguchi et al. |
| 2002/0127997 A1 | 9/2002 | Karlstedt et al. | | 2004/0082321 A1 | 4/2004 | Kontianinen |
| 2002/0133342 A1 | 9/2002 | McKenna | | 2004/0103303 A1 | 5/2004 | Yamauchi et al. |
| 2002/0137470 A1 | 9/2002 | Baron et al. | | 2004/0107072 A1 | 6/2004 | Dietrich et al. |
| 2002/0137526 A1 | 9/2002 | Shinohara | | 2004/0114732 A1 | 6/2004 | Choe et al. |
| 2002/0142763 A1 | 10/2002 | Kolsky | | 2004/0117108 A1 | 6/2004 | Nemeth |
| 2002/0147645 A1 | 10/2002 | Alao et al. | | 2004/0137893 A1 | 7/2004 | Muthuswamy et al. |
| 2002/0151326 A1 | 10/2002 | Awada et al. | | 2004/0137983 A1* | 7/2004 | Kerr et al. ............ 463/29 |
| 2002/0151327 A1 | 10/2002 | Levitt | | 2004/0142678 A1 | 7/2004 | Krasner |
| 2002/0154632 A1 | 10/2002 | Wang et al. | | 2004/0157664 A1 | 8/2004 | Link |
| 2002/0165850 A1 | 11/2002 | Roberts et al. | | 2004/0166832 A1 | 8/2004 | Portman et al. |
| 2002/0168959 A1 | 11/2002 | Noguchi et al. | | 2004/0166879 A1 | 8/2004 | Meadows et al. |
| 2002/0173344 A1 | 11/2002 | Cupps et al. | | 2004/0174863 A1 | 9/2004 | Caspi et al. |
| 2002/0177407 A1 | 11/2002 | Mitsumoto | | 2004/0183937 A1 | 9/2004 | Viinikanoja et al. |
| 2002/0178009 A1 | 11/2002 | Firman | | 2004/0203490 A1 | 10/2004 | Kaplan |
| 2002/0178225 A1 | 11/2002 | Madenberg et al. | | 2004/0203520 A1 | 10/2004 | Schirtzinger et al. |
| 2002/0183045 A1 | 12/2002 | Emmerson et al. | | 2004/0203577 A1 | 10/2004 | Forman et al. |
| 2002/0191951 A1 | 12/2002 | Sodeyama et al. | | 2004/0203904 A1 | 10/2004 | Gwon et al. |
| 2002/0196378 A1 | 12/2002 | Slobodin et al. | | 2004/0203909 A1 | 10/2004 | Koster |
| 2002/0198813 A1 | 12/2002 | Patterson, Jr. et al. | | 2004/0204035 A1 | 10/2004 | Raghuram et al. |
| 2002/0198936 A1 | 12/2002 | McIntyre et al. | | 2004/0204126 A1 | 10/2004 | Reyes et al. |
| 2003/0003967 A1 | 1/2003 | Ito | | 2004/0204821 A1 | 10/2004 | Tu |
| 2003/0007556 A1 | 1/2003 | Oura et al. | | 2004/0204848 A1 | 10/2004 | Matsuo et al. |
| 2003/0013483 A1 | 1/2003 | Ausems et al. | | 2004/0209649 A1 | 10/2004 | Lord |
| 2003/0014286 A1 | 1/2003 | Cappellini | | 2004/0216037 A1 | 10/2004 | Hishida et al. |
| 2003/0017857 A1 | 1/2003 | Kitson et al. | | 2004/0218738 A1 | 11/2004 | Arai et al. |
| 2003/0018744 A1 | 1/2003 | Johanson et al. | | 2004/0219951 A1 | 11/2004 | Holder |
| 2003/0032389 A1 | 2/2003 | Kim et al. | | 2004/0222988 A1 | 11/2004 | Donnelly |
| 2003/0032406 A1 | 2/2003 | Minear et al. | | 2004/0235513 A1* | 11/2004 | O'Connell ............ 455/550.1 |
| 2003/0033214 A1 | 2/2003 | Mikkelsen et al. | | 2004/0235520 A1 | 11/2004 | Cadiz et al. |
| 2003/0038800 A1 | 2/2003 | Kawahara | | 2004/0242269 A1 | 12/2004 | Fadell |
| 2003/0045301 A1 | 3/2003 | Wollrab | | 2004/0248586 A1 | 12/2004 | Patel et al. |
| 2003/0045311 A1 | 3/2003 | Larikka | | 2004/0252197 A1 | 12/2004 | Fraley et al. |
| 2003/0045329 A1 | 3/2003 | Kinoshita | | 2004/0257208 A1 | 12/2004 | Huang et al. |
| 2003/0045996 A1 | 3/2003 | Yamazaki et al. | | 2005/0004749 A1 | 1/2005 | Park |
| 2003/0050776 A1 | 3/2003 | Blair | | 2005/0020301 A1 | 1/2005 | Lee |
| 2003/0052964 A1 | 3/2003 | Priestman et al. | | 2005/0026629 A1 | 2/2005 | Contractor |
| 2003/0055994 A1 | 3/2003 | Herrmann et al. | | 2005/0036509 A1 | 2/2005 | Acharya et al. |
| 2003/0061606 A1 | 3/2003 | Hartwig et al. | | 2005/0048987 A1 | 3/2005 | Glass |
| 2003/0063732 A1 | 4/2003 | Mcknight | | 2005/0070257 A1 | 3/2005 | Saarinen et al. |
| 2003/0065784 A1 | 4/2003 | Herrod | | 2005/0090768 A1 | 4/2005 | Brattesani et al. |
| 2003/0065805 A1 | 4/2003 | Barnes, Jr. | | 2005/0097038 A1 | 5/2005 | Yu et al. |
| 2003/0069693 A1 | 4/2003 | Snapp et al. | | 2005/0107119 A1 | 5/2005 | Lee et al. |
| 2003/0073432 A1 | 4/2003 | Meade, II | | 2005/0113080 A1 | 5/2005 | Nishimura |
| 2003/0083055 A1 | 5/2003 | Riordan et al. | | 2005/0120225 A1 | 6/2005 | Kirsch et al. |
| 2003/0083873 A1* | 5/2003 | Ross et al. ............ 704/246 | | 2005/0136949 A1 | 6/2005 | Barnes, Jr. |
| 2003/0084121 A1 | 5/2003 | De Boor et al. | | 2005/0153681 A1 | 7/2005 | Hanson |
| 2003/0093503 A1 | 5/2003 | Yamaki et al. | | 2005/0153745 A1 | 7/2005 | Smethers |
| 2003/0093790 A1 | 5/2003 | Logan et al. | | 2005/0164684 A1 | 7/2005 | Chen et al. |
| 2003/0099367 A1 | 5/2003 | Okamura | | 2005/0165871 A1 | 7/2005 | Barrs et al. |
| 2003/0100326 A1 | 5/2003 | Grube et al. | | 2005/0166242 A1 | 7/2005 | Matsumoto et al. |
| 2003/0107580 A1 | 6/2003 | Egawa et al. | | 2005/0186954 A1 | 8/2005 | Kenney |
| 2003/0109251 A1 | 6/2003 | Fujito et al. | | 2005/0191969 A1 | 9/2005 | Mousseau |
| 2003/0114191 A1 | 6/2003 | Nishimura | | 2005/0235312 A1 | 10/2005 | Karaoguz et al. |
| 2003/0115240 A1* | 6/2003 | Cho ............ 709/102 | | 2005/0257149 A1* | 11/2005 | Kamiya et al. ............ 715/700 |
| 2003/0117316 A1 | 6/2003 | Tischer | | 2005/0261945 A1 | 11/2005 | Mougin et al. |
| 2003/0119485 A1 | 6/2003 | Ogasawara | | 2006/0015819 A1 | 1/2006 | Hawkins et al. |
| 2003/0119562 A1 | 6/2003 | Kokubo | | 2006/0031407 A1 | 2/2006 | Dispensa et al. |
| 2003/0122779 A1 | 7/2003 | Martin et al. | | 2006/0041923 A1 | 2/2006 | McQuaide, Jr. |
| 2003/0132928 A1 | 7/2003 | Kori | | 2006/0052100 A1 | 3/2006 | Almgren |
| 2003/0135563 A1 | 7/2003 | Bodin et al. | | 2006/0073820 A1 | 4/2006 | Craswell et al. |
| 2003/0148772 A1 | 8/2003 | Ben-Ari | | 2006/0133590 A1 | 6/2006 | Jiang |
| 2003/0153364 A1 | 8/2003 | Osann, Jr. | | 2006/0140387 A1 | 6/2006 | Boldt |
| 2003/0155413 A1 | 8/2003 | Kovesdi et al. | | 2006/0143655 A1 | 6/2006 | Ellis et al. |
| 2003/0157929 A1 | 8/2003 | Janssen et al. | | 2006/0166650 A1 | 7/2006 | Berger et al. |
| 2003/0166399 A1 | 9/2003 | Tokkonen et al. | | 2006/0206913 A1 | 9/2006 | Jerding et al. |
| 2003/0171113 A1 | 9/2003 | Choi | | 2006/0234758 A1 | 10/2006 | Parupudi et al. |
| 2003/0174685 A1 | 9/2003 | Hasebe | | 2006/0284732 A1 | 12/2006 | Brock-Fisher |
| 2003/0181201 A1 | 9/2003 | Bomze et al. | | 2007/0061845 A1 | 3/2007 | Barnes, Jr. |
| 2003/0204562 A1 | 10/2003 | Hwang | | 2007/0109262 A1 | 5/2007 | Oshima et al. |
| 2003/0220835 A1 | 11/2003 | Barnes, Jr. | | 2007/0135145 A1 | 6/2007 | Lee et al. |

| | | |
|---|---|---|
| 2007/0142047 A1 | 6/2007 | Heeschen |
| 2007/0190944 A1 | 8/2007 | Doan et al. |
| 2007/0204014 A1 | 8/2007 | Greer et al. |
| 2007/0260456 A1 | 11/2007 | Proux et al. |
| 2007/0262848 A1 | 11/2007 | Berstis et al. |
| 2008/0014917 A1 | 1/2008 | Rhoads et al. |
| 2008/0016526 A1 | 1/2008 | Asmussen |
| 2008/0016534 A1 | 1/2008 | Ortiz et al. |
| 2008/0058005 A1 | 3/2008 | Zicker et al. |
| 2008/0242283 A1 | 10/2008 | Ruckart |
| 2008/0250459 A1 | 10/2008 | Roman |
| 2009/0197641 A1 | 8/2009 | Rofougaran et al. |
| 2010/0030557 A1 | 2/2010 | Molloy et al. |
| 2010/0099457 A1 | 4/2010 | Kim |

* cited by examiner

COMMUNICATION DEVICE

Paragraph [0001]—CROSS REFERENCE TO RELATED APPLICATIONS

Paragraph [0002]—This application is a continuation of U.S. Ser. No. 11/688,913, filed Mar. 21, 2007, which is the continuation of U.S. Ser. No. 10/710,600, filed Jul. 23, 2004, which claims the benefit of U.S. Provisional Application No. 60/481,426, filed Sep. 26, 2003, all of which are hereby incorporated herein by reference in their entirety.

Paragraph [0003]—BACKGROUND OF INVENTION

Paragraph [0004]—The invention relates to communication device and more particularly to the communication device which is capable to communicate with another communication device in a wireless fashion.

Paragraph [0005]—U.S. Patent Publication No. 20030013483 is introduced as prior art of the present invention of which the summary is the following: "A user interface includes a main screen segregated into various screen areas. At least one of the screen areas is devoted to a system application for displaying status icons, and another of the screen areas is devoted to an interface page which may or may not link to other interface pages which are used for displaying current or recent application information for respective user applications, which user applications may be accessed through interaction with the interface page. The application information may be application status information, recent communication messages (such as e-mail messages, SMS messages, or instant messaging messages) and/or one or more upcoming events or to do items for a user. The user interaction may occur through selection with a pointing device such as a stylus, a fingertip stylus, a finger, or one or more buttons, or even through voice commands. The user interface may also include an area reserved for displaying advertisements." However, this prior art does not disclose the communication device which includes a voice communicating means, an automobile controlling means, a caller ID means, a call blocking means, an auto time adjusting means, a calculating means, a word processing means, a startup software means, a stereo audio data output means, a digital camera means, a multiple language displaying means, a caller's information displaying means, a communication device remote controlling means, a shortcut icon displaying means, a voice recognition means, and a voice tag means.

Paragraph [0006]—For the avoidance of doubt, the number of the prior arts introduced herein (and/or in IDS) may be of a large one, however, applicant has no intent to hide the more relevant prior art(s) in the less relevant ones.

Paragraph [0007]—SUMMARY OF INVENTION

Paragraph [0008]—It is an object of the present invention to provide a device capable to implement a plurality of functions.

Paragraph [0009]—It is another object of the present invention to provide merchandise to merchants attractive to the customers in the U.S.

Paragraph [0010]—It is another object of the present invention to provide mobility to the users of communication device.

Paragraph [0011]—It is another object of the present invention to provide more convenience to the customers in the U.S.

Paragraph [0012]—It is another object of the present invention to provide more convenience to the users of communication device or any tangible thing in which the communication device is fixedly or detachably (i.e., removably) installed.

Paragraph [0013]—It is another object of the present invention to overcome the shortcomings associated with the foregoing prior art.

Paragraph [0014]—It is another object of the present invention to overcome the shortcomings associated with the foregoing prior art.

Paragraph [0015]—The present invention introduces the communication device which includes a voice communicating means, an automobile controlling means, a caller ID means, a call blocking means, an auto time adjusting means, a calculating means, a word processing means, a startup software means, a stereo audio data output means, a digital camera means, a multiple language displaying means, a caller's information displaying means, a communication device remote controlling means, a shortcut icon displaying means, a voice recognition means, and a voice tag means.

Paragraph [0016]—BRIEF DESCRIPTION OF DRAWINGS

Paragraph [0017]—The above and other aspects, features, and advantages of the invention will be better understood by reading the following more particular description of the invention, presented in conjunction with the following drawing, wherein:

Paragraph [0018]—FIG. 1 is a block diagram illustrating an exemplary embodiment of the present invention.

Paragraph [0019]—DETAILED DESCRIPTION

Paragraph [0020]—The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

Paragraph [0021]—FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

Paragraph [0022]—As another embodiment, LCD 201 or LCD 201/Video Processor 202 may be separated from the other elements described in FIG. 1, and be connected in a wireless fashion to be wearable and/or head-mountable.

Paragraph [0023]—When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Paragraph [0024]—This Paragraph [0024] illustrate(s) the elements of Communication Device 200. The elements of Communication Device 200 described in this Paragraph [0024] is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this Paragraph [0024] in this specification.

Paragraph [0025]—This Paragraph [0025] illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

Paragraph [0026]—<<Voice Recognition System>>

Paragraph [0027]—Communication Device 200 (FIG. 1) has the function to operate the device by the user's voice or convert the user's voice into a text format (i.e., the voice recognition). The voice recognition function can be performed in terms of software by using Area 261, the voice recognition working area, of RAM 206 (FIG. 1) which is specifically allocated to perform such function, or can also be performed in terms of hardware circuit where such space is specifically allocated in Area 282 of Sound Processor 205 (FIG. 1) for the voice recognition system.

Paragraph [0028]—This Paragraph [0028] illustrates how the voice recognition function is activated. CPU 211 (FIG. 1) periodically checks the input status of Input Device 210 (FIG. 1) (S1). If CPU 211 detects a specific signal input from Input Device 210 (S2) the voice recognition system which is described in Paragraph [9022], Paragraph [9023], Paragraph [9024], and/or Paragraph [0027] is activated. As another embodiment, the voice recognition system can also be activated by entering predetermined phrase, such as 'start voice recognition system' via Microphone 215 (FIG. 1).

Paragraph [0029]—<<Voice Recognition—Dialing/Auto-Off During Call Function>>

Paragraph [0030]—This Paragraph [0030] illustrates the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

Paragraph [0031]—CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

Paragraph [0032]—<<Voice Recognition Tag Function>>

Paragraph [0033]—Paragraph [0034] through Paragraph [0035] describes the method of inputting the numeric information in a convenient manner.

Paragraph [0034]—As described in this Paragraph [0034], RAM 206 includes Table #1 and Table #2. Audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' Tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' Once the audio data is processed as described in S4 of Paragraph [0030], CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Paragraph [0035]—This Paragraph [0035] illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' Once the audio data is processed as described in S4 of Paragraph [0030], CPU 211 scans Table #A (S1). If the retrieved audio data matches with one of the audio information registered in Table #A (S2), it retrieves the corresponding numeric information therefrom (S3).

Paragraph [0036]—As another embodiment, RAM 206 may contain only Table #2 and tag can be retrieved from the voice recognition system explained in Paragraph [0027] through Paragraph [0031]. Namely, once the audio data is processed by CPU 211 (FIG. 1) as described in S4 of Paragraph [0030] and retrieves the text data therefrom and detects one of the tags registered in Table #2 (e.g., 'Scot'), CPU 211 retrieves the corresponding numeric information (e.g., '(916) 411-2526') from the same table.

Paragraph [0037]—<<Voice Recognition Noise Filtering Function>>

Paragraph [0038]—Paragraph [0039] through Paragraph [0042] describes the method of minimizing the undesired effect of the background noise when utilizing the voice recognition system.

Paragraph [0039]—As described in this Paragraph [0039], RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

Paragraph [0040]—This Paragraph [0040] describes the method to utilize the data stored in Area 255 and Area 256 described in Paragraph [0039]. When the voice recognition system is activated as described in Paragraph [0028], the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

Paragraph [0041]—This Paragraph [0041] describes the method of updating Area 255. When the voice recognition system is activated as described in Paragraph [0028], the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

Paragraph [0042]—This Paragraph [0042] describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

Paragraph [0043]—<<Voice Recognition Auto-off Function>>

Paragraph [0044]—The voice recognition system can be automatically turned off to avoid glitch as described in this Paragraph [0044]. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

Paragraph [0045]—<<Voice Recognition Email Function (1)>>

Paragraph [0046]—This Paragraph [0046] illustrates the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

Paragraph [0047]—<<Voice Recognition—Speech-to-text Function>>

Paragraph [0048]—Paragraph [0049] illustrates the speech-to-text function of Communication Device 200 (FIG. 1).

Paragraph [0049]—Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Paragraph [0050]—This Paragraph [0050] illustrates how the text and numeric information as well as the tag are displayed. On LCD 201 the text and numeric information 702 ('XXXXXXXXX') are displayed with the predetermined font and color as well as with the tag 701 ('John').

Paragraph [0051]—<<Audio/Video Data Capturing System>>

Paragraph [0052]—Paragraph [0054] through Paragraph [0059] illustrate the audio/video capturing system of Communication Device 200 (FIG. 1).

Paragraph [0053]—Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

Paragraph [0054]—As illustrated in this Paragraph [0054], RAM 206 (FIG. 1) includes Area 267 which stores video data, Area 268 which stores audio data, and Area 265 which is a work area utilized for the process explained hereinafter.

Paragraph [0055]—As described in this Paragraph [0055], the video data input from CCD Unit 214 (FIG. 1) (S1a) is converted from analog data to digital data (S2a) and is processed by Video Processor 202 (FIG. 1) (S3a). Area 265 (Paragraph [0054]) is used as work area for such process. The processed video data is stored in Area 267 (Paragraph [0054]) of RAM 206 (S4a) and is displayed on LCD 201 (FIG. 1) (S5a). The audio data input from Microphone 215 (FIG. 1) (S1b) is converted from analog data to digital data by A/D 213 (FIG. 1) (S2b) and is processed by Sound Processor 205 (FIG. 1) (S3b). Area 265 is used as work area for such process. The processed audio data is stored in Area 268 (Paragraph [0054]) of RAM 206 (S4b) and is transferred to Sound Processor 205 and is output from Speaker 216 (FIG. 1) via D/A 204 (FIG. 1) S5b). The sequences of S1a through S5a and S1b through S5b are continued until a specific signal indicating to stop such sequence is input from Input Device 210 (FIG. 1) or by the voice recognition system (S6).

Paragraph [0056]—This Paragraph [0056] illustrates the sequence to transfer the video data and the audio data via Antenna 218 (FIG. 1) in a wireless fashion. CPU 211 (FIG. 1) of Device A initiates a dialing process (S1) until the line is connected to a host (not shown) (S2). As soon as the line is connected, CPU 211 reads the video data and the audio data stored in Area 267 (Paragraph [0054]) and Area 268 (Paragraph [0054]) (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

Paragraph [0057]—This Paragraph [0057] illustrates the basic structure of the transferred data which is transferred from Device A as described in S4 and S5 of Paragraph [0056]. Transferred data 610 is primarily composed of Header 611, video data 612, audio data 613, relevant data 614, and Footer 615. Video data 612 corresponds to the video data stored in Area 267 (Paragraph [0054]) of RAM 206, and audio data 613 corresponds to the audio data stored in Area 268 (Paragraph [0054]) of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

Paragraph [0058]—This Paragraph [0058] illustrates the data contained in RAM 206 (FIG. 1) of Device B. RAM 206 includes Area 269 which stores video data, Area 270 which stores audio data, and Area 266 which is a work area utilized for the process explained hereinafter.

Paragraph [0059]—As described in this Paragraph [0059], CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 (Paragraph [0058]) and Area 270 (Paragraph [0058]) of RAM 206 respectively (S5). The video data stored in Area 269 is processed by Video Processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in Area 270 is processed by Sound Processor 205 (FIG. 1) (S6b). The processed audio data is converted into analog data by D/A 204 (FIG. 1) (S7b) and output from Speaker 216 (FIG. 1) (S8b). The sequences of S6a through S8a and S6b through S8b are continued until a specific signal indicating to stop such sequence is input from Input Device 210 (FIG. 1) or via the voice recognition system (S9).

Paragraph [0060]—<<Caller ID System>>

Paragraph [0061]—Paragraph [0062] through Paragraph [0064] illustrate the caller ID system of Communication Device 200 (FIG. 1). Paragraph [0062]—As illustrated in this Paragraph [0062], RAM 206 includes Table C. Each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

Paragraph [0063]—As illustrated in this Paragraph [0063], the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

Paragraph [0064]—As illustrated in this Paragraph [0064], CPU 211 (FIG. 1) periodically checks whether it has received a call from other communication devices (S1). If it receives a call (S2), CPU 211 scans Table C (Paragraph [0062]) to see whether the phone number of the caller device is registered in the table (S3). If there is a match (S4), the designated color is output from Indicator 212 (FIG. 1) and the designated sound is output from Speaker 216 (FIG. 1) (S5). For example if the incoming call is from Phone #1, Color A is output from Indicator 212 and Sound E is output from Speaker 216.

Paragraph [0065]—<<Call Blocking Function>>

Paragraph [0066]—Paragraph [0067] through Paragraph [0069] illustrates the so-called 'call blocking' function of Communication Device 200 (FIG. 1).

Paragraph [0067]—As illustrated in this Paragraph [0067], RAM 206 (FIG. 1) includes Area 273 and Area 274. Area 273 stores phone numbers that should be blocked. In this embodiment, Phone #1, Phone #2, and Phone #3 are blocked. Area 274 stores a message data, preferably a wave data, stating that the phone can not be connected.

Paragraph [0068]—This Paragraph [0068] illustrates the operation of Communication Device 200. When Communication Device 200 receives a call (S1), CPU 211 (FIG. 1) scans Area 273 (Paragraph [0067]) of RAM 206 (S2). If the phone number of the incoming call matches one of the phone numbers stored in Area 273 (S3), CPU 211 sends the message data stored in Area 274 (Paragraph [0067]) of RAM 206 to the caller device (S4) and disconnects the line (S5).

Paragraph [0069]—This Paragraph [0069] illustrates the method of updating Area 273 (Paragraph [0067]) of RAM 206. Assuming that the phone number of the incoming call does not match any of the phone numbers stored in Area 273 of RAM 206 (see S3 of Paragraph [0068]). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 (Paragraph [0067]) of RAM 206 to the caller device (S4). The line is disconnected thereafter (S5).

Paragraph [0070]—Paragraph [0071] through Paragraph [0073] illustrate another embodiment of the present invention.

Paragraph [0071]—As illustrated in this Paragraph [0071], Host H (not shown) includes Area 403 and Area 404. Area 403 stores phone numbers that should be blocked to be connected to Communication Device 200. In this embodiment, Phone #1, Phone #2, and Phone #3 are blocked for Device A; Phone #4, Phone #5, and Phone #6 are blocked for Device B; and Phone #7, Phone #8, and Phone #9 are blocked for Device C Area 404 stores a message data stating that the phone can not be connected.

Paragraph [0072]—This Paragraph [0072] illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (Paragraph [0071]) (S3) and checks whether the phone number of the incoming call matches one of the phone numbers stored therein for Device B (S4). If the phone number of the incoming call does not match any of the phone numbers stored in Area 403, the line is connected to Device B (S5b). On the other hand, if the phone number of the incoming call matches one of the phone numbers stored in Area 403, the line is 'blocked,' i.e., not connected to Device B (S5a) and Host H sends the massage data stored in Area 404 (Paragraph [0071]) to the caller device (S6).

Paragraph [0073]—This Paragraph [0073] illustrates the method of updating Area 403 (Paragraph [0071]) of Host H. Assuming that the phone number of the incoming call does not match any of the phone numbers stored in Area 403 (see S4 of Paragraph [0072]). In that case, Host H allows the connection between the caller device and Communication Device 200, however, the user of Communication Device 200 may decide to have such number 'blocked' after all. If that is the case, the user simply dials '999' while the line is connected. Technically Host H (Paragraph [0071]) periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 (Paragraph [0071]) to the caller device (S4). The line is disconnected thereafter (S5).

Paragraph [0074]—As another embodiment of the method illustrated in Paragraph [0073], Host H (Paragraph [0071]) may delegate some of its tasks to Communication Device 200. Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 (Paragraph [0071]) and sends the message data stored in Area 404 (Paragraph [0071]) to the caller device. The line is disconnected thereafter.

Paragraph [0075]—<<Navigation System>>

Paragraph [0076]—Paragraph [0077] through Paragraph [0089] illustrate the navigation system of Communication Device 200 (FIG. 1). Paragraph [0077]—As illustrated in this Paragraph [0077], RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

Paragraph [0078]—As illustrated in this Paragraph [0078], Video Processor 202 (FIG. 1) includes texture mapping processor 290. Texture mapping processor 290 produces polygons in a three-dimensional space and 'pastes' textures to each polygon. The concept of such method is described in the following patents and the references cited thereof. U.S. Pat. No. 5,870,101, U.S. Pat. No. 6,157,384, U.S. Pat. No. 5,774, 125, U.S. Pat. No. 5,375,206, and/or U.S. Pat. No. 5,925,127.

Paragraph [0079]—As illustrated in this Paragraph [0079], the voice recognition system is activated when CPU 211 (FIG. 1) detects a specific signal input from Input Device 210 (FIG. 1) (S1). After the voice recognition system is activated, the input current position mode starts and the current position of Communication Device 200 is input by voice recognition system explained in Paragraph [1026], Paragraph [1026], Paragraph [1027], Paragraph [1038], Paragraph [1039], Paragraph [1040], Paragraph [1041], Paragraph [1043] (S2). The current position can also be input from Input Device 210. As another embodiment of the present invention, the current position can automatically be detected by the method so-called 'global positioning system' or 'GPS' and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

Paragraph [0080]—This Paragraph [0080] illustrates the sequence of the input current position mode described in S2 of Paragraph [0079]. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

Paragraph [0081]—This Paragraph [0081] illustrates the sequence of the input destination mode described in S3 of Paragraph [0079]. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

Paragraph [0082]—This Paragraph [0082] illustrates the sequence of displaying the shortest route from the current position to the destination. CPU 211 (FIG. 1) retrieves both the current position data and the Destination Data which are input by the method described in Paragraph [0079] through Paragraph [0081] from Area 277 (Paragraph [0077]) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 (Paragraph [0077]) of RAM 206 (S2).

Paragraph [0083]—As another embodiment of the present invention, by way of utilizing the location data stored in Area 277, CPU 211 may produce a three-dimensional map by composing the three dimensional objects (by method so-called 'texture mapping' as described above) which are stored in Area 276 (Paragraph [0077]) of RAM 206. The two-dimensional map and/or the three dimensional map is displayed on LCD 201 (FIG. 1) (S3).

Paragraph [0084]—As another embodiment of the present invention, the attribution data stored in Area 295 (Paragraph [0077]) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

Paragraph [0085]—As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 (Paragraph [0077]) of RAM 206. Then CPU 211 retrieves a plurality of object data which correspond to such location data from Area 276 (Paragraph [0077]) of RAM 206 and displays a plurality of objects on LCD 201 based on such object data in a manner the user of Communication Device 200 may observe from the current location.

Paragraph [0086]—This Paragraph [0086] illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 (Paragraph [0077]) of RAM 206 (S3). Instead, by way of utilizing the location data stored in Area 277 (Paragraph [0077]), CPU 211 may produce a three-dimensional map by composing the three dimensional objects by method so-called 'texture mapping' which are stored in Area 276 (Paragraph [0077]) of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

Paragraph [0087]—This Paragraph [0087] illustrates the method of finding the shortest location of the desired facility, such as restaurant, hotel, gas station, etc. The voice recognition system is activated in the manner described in Paragraph [0079] (51). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in Paragraph [0080] and/or Paragraph [0086] (S3). From the data selected in S2, CPU 211 scans Area 277 (Paragraph [0077]) of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (Paragraph [0077]) (S5). Instead, by way of utilizing the location data stored in 277 (Paragraph [0077]), CPU

211 may produce a three-dimensional map by composing the three dimensional objects by method so-called 'texture mapping' which are stored in Area 276 (Paragraph [0077]) of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

Paragraph [0088]—This Paragraph [0088] illustrates the method of displaying the time and distance to the destination. CPU 211 (FIG. 1) calculates the current position wherein the source data can be input from the method described in Paragraph [0080] and/or Paragraph [0086] (S1). The distance is calculated from the method described in Paragraph [0082] (S2). The speed is calculated from the distance which Communication Device 200 has proceeded within specific period of time (S3). The distance to the destination and the time left are displayed on LCD 201 (FIG. 1) (S4 and S5).

Paragraph [0089]—This Paragraph [0089] illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method described in this Paragraph [0089] is repeated for a certain period of time. If the deviation still exists after such period of time has passed, CPU 211 (FIG. 1) initiates the sequence described in Paragraph and calculates the shortest route to the destination and display it on LCD 201. The details of such sequence is as same as the one explained in Paragraph [0082].

Paragraph [0090]—This Paragraph [0090] illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described in Paragraph [0079] through Paragraph [0089] is performed (S3). On the other hand, if the data received is a communication data (S4), the communication system, i.e., the system necessary for wireless communication which is mainly described in FIG. 1 is performed (S5).

Paragraph [0091]—<<Auto Time Adjust Function>>

Paragraph [0092]—Paragraph [0093] to Paragraph [0095] illustrate the automatic time adjust function, i.e., a function which automatically adjusts the clock of Communication Device 200.

Paragraph [0093]—This Paragraph [0093] illustrates the data stored in RAM 206 (FIG. 1). In this embodiment, RAM 206 includes Auto Time Adjust Software Storage Area 2069*a*, Current Time Data Storage Area 2069*b*, and Auto Time Data Storage Area 2069*c*. Auto Time Adjust Software Storage Area 2069*a* stores software program to implement the present function which is explained in details hereinafter, Current Time Data Storage Area 2069*b* stores the data which represents the current time, and Auto Time Data Storage Area 2069*c* is a working area assigned for implementing the present function.

Paragraph [0094]—This Paragraph [0094] illustrates a software program stored in Auto Time Adjust Software Storage Area 2069*a* (Paragraph [0093]). First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069*b* (Paragraph [0093]), and compares both data. If the difference between both data is not within the predetermined value X (S3), CPU 211 adjusts the current time data (S4). The method to adjust the current data can be either simply overwrite the data stored in Current Time Data Storage Area 2069*b* with the atomic clock data retrieved from Network NT or calculate the difference of the two data and add or subtract the difference to or from the current time data stored in Current Time Data Storage Area 2069*b* by utilizing Auto Time Data Storage Area 2069*c* (Paragraph [0093]) as a working area.

Paragraph [0095]—This Paragraph [0095] illustrates another software program stored in Auto Time Adjust Software Storage Area 2069*a* (Paragraph [0093]). When the power of Communication Device 200 is turned on (S1), CPU 211 (FIG. 1) stores a predetermined timer value in Auto Time Data Storage Area 2069*c* (Paragraph [0093]) (S2). The timer value is decremented periodically (S3). When the timer value equals to zero (S4), the automatic timer adjust function is activated (S5) and CPU 211 performs the sequence described in Paragraph [0094], and the sequence of S2 through S4 is repeated thereafter.

Paragraph [0096]—<<Calculator Function>>

Paragraph [0097]—Paragraph [0098] through Paragraph [0101] illustrate the calculator function of Communication Device 200. Communication Device 200 can be utilized as a calculator to perform mathematical calculation by implementing the present function.

Paragraph [0098]—This Paragraph [0098] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the calculator function is activated (S3*c*) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0099]—This Paragraph [0099] illustrates the data stored in RAM 206 (FIG. 1). In this embodiment, the data to activate (as described in S3*a* of the previous Paragraph) and to perform the communication mode is stored in Communication Data Storage Area 2061*a*, the data to activate (as described in S3*b* of the previous Paragraph) and to perform the game download mode and the game play mode are stored in Game DL/Play Data Storage Area 2061*b*/2061*c*, and the data to activate (as described in S3*c* of the previous Paragraph) and to perform the calculator function is stored in Calculator Information Storage Area 20615*a*.

Paragraph [0100]—This Paragraph [0100] illustrates the data stored in Calculator Information Storage Area 20615*a* (Paragraph [0099]). In this embodiment, Calculator Information Storage Area 20615*a* includes Calculator Software Storage Area 20615*b* and Calculator Data Storages Area 20615*c*. Calculator Software Storage Area 20615*b* stores the software programs to implement the present function, such as the one explained in Paragraph [0101], and Calculator Data Storage Area 20615*c* stores a plurality of data necessary to execute the software programs stored in Calculator Software Storage Area 20615*b* and to implement the present function.

Paragraph [0101]—This Paragraph [0101] illustrates the software program stored in Calculator Storage Area 20615*b* (Paragraph [0100]). In this embodiment, one or more of numeric data are input by utilizing Input Device 210 (FIG. 1) or via voice recognition system as well as the arithmetic operators (e.g., '+', '−', and 'x'), which are temporarily stored in Calculator Data Storage Area 20615*c* (S1). By utilizing the data stored in Calculator Data Storage Area 20615*c*, CPU 211 (FIG. 1) performs the calculation by executing the software program stored in Calculator Software Storage Area 20615*b* (Paragraph [0100]) (S2). The result of the calculation is displayed on LCD 201 (FIG. 1) thereafter (S3).

Paragraph [0102]—<<Spreadsheet Function>>

Paragraph [0103]—Paragraph [0104] through Paragraph [0107] illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

Paragraph [0104]—This Paragraph [0104] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the spreadsheet function is activated (S3*c*) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0105]—This Paragraph [0105] illustrates the data stored in RAM 206 (FIG. 1). In this embodiment, the data to activate (as described in S3*a* of the previous Paragraph) and to perform the communication mode is stored in Communication Data Storage Area 2061*a*, the data to activate (as described in S3*b* of the previous Paragraph) and to perform the game download mode and the game play mode are stored in Game DL/Play Data Storage Area 2061*b*/2061*c*, and the data to activate (as described in S3*c* of the previous Paragraph) and to perform the spreadsheet function is stored in Spreadsheet Information Storage Area 20616*a*.

Paragraph [0106]—This Paragraph [0106] illustrates the data stored in Spreadsheet Information Storage Area 20616*a* (Paragraph [0105]). In this embodiment, Spreadsheet Information Storage Area 20616*a* includes Spreadsheet Software Storage Area 20616*b* and Spreadsheet Data Storage Area 20616*c*. Spreadsheet Software Storage Area 20616*b* stores the software programs to implement the present function, such as the one explained in Paragraph [0107], and Spreadsheet Data Storage Area 20616*c* stores a plurality of data necessary to execute the software programs stored in Spreadsheet Software Storage Area 20616*b* and to implement the present function.

Paragraph [0107]—This Paragraph [0107] illustrates the software program stored in Spreadsheet Software Storage Area 20616*b* (Paragraph [0106]). In this embodiment, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616*c* (Paragraph [0106]) (S1). One or more of alphanumeric data are input by utilizing Input Device 210 or via voice recognition system into the cell selected in S1, and CPU 211 stores the alphanumeric data in Spreadsheet Data Storage Area 20616*c* (S2). CPU 211 displays the alphanumeric data on LCD 201 thereafter (S3). The sequence of S1 through S3 can be repeated for a numerous amount of times and saved and closed thereafter.

Paragraph [0108]—<<Word Processing Function>>

Paragraph [0109]—Paragraph [0110] through Paragraph [0123] illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected Paragraphs.

Paragraph [0110]—This Paragraph [0110] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in Paragraph [0127], and the word processing function is activated (S3*c*) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0111]—This Paragraph [0111] illustrates the data stored in RAM 206 (FIG. 1). As described in this Paragraph [0111], the data to activate (as described in S3*a* of the previous Paragraph) and to perform the communication mode is stored in Communication Data Storage Area 2061*a*, the data to activate (as described in S3*b* of the previous Paragraph) and to perform the game download mode and the game play mode are stored in Game DL/Play Data Storage Area 2061*b*/2061*c* of which the details are described in Paragraph [0128], and the data to activate (as described in S3*c* of the previous Paragraph) and to perform the word processing function is stored in Word Processing Information Storage Area 20617*a*.

Paragraph [0112]—This Paragraph [0112] illustrates the data stored in Word Processing Information Storage Area 20617*a* (Paragraph [0111]). Word Processing Information Storage Area 20617*a* includes Word Processing Software Storage Area 20617*b* and Word Processing Data Storage Area 20617*c*. Word processing Software Storage Area 20617*b* stores the software programs described in Paragraph [0113] hereinafter, and Word Processing Data Storage Area 20617*c* stores a plurality of data described in Paragraph [0114] hereinafter.

Paragraph [0113]—This Paragraph [0113] illustrates the software programs stored in Word Processing Software Storage Area 20617*b* (Paragraph [0112]). Word Processing Software Storage Area 20617*b* stores Alphanumeric Data Input Software 20617*b*1, Bold Formatting Software 20617*b*2, Italic Formatting Software 20617*b*3, Image Pasting Software 20617*b*4, Font Formatting Software 20617*b*5, Spell Check Software 20617*b*6, Underlining Software 20617*b*7, Page Numbering Software 20617*b*8, and Bullets And Numbering Software 20617*b*9. Alphanumeric Data Input Software 20617*b*1 inputs to a document a series of alphanumeric data in accordance to the input signals produced by utilizing Input Device 210 (FIG. 1) or via voice recognition system. Bold Formatting Software 20617*b*2 implements the bold formatting function which makes the selected alphanumeric data bold of which the sequence is described in Paragraph [0116]. Italic Formatting Software 20617*b*3 implements the italic formatting function which makes the selected alphanumeric data italic of which the sequence is described in Paragraph [0117]. Image Pasting Software 20617*b*4 implements the image pasting function which pastes the selected image to a document to the selected location of which the sequence is described in Paragraph [0118]. Font Formatting Software 20617*b*5 implements the font formatting function which changes the selected alphanumeric data to the selected font of which the sequence is described in Paragraph [0119]. Spell Check Software 20617*b*6 implements the spell check function which fixes spelling and grammatical errors of the alphanumeric data in a document of which the sequence is described in Paragraph [0120]. Underlining Software 20617*b*7 implements the underlining function which adds the selected underlines to the selected alphanumeric data of which the sequence is described in Paragraph [0121]. Page Numbering Software 20617*b*8 implements the page numbering function which adds page numbers at the selected location to each page of a document of which the sequence is described in Paragraph [0122]. Bullets And Numbering Software 20617*b*9 implements the bullets and numbering function which adds the selected type of bullets and numbers to the selected Paragraphs of which the sequence is described in Paragraph [0123].

Paragraph [0114]—This Paragraph [0114] illustrates the data stored in Word Processing Data Storage Area 20617*c* (Paragraph [0112]). Word Processing Data Storage Area 20617*c* includes Alphanumeric Data Storage Area 20617*c*1, Bold Formatting Data Storage Area 20617*c*2, Italic Formatting Data Storage Area 20617*c*3, Image Data Storage Area 20617*c*4, Font Formatting Data Storage Area 20617*c*5, Spell Check Data Storage Area 20617*c*6, Underlining Data Storage Area 20617*c*7, Page Numbering Data Storage Area 20617*c*8, and Bullets And Numbering Data Storage Area 20617*c*9. Alphanumeric Data Storage Area 20617*c*1 stores the basic text and numeric data which are not decorated by bold and/or italic (the default font may be courier new). Bold Formatting Data Storage Area 20617*c*2 stores the text and numeric data which are decorated by bold. Italic Formatting Data Storage Area 20617*c*3 stores the text and numeric data which are decorated by italic. Image Data Storage Area 20617*c*4 stores the data representing the location of the image data pasted in a document and the image data itself. Font Formatting Data Storage Area 20617*c*5 stores a plurality of types of fonts, such as arial, century, courier new, tahoma, and times new roman, of all text and numeric data stored in Alphanumeric Data Storage Area 20617*c*1. Spell check Data Storage Area 20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9 stores a plurality of data representing different types of bullets and numbering and the location which they are added.

Paragraph [0115]—This Paragraph [0115] illustrates the sequence of the software program stored in Alphanumeric Data Input Software 20617*b*1. A plurality of alphanumeric data is input by utilizing Input Device 210 (FIG. 1) or via voice recognition system (S1). The corresponding alphanumeric data is retrieved from Alphanumeric Data Storage Area 20617*c*1 (Paragraph [0114]) (S2), and the document including the alphanumeric data retrieved in S2 is displayed on LCD 201 (FIG. 1) (S3).

Paragraph [0116]—This Paragraph [0116] illustrates the sequence of the software program stored in Bold Formatting Software 20617*b*2. One or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (Paragraph [0114]) (S3), and replaces the alphanumeric data selected in S1 with the bold formatting data retrieved in S3 (S4). The document with the replaced bold formatting data is displayed on LCD 201 thereafter (S5).

Paragraph [0117]—This Paragraph [0117] illustrates the sequence of the software program stored in Italic Formatting Software 20617*b*3. One or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (Paragraph [0114]) (S3), and replaces the alphanumeric data selected in S1 with the italic formatting data retrieved in S3

(S4). The document with the replaced italic formatting data is displayed on LCD 201 thereafter (S5).

Paragraph [0118]—This Paragraph [0118] illustrates the sequence of the software program stored in Image Pasting Software 20617b4. The image to be pasted is selected by utilizing Input Device 210 (FIG. 1) or via voice recognition system (S1). Here, the image may be of any type, such as JPEG; GIF, and TIFF. Next the location in a document where the image is to be pasted is selected by utilizing Input Device 210 or via voice recognition system (S2). The data representing the location is stored in Image Pasting Data Storage Area 20617c4 (Paragraph [0114]). The image is pasted at the location selected in S2 and the image is stored in Image Pasting Data Storage Area 20617c4 (S3). The document with the pasted image is displayed on LCD 201 (FIG. 1) thereafter (S4).

Paragraph [0119]—This Paragraph [0119] illustrates the sequence of the software program stored in Font Formatting Software 20617b5. One or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617c5 (Paragraph [0114]) (S3), and replaces the alphanumeric data selected in S1 with the font formatting data retrieved in S3 (S4). The document with the replaced font formatting data is displayed on LCD 201 thereafter (S5).

Paragraph [0120]—This Paragraph [0120] illustrates the sequence of the software program stored in Spell Check Software 20617b6. CPU 211 (FIG. 1) scans all alphanumeric data in a document (S1). CPU 211 then compares the alphanumeric data with the spell check data stored in Spell Check Data Storage Area 20617c6 (Paragraph [0114]), i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4).

Paragraph [0121]—This Paragraph [0121] illustrates the sequence of the software program stored in Underlining Software 20617b7. One or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617c7 (Paragraph [0114]) (S3), and adds to the alphanumeric data selected in S1 (S4). The document with underlines added to the selected alphanumeric data is displayed on LCD 201 thereafter (S5).

Paragraph [0122]—This Paragraph [0122] illustrates the sequence of the software program stored in Page Numbering Software 20617b8. A page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617c8 (Paragraph [0114]), and adds the page number to each page of a document at the selected location (S3). The document with page numbers is displayed on LCD 201 thereafter (S4).

Paragraph [0123]—This Paragraph [0123] illustrates the sequence of the software program stored in Bullets And Numbering Software 20617b9. A Paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the Paragraph selected in S1 and the type of the bullets and/or numbering in Bullets And Numbering Data Storage Area 20617c9 (Paragraph [0114]), and adds the bullets and/or numbering to the selected Paragraph of a document (S3). The document with the bullets and/or numbering is displayed on LCD 201 thereafter (S4).

Paragraph [0124]—<<TV Remote Controller Function>>

Paragraph [0125]—Paragraph [0126] through Paragraph [0146] illustrate the TV remote controller function which enables Communication Device 200 to be utilized as a TV remote controller.

Paragraph [0126]—This Paragraph [0126] illustrates the connection between Communication Device 200 and TV 802. Communication Device 200 is connected in a wireless fashion to Network NT, such as the Internet, and Network NT is connected to TV 802 in a wireless fashion. Communication Device 200 may be connected to TV 802 via one or more of artificial satellites, for example, in the manner described in Paragraph [0022], Paragraph [0023], and Paragraph [0024]. Communication Device 200 may also be connected to TV 802 via Sub-host as described in Paragraph [0105].

Paragraph [0127]—This Paragraph [0127] illustrates another embodiment of connecting Communication Device 200 with TV 802. Communication Device 200 may directly connect to TV 802 in a wireless fashion. Here, Communication Device 200 may utilize Antenna 218 (FIG. 1) and/or LED 219 as described in Paragraph [0132] hereinafter to be connected with TV 802 in a wireless fashion.

Paragraph [0128]—This Paragraph [0128] illustrates the connection between Communication Device 200 and TV Server TVS. Communication Device 200 is connected in a wireless fashion to Network NT, such as the Internet, and Network NT is connected to TV Server TVS in a wireless fashion. Communication Device 200 may be connected to TV Server TVS via one or more of artificial satellites and/or TV Server TVS may be carried by an artificial satellite, for example, in the manner described in Paragraph [0022], Paragraph [0023], and Paragraph [0024].

Paragraph [0129]—This Paragraph [0129] illustrates the data stored in TV Server TVS (Paragraph [0128]). TV Server TVS includes TV Program Information Storage Area H18b of which the details are explained in Paragraph [0130] hereinafter, and TV Program Listing Storage Area H18c of which the details are explained in Paragraph [0131] hereinafter.

Paragraph [0130]—This Paragraph [0130] illustrates the data stored in TV Program Information Storage Area H18b (Paragraph [0129]). TV Program Information Storage Area H18b includes five types of data: 'CH', 'Title', 'Sum', 'Start', 'Stop', and 'Cat'. Here, 'CH' represents the channel number of the TV programs available on TV 802 (Paragraph [0127]); 'Title' represents the title of each TV program; 'Sum' represents the summary of each TV program; 'Start' represents the starting time of each TV program; 'Stop' represents the ending time of each TV program, and 'Cat' represents the category to which each TV program pertains.

Paragraph [0131]—This Paragraph [0131] illustrates the data stored in TV Program Listing Storage Area H18c (Paragraph [0129]). TV Program Listing Storage Area H18c includes four types of data: 'CH', 'Title', 'Start', and 'Stop'. Here, 'CH' represents the channel number of the TV programs available on TV 802 (Paragraph [0127]); 'Title' represents the title of each TV program; 'Start' represents the starting time of each TV program; and 'Stop' represents the ending time of each TV program. The data stored in TV Program Listing Storage Area H18c are designed to be 'clipped' and to be displayed on LCD 201 (FIG. 1) of Communication Device 200 in the manner described in Paragraph [0141] and Paragraph [0143]. As another embodiment, TV Program Listing Storage Area H 18c may be combined with TV Program Information Storage Area H18b (Paragraph [0130]) and extract the data of 'CH', 'Title', 'Start', and 'Stop' therefrom.

Paragraph [0132]—This Paragraph [0132] illustrates the elements of Communication Device 200. The elements of Communication Device 200 is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this Paragraph [0132] in this specification.

Paragraph [0133]—This Paragraph [0133] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in Paragraph [0127], and the TV remote controller function is activated (S3c) when the TV remote controller function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0134]—This Paragraph [0134] illustrates the data stored in RAM 206 (FIG. 1). The data to activate (as described in S3a of the previous Paragraph) and to perform the communication mode is stored in Communication Data Storage Area 2061a, the data to activate (as described in S3b of the previous Paragraph) and to perform the game download mode and the game play mode are stored in Game DL/Play Data Storage Area 2061b/2061c of which the details are described in Paragraph [0128], and the data to activate (as described in S3c of the previous Paragraph) and to perform the TV remote controller function is stored in TV Remote Controller Information Storage Area 20618a.

Paragraph [0135]—This Paragraph [0135] illustrates the data stored in TV Remote Controller Information Storage Area 20618a. TV Remote Controller Information Storage Area 20618a includes TV Remote Controller Software Storage Area 20618b and TV Remote Controller Data Storage Area 20618c. TV Remote Controller Software Storage Area 20618b stores a plurality of software programs to implement the present function, such as the ones described in Paragraph [0138], Paragraph [0140], Paragraph [0142], Paragraph [0144], and Paragraph [0146], and TV Remote Controller Data Storage Area 20618c stores a plurality of data to implement the present function such as the ones described in Paragraph [0136] hereinafter.

Paragraph [0136]—This Paragraph [0136] illustrates the data stored in TV Remote Controller Data Storage Area 20618c (Paragraph [0135]). TV Remote Controller Data Storage Area 20618c includes, Channel List Data Storage Area 20618c1, TV Program Information Storage Area 20618c2, and TV Program Listing Storage Area 20618c3. Channel list Data Storage Area 20618c1 stores a list of channel numbers available on TV 802 (Paragraph [0127]). TV Program Information Storage Area 20618c2 stores the data transferred from TV Program Information Storage Area H18b of TV Server TVS (Paragraph [0129]). The data stored in TV Program Information Storage Area 20618c2 is identical to the ones stored in TV Program Information Storage Area H18b or may be the portion thereof. TV Program Listing Storage Area 20618c3 stores the data transferred from TV Program Listing Storage Area H18c of TV Server TVS. The data stored in TV Program Listing Storage Area 20618c3 is identical to the ones stored in TV Program Listing Storage Area H18c or may be the portion thereof.

Paragraph [0137]—This Paragraph [0137] illustrates the Channel Numbers 20118a displayed on LCD 201 (Paragraph [0132]). Ten channel numbers are displayed on LCD 201, i.e., channel numbers '1' through '10'. The highlighted Channel Number 20118a is the one which is currently displayed on TV 802 (Paragraph [0127]). In the present example, channel number 20188a '4' is highlighted, therefore, Channel 4 is currently shown on TV 802.

Paragraph [0138]—This Paragraph [0138] illustrates one of the software programs stored in TV Remote Controller Software Storage Area 20618b (Paragraph [0135]) to display and select Channel Number 20118a (Paragraph [0137]). CPU 211 (Paragraph [0132]) displays a channel list comprising a plurality of Channel Numbers 20118a on LCD 201 (Paragraph [0132]) (S1). In the example described in Paragraph [0136], ten channel numbers are displayed on LCD 201, i.e., channel numbers '1' through '10'. The user of Communication Device 200 inputs a channel selecting signal by utilizing Input Device 210 (Paragraph [0132]) or via voice recognition system (S2). CPU 211 highlights the selected channel in the manner described in Paragraph [0137] (S3), and sends to TV 802 (Paragraph [0127]) via LED 209 in a wireless fashion the TV channel signal (S4). The TV program of Channel 4 is displayed on TV 802 (Paragraph [0127]) thereafter.

Paragraph [0139]—This Paragraph [0139] illustrates TV Program Information 20118c displayed on LCD 201 (Paragraph [0132]). When the user of Communication Device 200 inputs a specific signal utilizing Input Device 210 (Paragraph [0132]) or via voice recognition system, TV Program Information 20118c currently shown on Channel Number 20118b selected in S2 of Paragraph [0138] is displayed on LCD 201.

TV Program Information 20118*c* includes Channel Number 20118*b*, 'Title', 'Summary', 'Start Time', 'Stop Time', and 'Category'. Here, Channel Number 20118*b* represents the channel number of the TV program currently shown on Channel Number 20118*b* (i.e., the channel number selected in S2 of Paragraph [0138]), 'Title' represents the title of the TV program currently shown on Channel Number 20118*b*, 'Summary' represents the summary of the TV program currently shown on Channel Number 20118*b*, 'Start Time' represents the starting time of the TV program currently shown on Channel Number 20118*b*, 'Stop Time' represents the ending time of the TV program currently shown on Channel Number 20118*b*, and 'Category' represents the category to which the TV program currently shown on Channel Number 20118*b* pertains.

Paragraph [0140]—This Paragraph [0140] illustrates one of the software programs stored in TV Remote Controller Software Storage Area 20618*b* (Paragraph [0135]) which displays TV Program Information 20118*c* (Paragraph [0139]) on LCD 201 (Paragraph [0132]). When the user of Communication Device 200 selects the TV program information display mode by utilizing Input Device 210 (Paragraph [0132]) or via voice recognition system (S1), CPU 211 (Paragraph [0132]) accesses TV Server TVS (Paragraph [0128]) and retrieves the data (i.e., 'Title', 'Summary', 'Start Time', 'Stop Time', and 'Category' described in Paragraph [0139]) of TV program currently shown on Channel Number 20118*b* (Paragraph [0139]) from TV Program Information Storage Area H18*b* (Paragraph [0130]) (S2), and displays as TV Program Information 20118*c* on LCD 201 as described in Paragraph [0139] (S3). TV Program Information 20118*c* may be web-based.

Paragraph [0141]—This Paragraph [0141] illustrates TV Program Listing 20118*d* displayed on LCD 201 (FIG. 1). 'PRn' represents a title of a TV program, and 'CHn' represents Channel Number 20118*a*. TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on Channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (Paragraph [0132]) is selected by way of moving the cursor displayed thereon by utilizing Input Device 210 (Paragraph [0132]) or via voice recognition system. In the present example, the cursor is located on TV Program Pr 2.

Paragraph [0142]—This Paragraph [0142] illustrates one of the software programs stored in TV Remote Controller Software Storage Area 20618*b* (Paragraph [0135]) which displays TV Program Listing 20118*d* (Paragraph [0141]) on LCD 201 (Paragraph [0132]). When the user of Communication Device 200 selects TV program listing display mode by utilizing Input Device 210 (Paragraph [0132]) or via voice recognition system (S1), CPU 211 (Paragraph [0132]) accesses TV Server TVS (Paragraph [0128]) and retrieves data (i.e., 'Title', 'Start Time', and 'Stop Time') from TV Program Listing Storage Area H18*c* (Paragraph [0131]) (S2), and displays TV Program Listing 20118*d* (Paragraph [0141]) on LCD 201 (S3). TV Program Listing 20118*d* may be web-based.

Paragraph [0143]—This Paragraph [0143] illustrates TV Program Listing 20118*d* displayed on LCD 201 (FIG. 1) which enables to display TV Program Information 20118*c* of a selected TV program described in Paragraph [0145] hereinafter. 'PRn' represents a title of a TV program, and 'CHn' represents Channel Number 20118*a*. Referring to the example described in Paragraph [0141], TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 1) is selected by way of utilizing the cursor displayed thereon. The cursor can be moved from one TV program to another one by utilizing Input Device 210 (Paragraph [0132]) or via voice recognition system. In the present example, the cursor located on Pr 2 (as described in Paragraph [0141]) is moved to Pr4.

Paragraph [0144]—This Paragraph [0144] illustrates the sequence of displaying TV Program Information 20118*c* (Paragraph [0145]) from TV Program Listing 20118*d* (Paragraph [0143]). First, CPU 211 (Paragraph [0132]) displays TV Program Listing 20118*d* (Paragraph [0143]) on LCD 201 (Paragraph [0132]) (S1). Next, the user of Communication Device 200 selects one of the TV programs listed in TV Program Listing 20118*d* by moving the cursor displayed on LCD 201 (S2). CPU 211 sends via Antenna 218 (Paragraph [0132]) to TV Server TVS (Paragraph [0128]) a TV program information request signal indicating TV Server TVS to send TV Program Information 20118*c* of the selected TV program (S3). CPU 211 retrieves TV Program Information 20118*c* from TV Server TVS via Antenna 218 (S4), and displays on LCD 201 thereafter as described in Paragraph [0145] (S5).

Paragraph [0145]—This Paragraph [0145] illustrates TV Program Information 20118*c* displayed on LCD 201 (Paragraph [0132]) which is retrieved in S4 of Paragraph [0144] hereinbefore. TV Program Information 20118*c* includes Channel Number 20118*b*, 'Title', 'Summary', 'Start Time', 'Stop Time', and 'Category'. Here, Channel Number 20118*b* represents the channel number of the TV program selected in S2 of Paragraph [0144], 'Title' represents the title of the TV program selected in S2 of Paragraph [0144], 'Summary' represents the summary of the TV program selected in S2 of Paragraph [0144], 'Start Time' represents the starting time of the TV program selected in S2 of Paragraph [0144], 'Stop Time' represents the ending time of the TV program selected in S2 of Paragraph [0144], and 'Category' represents the category to which the TV program selected in S2 of Paragraph [0144] pertains.

Paragraph [0146]—This Paragraph [0146] illustrates another embodiment of the method to display Channel Number 20118*a*. Instead of displaying all the available Channel Numbers 20118*a* as described in Paragraph [0137], only Channel Number 20118*a* currently shown on TV 802 (Paragraph [0127]) may be displayed on LCD 201 (Paragraph [0132]), Channel Number 20118*a* '4' in the present example.

Paragraph [0147]—<<Start Up Software Function>>

Paragraph [0148]—Paragraph [0149] through Paragraph [0158] illustrate the start up software program function which enables Communication Device 200 to automatically activate (or start up) the registered software programs when the power is on.

Paragraph [0149]—This Paragraph [0149] illustrates the overall sequence of the present function. The user of Communication Device 200 presses the power button of Communication Device 200 (S1). Then the predetermined software programs automatically activate (or start up) without having any instructions from the user of Communication Device 200 (S2).

Paragraph [0150]—This Paragraph [0150] illustrates the storage area included RAM 206 (FIG. 1). RAM 206 includes Start Up Information Storage Area 20621a which is described in Paragraph [0151] hereinafter.

Paragraph [0151]—This Paragraph [0151] illustrates the storage areas included in Start Up Information Storage Area 20621a (Paragraph [0150]). Start Up Information Storage Area 20621a includes Start Up Software Storage Area 20621b and Start Up Data Storage Area 20621c. Start Up Software Storage Area 20621b stores the software programs necessary to implement the present function, such as the ones described in Paragraph [0152] hereinafter. Start Up Data Storage Area 20621c stores the data necessary to implement the present function, such as the ones described in Paragraph [0154] hereinafter.

Paragraph [0152]—This Paragraph [0152] illustrates the software programs stored in Start Up Software Storage Area 20621b (Paragraph [0151]). Start Up Software Storage Area 20621b stores Power On Detecting Software 20621b1, Start Up Data Storage Area Scanning Software 20621b2, and Start Up Software Activating Software 20621b3. Power On Detecting Software 20621b1 detects whether the power of Communication Device 200 is on of which the sequence is described in Paragraph [0155] hereinafter, Start Up Data Storage Area Scanning Software 20621b2 identifies the software programs which are automatically activated of which the sequence is described in Paragraph [0156] hereinafter, and Start Up Software Activating Software 20621b3 activates the identified software programs identified by Start Up Data Storage Area Scanning Software 20621b2 of which the sequence is described in Paragraph [0157] hereinafter.

Paragraph [0153]—This Paragraph [0153] illustrates the storage area, included in Start Up Data Storage Area 20621c (Paragraph [0151]). Start Up Data Storage Area 20621c includes Start Up Software Index Storage Area 20621c1. Here, Start Up Software Index Storage Area 20621c1 stores the software program indexes, wherein a software program index is an unique information assigned to each software program as an identifier (e.g., title of a software program) of which the details are explained in Paragraph [0154] hereinafter.

Paragraph [0154]—This Paragraph [0154] illustrates the data stored in Start Up Software Index Storage Area 20621c1 (Paragraph [0153]). Start Up Software Index Storage Area 20621c1 stores the software program indexes of the software programs which are automatically activated by the present function. Here, the software programs may be any software programs explained in this specification. Three software program indexes, i.e., Start Up Software Index 20621c1a, Start Up Software Index 20621c1b, and Start Up Software Index 20621c1c, are stored in Start Up Software Index Storage Area 20621c1 in the present example. The software program indexes can be created and store in Start Up Software Index Storage Area 20621c1 manually by utilizing input device 210 (FIG. 1) or via voice recognition system.

Paragraph [0155]—This Paragraph [0155] illustrates the sequence of Power On Detecting Software 20621b1 stored in Start Up Software Storage Area 20621b (Paragraph [0152]). CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621b2 (Paragraph [0152]) of which the sequence is explained in Paragraph [0156] hereinafter.

Paragraph [0156]—This Paragraph [0156] illustrates the sequence of Start Up Data Storage Area Scanning Software 20621b2 stored in Start Up Software Storage Area 20621b (Paragraph [0152]). CPU 211 (FIG. 1) scans Start Up Software Index Storage Area 20621c1 (Paragraph [0154]) (S1), and identifies the software programs which are automatically activated (S2). CPU 211 activates Start Up Software Activating Software 20621b3 (Paragraph [0152]) thereafter of which the sequence is explained in Paragraph [0157] hereinafter (S3).

Paragraph [0157]—This Paragraph [0157] illustrates the sequence of Start Up Software Activating Software 20621b3 stored in Start Up Software Storage Area 20621b (Paragraph [0152]). CPU 211 (FIG. 1) activates the software programs of which the software program indexes are identified in S2 of Paragraph [0156] hereinbefore (S1).

Paragraph [0158]—This Paragraph [0158] illustrates another embodiment wherein the three software programs stored in Start Up Software Storage Area 20621b (Paragraph [0152]) (i.e., Power On Detecting Software 20621b1, Start Up Data Storage Area Scanning Software 20621b2, Start Up Software Activating Software 20621b3) is integrated into one software program stored therein. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621c1 (Paragraph [0153]) (S3), and identifies the software programs which are automatically activated (S4). CPU 211 activates the software programs thereafter of which the software program indexes are identified in S4 (S5).

Paragraph [0159]—As another embodiment, the software programs per se (not the software program indexes as described in Paragraph [0154]) may be stored in a specific storage area which are activated by the present function.

Paragraph [0160]—As another embodiment, the present function may be implemented at the time the user of Communication Device 200 logs on instead of at the time the Communication Device 200 is powered as described in S2 of Paragraph [0155].

Paragraph [0161]—<<Stereo Audio Data Output Function>>

Paragraph [0162]—Paragraph [0163] through Paragraph [0175] illustrate the stereo audio data output function which enables Communication Device 200 to output audio data from Speakers 216L and 216R (Paragraph [0319]) in a stereo fashion.

Paragraph [0163]—This Paragraph [0163] illustrates the storage area included in Host Data Storage Area H00c (Paragraph [0277]) of Host H (Paragraph [0025]). As described in Paragraph [0163], Host Data Storage Area H00c includes Stereo Audio Information Storage Area H22a. Stereo Audio Information Storage Area H22a stores the software programs and data necessary to implement the present function as described in details hereinafter.

Paragraph [0164]—This Paragraph [0164] illustrates the storage areas included in Stereo Audio Information Storage Area H22a (Paragraph [0163]). As described in Paragraph [0164], Stereo Audio Information Storage Area H22a includes Stereo Audio Software Storage Area H22b and Stereo Audio Data Storage Area H22c. Stereo Audio Software Storage Area H22b stores the software programs necessary to implement the present function, such as the one described in Paragraph [0167] hereinafter. Stereo Audio Data Storage Area H22c stores the data necessary to implement the present function, such as the ones described in Paragraph [0165] hereinafter.

Paragraph [0165]—This Paragraph [0165] illustrates the stereo audio data stored in Stereo Audio Data Storage Area H22c (Paragraph [0164]). A plurality of stereo audio data are stored in Stereo Audio Data Storage Area H22c. In the example described in Paragraph [0165], three stereo audio data, i.e., Stereo Audio Data H22c1, Stereo Audio Data H22c2, and Stereo Audio Data H22c3 are stored therein.

Paragraph [0166]—This Paragraph [0166] illustrates the components of the stereo audio data stored in Stereo Audio Data Storage Area H22c (Paragraph [0165]). Paragraph [0166] describes the components of Stereo Audio Data H22c1 (Paragraph [0165]) as an example. As described in Paragraph [0166], Stereo Audio Data H22c1 includes Left Speaker Audio Data H22c1L, Right Speaker Audio Data H22c1R, and Stereo Audio Data Output Timing Data H22c1T. Left Speaker Audio Data H22c1L is an audio data which is designed to be output from Speaker 216L (Paragraph [0319]). Right Speaker Audio Data H22c1R is an audio data which is designed to be output from Speaker 2168 (Paragraph [0319]). Stereo Audio Data Output Timing Data H22c1T is a timing data which is utilized to synchronize the output of both Left Speaker Audio Data H22c1L and Right Speaker Audio Data H22c1R from Speaker 216R and Speaker 216L respectively.

Paragraph [0167]—This Paragraph [0167] illustrates the sequence of the software program stored in Stereo Audio Software Storage Area H22b (Paragraph [0164]). Referring to Paragraph [0167], the software program stored in Stereo Audio Software Storage Area. H22b extracts one of the stereo audio data stored in Stereo Audio Data Storage Area H22c (Paragraph [0165]) and creates Transferred Stereo Audio Data TSAD for purposes of transferring the extracted stereo audio data to Communication Device 200 (S1).

Paragraph [0168]—This Paragraph [0168] illustrates the components of Transferred Stereo Audio Data TSAD created by the software program stored in Stereo Audio Software Storage Area H22b (Paragraph [0167]). As described in Paragraph [0168], Transferred Stereo Audio Data TSAD is composed of Header TSAD1, Com Device ID TSAD2, Host ID TSAD3, Transferred Stereo Audio Data TSAD4, and Footer TSAD5. Corn Device ID TSAD2 indicates the identification of Communication Device 200, Host ID TSAD3 indicates the identification of Host H (Paragraph [0025]), and Transferred Stereo Audio Data TSAD4 is the stereo audio data extracted in the manner described in Paragraph [0167]. Header TSAD1 and Footer TSAD5 indicate the beginning and the end of Transferred Stereo Audio Data TSAD.

Paragraph [0169]—This Paragraph [0169] illustrates the storage area included in RAM 206 (FIG. 1) of Communication Device 200 (Paragraph [0025]). As described in Paragraph [0169], RAM 206 includes Stereo Audio Information Storage Area 20622a. Stereo Audio Information Storage Area 20622a stores the software programs and data necessary to implement the present function as described in details hereinafter.

Paragraph [0170]—This Paragraph [0170] illustrates the storage areas included in Stereo Audio Information Storage Area 20622a (Paragraph [0169]). As described in Paragraph [0170], Stereo Audio Information Storage Area 20622a includes Stereo Audio Software Storage Area 20622b and Stereo Audio Data Storage Area 20622c. Stereo Audio Software Storage Area 20622b stores the software programs necessary to implement the present function, such as the ones described in Paragraph [0174] and Paragraph [0175] hereinafter. Stereo Audio Data Storage Area 20622c stores the data necessary to implement the present function, such as the ones described in Paragraph [0171] hereinafter.

Paragraph [0171]—This Paragraph [0171] illustrates the stereo audio data stored in Stereo Audio Data Storage Area 20622c (Paragraph [0170]). A plurality of stereo audio data are stored in Stereo Audio Data Storage Area 20622c. In the example described in Paragraph [0171], three stereo audio data, i.e., Stereo Audio Data 20622c1, Stereo Audio Data 20622c2, and Stereo Audio Data 20622c3 are stored therein.

Paragraph [0172]—This Paragraph [0172] illustrates the components of the stereo audio data stored in Stereo Audio Data Storage Area 20622c (Paragraph [0171]). Paragraph describes the components of Stereo Audio Data 20622c1 (Paragraph [0171]) as an example. As described in Paragraph [0172], Stereo Audio Data 20622c1 includes Left Speaker Audio Data 20622c1L, Right Speaker Audio Data 20622c1R, and Stereo Audio Data Output Timing Data 20622c1T. Left Speaker Audio Data 20622c1L is an audio data which is designed to be output from Speaker 216L (Paragraph [0319]). Right Speaker Audio Data 20622c1R is an audio data which is designed to be output from Speaker 216R (Paragraph [0319]). Stereo Audio Data Output Timing Data 20622c1T is a timing data which is utilized to synchronize the output of both Left Speaker Audio Data 20622c1L and Right Speaker Audio Data 20622c1R from Speaker 216R and Speaker 216L respectively.

Paragraph [0173]—With regard to the process of selecting and downloading the stereo audio data to Communication Device 200, the concept illustrated in Paragraph [0592] through Paragraph [0598] applies hereto. The downloaded stereo audio data are stored in specific area(s) of Stereo Audio Data Storage Area 20622c (Paragraph [0171]).

Paragraph [0174]—This Paragraph [0174] illustrates the sequence of selecting and preparing to output the stereo audio data from Speakers 216L and 216R (Paragraph [0319]) in a stereo fashion. As described in Paragraph [0174], a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622c1 is selected (Paragraph [0171]) in S2, CPU 211 (FIG. 1) retrieves Left Speaker Audio Data 20622c1L (S3), Right Speaker Audio Data 20622c1R (S4), and Stereo Audio Data Output Timing Data 20622c1T from Stereo Audio Data Storage Area 20622c (Paragraph [0171]) (S5).

Paragraph [0175]—This Paragraph [0175] illustrates the sequence of outputting the stereo audio data from Speakers 216L and 216R (Paragraph [0319]) in a stereo fashion. As described in Paragraph [0175], the user of Communication Device 200 inputs a specific signal to output the stereo audio data by utilizing Input Device 210 (FIG. 1) or via voice recognition system (S1). Assuming Audio Data 20622c1 (Paragraph [0171]) is selected in S2 of Paragraph [0174], CPU 211 outputs Left Speaker Audio Data 20622c1L (Paragraph [0172]) and Right Speaker Audio Data 20622c1R (Paragraph [0172]) from Speakers 216L and 216R respectively in a stereo fashion in accordance with Stereo Audio Data Output Timing Data 20622c1T (Paragraph [0172]) (S2).

Paragraph [0176]—<<SOS Calling Function>>

Paragraph [0177]—Paragraph [0178] through Paragraph [0190] illustrate the SOS calling function which enables Communication Device 200 to notify the police department the current location of Communication Device 200 and the personal information of the user of Communication 200 when a 911 call is dialed from Communication Device 200.

Paragraph [0178]—This Paragraph [0178] illustrates the storage area included in Host Information Storage Area H00a (Paragraph [0025]). Host Information Storage Area H00a includes SOS Calling Information Storage Area H29a of which the data stored therein are described in Paragraph [0179].

Paragraph [0179]—This Paragraph [0179] illustrates the storage areas included in SOS Calling Information Storage Area. H29a (Paragraph [0178]). SOS Calling Information Storage Area H29a includes SOS Calling Data Storage Area H29b and SOS Calling Software Storage Area H29c. SOS Calling Data Storage Area H29b stores the data necessary to implement the present function, such as the ones described in Paragraph [0180] and Paragraph [0181]. SOS Calling Software Storage Area H29c stores the software programs necessary to implement the present function, such as the ones described in Paragraph [0189] and Paragraph [0190].

Paragraph [0180]—This Paragraph [0180] illustrates the storage area included in SOS Calling Data Storage Area H29b (Paragraph [0179]). SOS Calling Data Storage Area H29b includes Police Department Location Data Storage Area H29b1 of which the data stored therein are described in Paragraph [0181].

Paragraph [0181]—This Paragraph [0181] illustrates the data stored in Police Department Location Data Storage Area H29b1 (Paragraph [0180]). Police Department Location Data Storage Area H29b1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the present example, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

Paragraph [0182]—The data and/or the software programs necessary to implement the present function on the side of Communication Device 200 as described hereinafter may be downloaded from Host H (Paragraph [0025]).

Paragraph [0183]—This Paragraph [0183] illustrates the storage area included in RAM 206 (FIG. 1) of Communication Device 200. RAM 206 includes SOS Calling Information Storage Area 20629a of which the details are described in Paragraph [0184].

Paragraph [0184]—This Paragraph [0184] illustrates the storage areas included in SOS Calling Information Storage Area 20629a (Paragraph [0183]). SOS Calling Information Storage Area 20629a includes SOS Calling Data Storage Area 20629b and SOS Calling Software Storage Area 20629c. SOS Calling Data Storage Area 20629b includes data necessary to implement the present function, such as the ones described in Paragraph [0185] and Paragraph [0186]. SOS Calling Software Storage Area 20629c stores the software programs necessary to implement the present function, such as the one described in Paragraph [0187].

Paragraph [0185]—This Paragraph [0185] illustrates storage areas included in SOS Calling Data Storage Area 20629b (Paragraph [0184]). SOS Calling Data Storage Area 20629b includes GPS Data Storage Area 20629b1 and User Data Storage Area 20629b2. GPS Data Storage Area 20629b1 stores the data regarding the current geographical location produced by the method so-called GPS as described hereinbefore. User Data Storage Area 20629b2 stores the data regarding the personal information of the user of Communication Device 200 as described in Paragraph [0186].

Paragraph [0186]—This Paragraph [0186] illustrates the data stored in User Data Storage Area 20629b2 (Paragraph [0185]). User Data Storage Area 20629b2 includes User Data 20629UD which includes data regarding the personal information of the user of Communication Device 200. In the present example, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

Paragraph [0187]—This Paragraph [0187] illustrates the software program stored in SOS Calling Software Storage Area 20629c (Paragraph [0184]). When the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629b1 (Paragraph [0185]) (S3). CPU 211 then retrieves User Data 20629UD from User Data Storage Area 20629b2 (Paragraph [0186]) and the GPS data from GPS Data Storage Area 20629b1 (Paragraph [0185]) (S4), and composes SOS Data 20629SOS therefrom (S5), which is sent thereafter to Host H (Paragraph [0025]) (S6).

Paragraph [0188]—This Paragraph [0188] illustrates the elements of SOS Data 20629SOS (Paragraph [0187]). SOS Data 20629SOS comprises Connection Request 20629CR, GPS Data 20629GD, and User Data 20629UD. Connection Request 20629CR represents a request to Host H (Paragraph [0025]) to forward the 911 call to a police department. GPS Data 20629GD is a data retrieved from GPS Data Storage Area 20629b1 (Paragraph [0186]) as described in S4 of Paragraph [0187]. User Data 20629UD is a data retrieved from User Data Storage Area 20629b2 (Paragraph [0186]) as described in S4 of Paragraph [0187].

Paragraph [0189]—This Paragraph [0189] illustrates the software program stored in SOS Calling Software Storage Area H29c (Paragraph [0179]) of Host H (Paragraph [0025]). Host H periodically checks the incoming call (S1). If the incoming call is SOS Data 20629SOS (Paragraph [0188]) (S2), Host H initiates the SOS calling process as described in Paragraph (S3).

Paragraph [0190]—This Paragraph [0190] illustrates the software program stored in SOS Calling Software Storage Area H29c (Paragraph [0179]) of Host H (Paragraph [0025]). Host H retrieves GPS Data 20629GD from SOS Data 20629SOS (Paragraph [0188]) (S1), and selects the closest police department by comparing GPS Data 20629GD and the data stored in column Location Data of Police Department Location Data Storage Area H29b1 (Paragraph [0181]) of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

Paragraph [0191]—As another embodiment, User Data 20629UD stored in User Data Storage Area 20629b2 (Paragraph [0186]) may be stored in SOS Calling Data Storage Area H29b (Paragraph [0179]) of Host H (Paragraph [0025]). In this embodiment, SOS Data 20629SOS (Paragraph [0187]) primarily comprises Connection Request 20629CR and GPS Data 20629GD, and User Data 20629UD is retrieved from SOS Calling Data Storage Area H29b of Host H, which is sent to the police department in S4 of Paragraph [0190].

Paragraph [0192]—<<Audiovisual Playback Function>>

Paragraph [0193]—Paragraph [0194] through Paragraph [0212] illustrate the audiovisual playback function which enables Communication Device 200 to playback audiovisual data, such as movies, soap operas, situation comedies, news, and any type of TV programs.

Paragraph [0194]—This Paragraph [0194] illustrates the information stored in RAM 206 (FIG. 1). RAM 206 includes Audiovisual Playback Information Storage Area 20632a of which the information stored therein are described in Paragraph [0196].

Paragraph [0195]—The data and/or the software programs necessary to implement the present function may be downloaded to Communication Device 200 from Host H (Paragraph [0025]) in the manner described in Paragraph [0592] through Paragraph [0598].

Paragraph [0196]—This Paragraph [0196] illustrates the data and software programs stored in Audiovisual Playback Information Storage Area 20632a (Paragraph [0194]). Audiovisual Playback Information Storage Area 20632a includes Audiovisual Playback Data Storage Area 20632b and Audiovisual Playback Software Storage Area 20632c. Audiovisual Playback Data Storage Area 20632b stores the data necessary to implement the present function, such as the ones described in Paragraph [0197] through Paragraph [0199]. Audiovisual Playback Software Storage Area 20632c stores the software programs necessary to implement the present function, such as the ones described in Paragraph [0200].

Paragraph [0197]—This Paragraph [0197] illustrates the data stored in Audiovisual Playback Data Storage Area 20632b (Paragraph [0196]). Audiovisual Playback Data Storage Area 20632b includes Audiovisual Data Storage Area 20632b1 and Message Data Storage Area 20632b2. Audiovisual Data Storage Area 20632b1 stores a plurality of audiovisual data described in Paragraph [0198]. Message Data Storage Area 20632b2 stores a plurality of message data described in Paragraph [0199].

Paragraph [0198]—This Paragraph [0198] illustrates the audiovisual data stored in Audiovisual Data Storage Area 20632b1 (Paragraph [0197]). Audiovisual Data Storage Area 20632b1 stores a plurality of audiovisual data wherein the audiovisual data stored therein in the present example are: Audiovisual Data 20632b1a, Audiovisual Data 20632b1b, Audiovisual Data 20632b1c, and Audiovisual Data 20632b1d, all of which are primarily composed of video data and audio data. Audiovisual Data 20632b1a is a movie, Audiovisual Data 20632b1b is a soap opera, Audiovisual Data 20632b1c is a situation comedy, Audiovisual Data 20632b1d is TV news in the present embodiment. As another embodiment, Audiovisual Data 20632b1d may be an audiovisual data taken via CCD Unit 214 (FIG. 1) and Microphone 215 (FIG. 1).

Paragraph [0199]—This Paragraph [0199] illustrates the data stored in Message Data Storage Area 20632b2 (Paragraph [0197]). Message Data Storage Area 20632b2 includes Start Message Text Data 20632b2a, Stop Message Text Data 20632b2b, Pause Message Text Data 20632b2c, Resume Message Text Data 20632b2c1, Slow Replay Message Text Data 20632b2d, Forward Message Text Data 20632b2e, Rewind Message Text Data 20632b2f, Next Message Text Data 20632b2g, and Previous Message Text Data 20632b2h. Start Message Text Data 20632b2a is a text data which is displayed on LCD 201 (FIG. 1) and which indicates that the playback of an audiovisual data is initiated. Stop Message Text Data 20632b2b is a text data which is displayed on LCD 201 and which indicates that the playback process of an audiovisual data is stopped. Pause Message Text Data 20632b2c is a text data which is displayed on LCD 201 and which indicates that the playback process of an audiovisual data is paused. Resume Message Text Data 20632b2c1 is a text data which is displayed on LCD 201 and which indicates that the playback process of an audiovisual data is resumed from the point it is paused. Slow Replay Message Text Data 20632b2d is a text data which is displayed on LCD 201 and which indicates that the playback process of an audiovisual data is implemented in a slow motion. Fast-Forward Message Text Data 20632b2e is a text data which is displayed on LCD 201 and which indicates that an audiovisual data is fast-forwarded. Fast-Rewind Message Text Data 20632b2f is a text data which is displayed on LCD 201 and which indicates that an audiovisual data is fast-rewinded. Next Message Text Data 20632b2g is a text data which is displayed on LCD 201 and which indicates that the playback process of the next audiovisual data stored in Audiovisual Data Storage Area 20632b1 (Paragraph [0198]) is initiated. Previous Message Text Data 20632b2h is a text data which is displayed on LCD 201 and which indicates that the playback process of the previous audiovisual data stored in Audiovisual Data Storage Area 20632b1 (Paragraph [0198]) is initiated.

Paragraph [0200]—This Paragraph [0200] illustrates the software programs stored in Audiovisual Playback Software Storage Area 20632c (Paragraph [0196]). Audiovisual Playback Software Storage Area 20632c includes Audiovisual Start Software 20632c1, Audiovisual Stop Software 20632c2, Audiovisual Pause Software 20632c3, Audiovisual Resume Software 20632c3a, Audiovisual Slow Replay Software 20632c4, Audiovisual Fast-Forward Software 20632c5, Audiovisual Fast-Rewind Software 20632c6, Audiovisual Next Software 20632c7, and Audiovisual Previous Software 20632c8. Audiovisual Start Software 20632c1 is a software program which initiates the playback process of an audiovisual data. Audiovisual Stop Software 20632c2 is a software program which stops the playback process of an audiovisual data. Audiovisual Pause Software 20632c3 is a software program which pauses the playback process of an audiovisual data. Audiovisual Resume Software 20632c3a is a software program which resumes the playback process of the audiovisual data from the point it is paused by Audiovisual Pause Software 20632c3. Audiovisual Slow Replay Software 20632c4 is a software program which implements the playback process of an audiovisual data in a slow motion. Audiovisual Fast-Forward Software 20632c5 is a software program which fast-forwards an audiovisual data. Audiovisual Fast-Rewind Software 20632c6 is a software program which fast-rewinds an audiovisual data. Audiovisual Next Software 20632c7 is a software program which initiates the playback process of the next audiovisual data stored in Audiovisual Data Storage Area 20632*b*1 (Paragraph [0198]). Audiovisual Previous Software 20632*c*8 is a software program which initiates the playback process of the previous audiovisual data stored in Audiovisual Data Storage Area 20632*b*1.

Paragraph [0201]—This Paragraph [0201] illustrates the messages displayed on LCD 201 (FIG. 1). Eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20632*b*2*a*, 'Stop' is Stop Message Text Data 20632*b*2*b*, 'Pause' is Pause Message Text Data 20632*b*2*c*, 'Resume' is Resume Message Text Data 20632*b*2*c*1, 'Slow Reply' is Slow Replay Message Text Data 20632*b*2*d*, 'Fast-Forward' is Fast-Forward Message Text Data 20632*b*2*e*, 'Fast-Rewind' is Fast-Rewind Message Text Data 20632*b*2*f*, 'Next' is Next Message Text Data 20632*b*2*g*, 'Previous' is Previous Message Text Data 20632*b*2*h* described in Paragraph hereinbefore.

Paragraph [0202]—This Paragraph [0202] illustrates Audiovisual Selecting Software 20632*c*9 stored in Audiovisual Playback Software Storage Area 20632*c* (Paragraph [0196]) in preparation of executing the software programs described in Paragraph [0204] through Paragraph [0212]. CPU 211 (FIG. 1) retrieves the identifications of the audiovisual data stored in Audiovisual Data Storage Area 20632*b*1 (Paragraph [0198]) (S1). CPU 211 then displays a list of the identifications on LCD 201 (FIG. 1) (S2). A particular audiovisual data is selected by utilizing Input Device 210 (FIG. 1) or via voice recognition system (S3).

Paragraph [0203]—Paragraph [0204] through Paragraph [0212] illustrates the software programs stored in Audiovisual Playback Software Storage Area 20632*c* (Paragraph [0196]). Nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 of Paragraph [0202]. The audiovisual stop signal indicates to stop the playback process of the audiovisual data selected in S3 of Paragraph [0202]. The audiovisual pause signal indicates to pause the playback process of the audiovisual data selected in S3 of Paragraph [0202]. The audiovisual resume signal indicates to resume the playback process of the audiovisual data selected in S3 of Paragraph [0202] from the point the audio data is paused. The audiovisual slow replay signal indicates to implement the playback process of the audiovisual data selected in S3 of Paragraph [0202] in a slow motion. The audiovisual fast-forward signal indicates to fast-forward the audiovisual data selected in S3 of Paragraph [0202]. The audiovisual fast-rewind signal indicates to fast-rewind the audiovisual data selected in S3 of Paragraph [0202]. The audiovisual next signal indicates to initiate the playback process of the next audiovisual data of the audiovisual data selected in S3 of Paragraph both of which are stored in Audiovisual Data Storage Area 20632*b*1 (Paragraph [0198]). The audiovisual previous signal indicates to initiate the playback process of the previous audiovisual data of the audiovisual data selected in S3 of Paragraph [0202] both of which are stored in Audiovisual Data Storage Area 20632*b*1.

Paragraph [0204]—This Paragraph [0204] illustrates Audiovisual Start Software 20632*c*1 stored in Audiovisual Playback Software Storage Area 20632*c* (Paragraph [0196]) which initiates the playback process of the audiovisual data selected in S3 of Paragraph [0202]. The audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 of Paragraph [0202] (S2), and retrieves Start Message Text Data 20632*b*2*a* from Message Data Storage Area 20632*b*2 (Paragraph [0197]) and displays the data on LCD 201 (FIG. 1) for a specified period of time (S3).

Paragraph [0205]—This Paragraph [0205] illustrates Audiovisual Stop Software 20632*c*2 stored in Audiovisual Playback Software Storage Area 20632*c* (Paragraph [0196]) which stops the playback process of the audiovisual data selected in S3 of Paragraph [0202]. The audiovisual stop signal is input by utilizing Input Device 210 (FIG. 1) or via voice recognition system (S1). CPU 211 (FIG. 1) then stops the playback process of the audiovisual data selected in S3 of Paragraph [0202] (S2), and retrieves Stop Message Text Data 20632*b*2*b* from Message Data Storage Area 20632*b*2 (Paragraph [0197]) and displays the data on LCD 201 (FIG. 1) for a specified period of time (S3).

Paragraph [0206]—This Paragraph [0206] illustrates Audiovisual Pause Software 20632*c*3 stored in Audiovisual Playback Software Storage Area 20632*c* (Paragraph [0196]) which pauses the playback process of the audiovisual data selected in S3 of Paragraph [0202]. The audiovisual pause signal is input by utilizing Input Device 210 (FIG. 1) or via voice recognition system (S1). CPU 211 (FIG. 1) then pauses the playback process of the audiovisual data selected in S3 of Paragraph [0202] (S2), and retrieves Pause Message Text Data 20632*b*2*c* from Message Data Storage Area 20632*b*2 (Paragraph [0197]) and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1).

Paragraph [0207]—This Paragraph [0207] illustrates Audiovisual Resume Software 20632*c*3*a* stored in Audiovisual Playback Software Storage Area 20632*c* (Paragraph [0196]) which resumes the playback process of the audiovisual data selected in S3 of Paragraph [0202] from the point the audiovisual data is paused in S2 of Paragraph [0206]. The audiovisual resume signal is input by utilizing Input Device 210 (FIG. 1) or via voice recognition system (S1). CPU 211 (FIG. 1) then resumes the playback process of the audiovisual data selected in S3 of Paragraph [0202] (S2) from the point it is paused in S2 of Paragraph [0206], and retrieves Resume Message Text Data 20632*b*2*c*1 from Message Data Storage Area 20632*b*2 (Paragraph [0197]) and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1).

Paragraph [0208]—This Paragraph [0208] illustrates Audiovisual Slow Replay Software 20632*c*4 stored in Audiovisual Playback Software Storage Area 20632*c* (Paragraph [0196]) which implements the playback process of the audiovisual data selected in S3 of Paragraph [0202] in a slow motion. The audiovisual slow replay signal is input by utilizing Input Device 210 (FIG. 1) or via voice recognition system (S1). CPU 211 (FIG. 1) then initiates the playback process of the audiovisual data selected in S3 of Paragraph [0202] in a slow motion (S2), and retrieves Slow Replay Message Text Data 20632*b*2*d* from Message Data Storage Area 20632*b*2 (Paragraph [0197]) and displays the data on LCD 201 (FIG. 1) for a specified period of time (S3).

Paragraph [0209] This Paragraph [0209] illustrates Audiovisual Fast-Forward Software 20632*c*5 stored in Audiovisual Playback Software Storage Area 20632*c* (Paragraph [0196]) which fast-forwards the audiovisual data selected in S3 of Paragraph [0202]. The audiovisual fast-forward signal is input by utilizing Input Device 210 (FIG. 1) or via voice recognition system (S1). CPU 211 (FIG. 1) then fast-forwards the audiovisual data selected in S3 of Paragraph [0202] (S2), and retrieves Fast-Forward Message Text Data 20632*b*2*e* from Message Data Storage Area 20632*b*2 (Paragraph [0197]) and displays the data on LCD 201 (FIG. 1) for a specified period of time (S3).

Paragraph [0210]—This Paragraph [0210] illustrates Audiovisual Fast-Rewind Software 20632*c*6 stored in Audiovisual Playback Software Storage Area 20632*c* (Paragraph [0196]) which fast-rewinds the audiovisual data selected in S3 of Paragraph [0202]. The audiovisual fast-rewind signal is input by utilizing Input Device 210 (FIG. 1) or via voice recognition system (S1). CPU 211 (FIG. 1) then fast-rewinds the audiovisual data selected in S3 of Paragraph [0202] (S2), and retrieves Fast-Rewind Message Text Data 20632*b*2*f* from Message Data Storage Area 20632*b*2 (Paragraph [0197]) and displays the data on LCD 201 (FIG. 1) for a specified period of time (S3).

Paragraph [0211]—This Paragraph [0211] illustrates Audiovisual Next Software 20632*c*7 stored in Audiovisual Playback Software Storage Area 20632*c* (Paragraph [0196]) which initiates the playback process of the next audiovisual data stored in Audiovisual Data Storage Area 20632*b*1 (Paragraph [0198]). The audiovisual next signal is input by utilizing Input Device 210 (FIG. 1) or via voice recognition system (S1). CPU 211 (FIG. 1) then initiates the playback process of the next audiovisual data of the audiovisual data selected in S3 of Paragraph both of which are stored in Audiovisual Data Storage Area 20632*b*1 (Paragraph [0198]) (S2), and retrieves Next Message Text Data 20632*b*2*g* from Message Data Storage Area 20632*b*2 (Paragraph [0197]) and displays the data on LCD 201 (FIG. 1) for a specified period of time (S3).

Paragraph [0212]—This Paragraph [0212] illustrates Audiovisual Previous Software 20632*c*8 is a software program which initiates the playback process of the previous audiovisual data stored in Audiovisual Data Storage Area 20632*b*1 (Paragraph [0198]). The audiovisual previous signal is input by utilizing Input Device 210 (FIG. 1) or via voice recognition system (S1). CPU 211 (FIG. 1) then initiates the playback process of the previous audiovisual data of the audiovisual data selected in S3 of Paragraph [0202] both of which are stored in Audiovisual Data Storage Area 20632*b*1 (Paragraph [0198]) (S2), and retrieves Previous Message Text Data 20632*b*2*h* from Message Data Storage Area 20632*b*2 (Paragraph [0197]) and displays the data on LCD 201 (FIG. 1) for a specified period of time (S3).

Paragraph [0213]—As another embodiment, the audiovisual data stored in Audiovisual Data Storage Area 20632*b*1 (Paragraph [0198]) may be stored in Host H (Paragraph [0025]) and retrieved therefrom when the software programs described in Paragraph [0204] through Paragraph [0212] are executed. In this embodiment, the audio data is temporarily stored in RAM 206 (FIG. 1) and is erased from the portion which is playbacked.

Paragraph [0214]—<<Audio Playback Function>>

Paragraph [0215]—Paragraph [0216] through Paragraph [0233] illustrate the audio playback function which enables Communication Device 200 to playback audio data, such as jazz music, rock music, classic music, pops music, and any other types of audio data.

Paragraph [0216]—This Paragraph [0216] illustrates the information stored in RAM 206 (FIG. 1). In this embodiment, RAM 206 includes Audio Playback Information Storage Area 20633*a* of which the information stored therein are described in Paragraph [0218].

Paragraph [0217]—The data and/or the software programs necessary to implement the present function may be downloaded to Communication Device 200 from Host H (Paragraph [0025]).

Paragraph [0218]—This Paragraph [0218] illustrates the data and software programs stored in Audio Playback Information Storage Area 20633*a* (Paragraph [0216]). In this embodiment, Audio Playback Information Storage Area 20633*a* includes Audio Playback Data Storage Area 20633*b* and Audio Playback Software Storage Area 20633*c*. Audio Playback Data Storage Area 20633*b* stores the data necessary to implement the present function, such as the ones described in Paragraph [0219] through Paragraph [0221]. Audio Playback Software Storage Area 20633*c* stores the software programs necessary to implement the present function, such as the ones described in Paragraph [0222].

Paragraph [0219]—This Paragraph [0219] illustrates the data stored in Audio Playback Data Storage Area 20633*b* (Paragraph [0218]). In this embodiment, Audio Playback Data Storage Area 20633*b* includes Audio Data Storage Area 20633*b*1 and Message Data Storage Area 20633*b*2. Audio Data Storage Area 20633*b*1 stores a plurality of audio data described in Paragraph [0220]. Message Data Storage Area 20633*b*2 stores a plurality of message data described in Paragraph [0221].

Paragraph [0220]—This Paragraph [0220] illustrates the audio data stored in Audio Data Storage Area 20633*b*1 (Paragraph [0219]). In this embodiment, Audio Data Storage Area 20633*b*1 stores a plurality of audio data wherein the audio data stored therein in the present example are: Audio Data 20633*b*1*a*, Audio Data 20633*b*1*b*, Audio Data 20633*b*1*c*, and Audio Data 20633*b*1*d*, all of which are primarily composed of video data and audio data. Audio Data 20633*b*1*a* is a jazz music, Audio Data 20633*b*1*b* is a rock music, Audio Data 20633*b*1*c* is a classic music, Audio Data 20633*b*1*d* is a pops music in the present embodiment. As another embodiment, Audio Data 20633*b*1*d* may be an audio data taken via CCD Unit 214 (FIG. 1) and Microphone 215 (FIG. 1).

Paragraph [0221]—This Paragraph [0221] illustrates the data stored in Message Data Storage Area 20633*b*2 (Paragraph [0219]). In this embodiment, Message Data Storage Area 20633*b*2 includes Start Message Text Data 20633*b*2*a*, Stop Message Text Data 20633*b*2*b*, Pause Message Text Data 20633*b*2*c*, Resume Message Text Data 20633*b*2*c*1, Slow Replay Message Text Data 20633*b*2*d*, Forward Message Text Data 20633*b*2*e*, Rewind Message Text Data 20633*b*2*f*, Next Message Text Data 20633*b*2*g*, and Previous Message Text Data 20633*b*2*h*. Start Message Text Data 20633*b*2*a* is a text data which is displayed on LCD 201 (FIG. 1) and which indicates that the playback of an audio data is initiated. Stop Message Text Data 20633*b*2*b* is a text data which is displayed on LCD 201 and which indicates that the playback process of an audio data is stopped. Pause Message Text Data 20633*b*2*c* is a text data which is displayed on LCD 201 and which indicates that the playback process of an audio data is paused. Resume Message Text Data 20633*b*2*c*1 is a text data which is displayed on LCD 201 and which indicates that the playback process of an audio data is resumed from the point it is paused. Slow Replay Message Text Data 20633*b*2*d* is a text data which is displayed on LCD 201 and which indicates that the playback process of an audio data is implemented in a slow motion. Fast-Forward Message Text Data 20633b2e is a text data which is displayed on LCD 201 and which indicates that an audio data is fast-forwarded. Fast-Rewind Message Text Data 20633b2f is a text data which is displayed on LCD 201 and which indicates that an audio data is fast-rewinded. Next Message Text Data 20633b2g is a text data which is displayed on LCD 201 and which indicates that the playback process of the next audio data stored in Audio Data Storage Area 20633b1 (Paragraph [0220]) is initiated. Previous Message Text Data 20633b2h is a text data which is displayed on LCD 201 and which indicates that the playback process of the previous audio data stored in Audio Data Storage Area 20633b1 (Paragraph [0220]) is initiated.

Paragraph [0222]—This Paragraph [0222] illustrates the software programs stored in Audio Playback Software Storage Area 20633c (Paragraph [0218]). In this embodiment, Audio Playback Software Storage Area 20633c includes Audio Start Software 20633c1, Audio Stop Software 20633c2, Audio Pause Software 20633c3, Audio Resume Software 20633c3a, Audio Slow Replay Software 20633c4, Audio Fast-Forward Software 20633c5, Audio Fast-Rewind Software 20633c6, Audio Next Software 20633c7, and Audio Previous Software 20633c8. Audio Start Software 20633c1 is a software program which initiates the playback process of an audio data. Audio Stop Software 20633c2 is a software program which stops the playback process of an audio data. Audio Pause Software 20633c3 is a software program which pauses the playback process of an audio data. Audio Resume Software 20633c3a is a software program which resumes the playback process of the audio data from the point it is paused by Audio Pause Software 20633c3. Audio Slow Replay Software 20633c4 is a software program which implements the playback process of an audio data in a slow motion. Audio Fast-Forward Software 20633c5 is a software program which fast-forwards an audio data. Audio Fast-Rewind Software 20633c6 is a software program which fast-rewinds an audio data. Audio Next Software 20633c7 is a software program which initiates the playback process of the next audio data stored in Audio Data Storage Area 20633b1 (Paragraph [0220]). Audio Previous Software 20633c8 is a software program which initiates the playback process of the previous audio data stored in Audio Data Storage Area 20633b1.

Paragraph [0223]—This Paragraph [0223] illustrates the messages displayed on LCD 201 (FIG. 1). In this embodiment, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20633b2a, 'Stop' is Stop Message Text Data 20633b2b, 'Pause' is Pause Message Text Data 20633b2c, 'Resume' is Resume Message Text Data 20633b2c1, 'Slow Reply' is Slow Replay Message Text Data 20633b2d, 'Fast-Forward' is Fast-Forward Message Text Data 20633b2e, 'Fast-Rewind' is Fast-Rewind Message Text Data 20633b2f, 'Next' is Next Message Text Data 20633b2g, 'Previous' is Previous Message Text Data 20633b2h described in Paragraph [0221] hereinbefore.

Paragraph [0224]—This Paragraph [0224] illustrates Audio Selecting Software 20633c9 stored in Audio Playback Software Storage Area 20633c (Paragraph [0218]) in preparation of executing the software programs described in Paragraph [0225] through Paragraph [0233]. Referring to Paragraph [0224], CPU 211 (FIG. 1) retrieves the identifications of the audio data stored in Audio Data Storage Area 20633b1 (Paragraph [0220]) (S1). CPU 211 then displays a list of the identifications on LCD 201 (FIG. 1) (S2). A particular audio data is selected by utilizing Input Device 210 (FIG. 1) or via voice recognition system (S3).

Paragraph [0225]—This Paragraph [0225] through Paragraph [0233] illustrates the software programs stored in Audio Playback Software Storage Area 20633c (Paragraph [0218]). As described in each drawing figure hereinafter, eight types of input signals can be input by utilizing Input Device 210 (FIG. 1) or via voice recognition system, i.e., the audio playback signal, the audio stop signal, the audio pause signal, the audio resume signal, the audio slow replay signal, the audio fast-forward signal, the audio fast-rewind signal, the audio next signal, and the audio previous signal. The audio playback signal indicates to initiate the playback process of the audio data selected in S3 of Paragraph [0224]. The audio stop signal indicates to stop the playback process of the audio data selected in S3 of Paragraph [0224]. The audio pause signal indicates to pause the playback process of the audio data selected in S3 of Paragraph [0224]. The audio resume signal indicates to resume the playback process of the audio data selected in S3 of Paragraph [0224] from the point the audio data is paused. The audio slow replay signal indicates to implement the playback process of the audio data selected in S3 of Paragraph [0224] in a slow motion. The audio fast-forward signal indicates to fast-forward the audio data selected in S3 of Paragraph [0224]. The audio fast-rewind signal indicates to fast-rewind the audio data selected in S3 of Paragraph [0224]. The audio next signal indicates to initiate the playback process of the next audio data of the audio data selected in S3 of Paragraph both of which are stored in Audio Data Storage Area 20633b1 (Paragraph [0220]). The audio previous signal indicates to initiate the playback process of the previous audio data of the audio data selected in S3 of Paragraph [0224] both of which are stored in Audio Data Storage Area 20633b1. This Paragraph [0225] illustrates Audio Start Software 20633c1 stored in Audio Playback Software Storage Area 20633c (Paragraph [0218]) which initiates the playback process of the audio data selected in S3 of Paragraph [0224]. In this embodiment, the audio playback signal is input by utilizing Input Device 210 (FIG. 1) or via voice recognition system (S1). CPU 211 (FIG. 1) then initiates the playback process (i.e., outputs the audio data from Speaker 216 (FIG. 1)) of the audio data selected in S3 of Paragraph [0224] (S2), and retrieves Start Message Text Data 20633b2a from Message Data Storage Area 20633b2 (Paragraph [0219]) and displays the data on LCD 201 (FIG. 1) for a specified period of time (S3).

Paragraph [0226]—This Paragraph [0226] illustrates Audio Stop Software 20633c2 stored in Audio Playback Software Storage Area 20633c (Paragraph [0218]) which stops the playback process of the audio data selected in S3 of Paragraph [0224]. In this embodiment, the audio stop signal is input by utilizing Input Device 210 (FIG. 1) or via voice recognition system (S1). CPU 211 (FIG. 1) then stops the playback process of the audio data selected in S3 of Paragraph [0224] (S2), and retrieves Stop Message Text Data 20633b2b from Message Data Storage Area 20633b2 (Paragraph [0219]) and displays the data on LCD 201 (FIG. 1) for a specified period of time (S3).

Paragraph [0227]—This Paragraph [0227] illustrates Audio Pause Software 20633c3 stored in Audio Playback Software Storage Area 20633c (Paragraph [0218]) which pauses the playback process of the audio data selected in S3 of Paragraph [0224]. In this embodiment, the audio pause signal is input by utilizing Input Device 210 (FIG. 1) or via voice recognition system (S1). CPU 211 (FIG. 1) then pauses the playback process of the audio data selected in S3 of Paragraph [0224] (S2), and retrieves Pause Message Text Data 20633*b*2*c* from Message Data Storage Area 20633*b*2 (Paragraph [0219]) and displays the data on LCD 201 (FIG. 1) for a specified period of time (S3) When the playback process is paused in S2, the audio data included in the audio data is refrained from being output from Speaker 216 (FIG. 1). Paragraph [0228]—This Paragraph [0228] illustrates Audio Resume Software 20633*c*3*a* stored in Audio Playback Software Storage Area 20633*c* (Paragraph [0218]) which resumes the playback process of the audio data selected in S3 of Paragraph [0224] from the point the audiovisual data is paused in S2 of Paragraph [0227]. In this embodiment, the audio resume signal is input by utilizing Input Device 210 (FIG. 1) or via voice recognition system (S1). CPU 211 (FIG. 1) then resumes the playback process of the audio data selected in S3 of Paragraph from the point the audiovisual data is paused in S2 of Paragraph [0227](S2), and retrieves Resume Message Text Data 20633*b*2*c*1 from Message Data Storage Area 20633*b*2 (Paragraph [0219]) and displays the data on LCD 201 (FIG. 1) for a specified period of time (S3).

Paragraph [0229]—This Paragraph [0229] illustrates Audio Slow Replay Software 20633*c*4 stored in Audio Playback Software Storage Area 20633*c* (Paragraph [0218]) which implements the playback process of the audio data selected in S3 of Paragraph [0224] in a slow motion. In this embodiment, the audio slow replay signal is input by utilizing Input Device 210 (FIG. 1) or via voice recognition system (S1). CPU 211 (FIG. 1) then initiates the playback process of the audio data selected in S3 of Paragraph [0224] in a slow motion (S2), and retrieves Slow Replay Message Text Data 20633*b*2*d* from Message Data Storage Area 20633*b*2 (Paragraph [0219]) and displays the data on LCD 201 (FIG. 1) for a specified period of time (S3). Paragraph [0230]—This Paragraph [0230] illustrates Audio Fast-Forward Software 20633*c*5 stored in Audio Playback Software Storage Area 20633*c* (Paragraph [0218]) which fast-forwards the audio data selected in S3 of Paragraph [0224]. In this embodiment, the audio fast-forward signal is input by utilizing Input Device 210 (FIG. 1) or via voice recognition system (S1). CPU 211 (FIG. 1) then fast-forwards the audio data selected in S3 of Paragraph [0224] (S2), and retrieves Fast-Forward Message Text Data 20633*b*2*e* from Message Data Storage Area 20633*b*2 (Paragraph [0219]) and displays the data on LCD 201 (FIG. 1) for a specified period of time (S3).

Paragraph [0231]—This Paragraph [0231] illustrates Audio Fast-Rewind Software 20633*c*6 stored in Audio Playback Software Storage Area 20633*c* (Paragraph [0218]) which fast-rewinds the audio data selected in S3 of Paragraph [0224]. In this embodiment, the audio fast-rewind signal is input by utilizing Input Device 210 (FIG. 1) or via voice recognition system (S1). CPU 211 (FIG. 1) then fast-rewinds the audio data selected in S3 of Paragraph [0224] (S2), and retrieves Fast-Rewind Message Text Data 20633*b*2*f* from Message Data Storage Area 20633*b*2 (Paragraph [0219]) and displays the data on LCD 201 (FIG. 1) for a specified period of time (S3).

Paragraph [0232]—This Paragraph [0232] illustrates Audio Next Software 20633*c*7 stored in Audio Playback Software Storage Area 20633*c* (Paragraph [0218]) which initiates the playback process of the next audio data stored in Audio Data Storage Area 20633*b*1 (Paragraph [0220]). In this embodiment, the audio next signal is input by utilizing Input Device 210 (FIG. 1) or via voice recognition system (S1). CPU 211 (FIG. 1) then initiates the playback process of the next audio data of the audio data selected in S3 of Paragraph [0224] both of which are stored in Audio Data Storage Area 20633*b*1 (Paragraph [0220]) (S2), and retrieves Next Message Text Data 20633*b*2*g* from Message Data Storage Area 20633*b*2 (Paragraph [0219]) and displays the data on LCD 201 (FIG. 1) for a specified period of time (S3).

Paragraph [0233]—This Paragraph [0233] illustrates Audio Previous Software 20633*c*8 is a software program which initiates the playback process of the previous audio data stored in Audio Data Storage Area 20633*b*1 (Paragraph [0220]). In this embodiment, the audio previous signal is input by utilizing Input Device 210 (FIG. 1) or via voice recognition system (S1). CPU 211 (FIG. 1) then initiates the playback process of the previous audio data of the audio data selected in S3 of Paragraph [0224] both of which are stored in Audio Data Storage Area 20633*b*1 (Paragraph [0220]) (S2), and retrieves Previous Message Text Data 20633*b*2*h* from Message Data Storage Area 20633*b*2 (Paragraph [0219]) and displays the data on LCD 201 (FIG. 1) for a specified period of time (S3).

Paragraph [0234]—As another embodiment, the audio data stored in Audio Data Storage Area 20633*b*1 (Paragraph [0220]) may be stored in Host H (Paragraph [0025]) and retrieved therefrom when the software programs described in Paragraph [0225] through Paragraph [0233] are executed. In this embodiment, the audio data is temporarily stored in RAM 206 (FIG. 1) and is erased from the portion which is playbacked.

Paragraph [0235]—<<Digital Camera Function>>

Paragraph [0236]—Paragraph [0237] through Paragraph [0256] illustrate the digital camera function which enables Communication Device 200 to take digital photos by utilizing CCD Unit 214 (FIG. 1).

Paragraph [0237]—This Paragraph [0237] illustrates the storage area included in RAM 206 (FIG. 1). In this embodiment, RAM 206 includes Digital Camera Information Storage Area 20646*a* of which the data and the software programs stored therein are described in Paragraph [0239].

Paragraph [0238]—The data and software programs stored in Digital Camera Information Storage Area 20646*a* (Paragraph [0237]) may be downloaded from Host H (Paragraph [0025]).

Paragraph [0239]—This Paragraph [0239] illustrates the storage areas included in Digital Camera Information Storage Area 20646*a* (Paragraph [0237]). In this embodiment, Digital Camera Information Storage Area 20646*a* includes Digital Camera Data Storage Area 20646*b* and Digital Camera Software Storage Area 20646*c*. Digital Camera Data Storage Area 20646*b* stores the data necessary to implement the present function, such as the ones described in Paragraph [0240] through Paragraph [0242]. Digital Camera Software Storage Area 20646*c* stores the software programs necessary to implement the present function, such as the ones described in Paragraph [0243].

Paragraph [0240]—This Paragraph [0240] illustrates the storage areas included in Digital Camera Data Storage Area 20646*b* (Paragraph [0239]). In this embodiment, Digital Camera Data Storage Area 20646*b* includes Photo Data Storage Area 20646*b*1 and Digital Camera Function Data Storage Area 20646*b*2. Photo Data Storage Area 20646*b*1 stores the data described in Paragraph [0241]. Digital Camera Function Data Storage Area 20646*b*2 stores the data stored in Paragraph [0242].

Paragraph [0241]—This Paragraph [0241] illustrates the data stored in Photo Data Storage Area 20646*b*1 (Paragraph [0240]). In this embodiment, Photo Data Storage Area 20646*b*1 comprises two columns, i.e., 'Photo ID' and 'Photo Data'. Column 'Photo ID' stores the identifications of the photo data, and column 'Photo Data' stores a plurality of photo data taken by implementing the present function. In the example described in the present drawing, Photo Data Storage Area 20646b1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

Paragraph [0242]—This Paragraph [0242] illustrates the storage areas included in Digital Camera Function Data Storage Area 20646b2 (Paragraph [0240]). In this embodiment, Digital Camera Function Data Storage Area 20646b2 includes Quality Data Storage Area 20646b2a, Multiple Photo Shooting Number Data Storage Area 20646b2b, and Strobe Data Storage Area 20646b2c. Quality Data Storage Area 20646b2a stores the data selected in S2 of Paragraph [0245]. Multiple Photo Shooting Number Data Storage Area 20646b2b stores the data selected in S2 of Paragraph [0246]. Strobe Data Storage Area 20646b2c stores the data selected in S2 of Paragraph [0247].

Paragraph [0243]—This Paragraph [0243] illustrates the software programs stored in Digital Camera Software Storage Area 20646c (Paragraph [0239]). In this embodiment, Digital Camera Software Storage Area 20646c stores Quality Selecting Software 20646c1, Multiple Photo Shooting Software 20646c2, Trimming Software 20646c3, Digital Zooming Software 20646c4, Strobe Software 20646c5, Digital Camera Function Selecting Software 20646c6, Multiple Photo Shooting Number Selecting Software 20646c7, Strobe On/Off Selecting Software 20646c8, Photo Data Shooting Software 20646c9, and Multiple Photo Shooting Software 20646c10. Quality Selecting Software 20646c1 is the software program described in Paragraph [0245]. Multiple Photo Shooting Software 20646c2 is the software program described in Paragraph [0249]. Trimming Software 20646c3 is the software program described in Paragraph [0256]. Digital Zooming Software 20646c4 is the software program described in Paragraph [0253]. Strobe Software 20646c5 is the software program described in Paragraph [0250]. Digital Camera Function Selecting Software 20646c6 is the software program described in Paragraph [0244]. Multiple Photo Shooting Number Selecting Software 20646c7 is the software program described in Paragraph [0246]. Strobe On/Off Selecting Software 20646c8 is the software program described in Paragraph [0247]. Photo Data Shooting Software 20646c9 is the software program described in Paragraph [0248].

Paragraph [0244]—This Paragraph [0244] illustrates Digital Camera Function Selecting Software 20646c6 stored in Digital Camera Software Storage Area 20646c (Paragraph [0243]) which administers the overall flow of displaying the functions and selecting the option for each function. In this embodiment, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646c1 described in Paragraph [0245] is activated when 'Quality' displayed on LCD 201 is selected in S2. Multiple Photo Shooting Number Selecting Software 20646c7 described in Paragraph [0246] is activated when 'Multiple Photo' is selected in S2. Strobe On/Off Selecting Software 20646c8 described in Paragraph [0247] is activated when 'Strobe' is selected in S2.

Paragraph [0245]—This Paragraph [0245] illustrates Quality Selecting Software 20646c1 stored in Digital Camera Software Storage Area 20646c (Paragraph [0243]) which selects the quality of the photo data taken by implementing the present function. In this embodiment, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646b2a (Paragraph [0242]) (S3).

Paragraph [0246]—This Paragraph [0246] illustrates Multiple Photo Shooting Number Selecting Software 20646c7 stored in Digital Camera Software Storage Area 20646c (Paragraph [0243]) which selects the number of photos taken by a single photo shooting signal. In this embodiment, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646b2b (Paragraph [0242]) (S3).

Paragraph [0247]—This Paragraph [0247] illustrates Strobe On/Off Selecting Software 20646c8 stored in Digital Camera Software Storage Area 20646c (Paragraph [0243]) which selects Flash Light Unit 220 (not shown) to be activated or not when a photo is taken. In this embodiment, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646b2c (Paragraph [0242]) (S3).

Paragraph [0248]—This Paragraph [0248] illustrates Photo Data Shooting Software 20646c9 stored in Digital Camera Software Storage Area 20646c (Paragraph [0243]) which takes photo(s) in accordance with the options selected in Paragraph [0245]. In this embodiment, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646b1 (Paragraph [0241]). CPU 211 then retrieves the quality data from Quality Data Storage Area 20646b2a (Paragraph [0242]) (S2). The photo data is input via CCD Unit 214 (S3), and the data is stored in Photo Data Storage Area 20646b1 (Paragraph [0241]) with new photo ID in accordance with the quality data retrieved in S2 (S4).

Paragraph [0249]—This Paragraph [0249] illustrates Multiple Photo Shooting Software 20646c2 stored in Digital Camera Software Storage Area 20646c (Paragraph [0243]) which takes photo(s) in accordance with the options selected in Paragraph [0246]. In this embodiment, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646b2b (Paragraph [0242]) (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

Paragraph [0250]—This Paragraph [0250] illustrates Strobe Software 20646c5 stored in Digital Camera Software Storage Area 20646c (Paragraph [0243]) which takes photo(s) in accordance with the options selected in Paragraph [0247]. In this embodiment, a photo shooting signal is input by utilizing Input Device 210 (FIG. 1) or via voice recognition system (S1). CPU 211 (FIG. 1) retrieves the strobe data from Strobe Data Storage Area 20646b2c (Paragraph [0242]) (S2). If the strobe data is 'On' (S3), CPU 211 activates Flash Light Unit 220 (not shown) each time a photo is taken (S4). In other words, Strobe Software 20646c5 is harmonized with Multiple Photo Shooting Software 20646c2 described in Paragraph [0249]. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activated for six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

Paragraph [0251]—This Paragraph [0251] illustrates one embodiment of the zooming function which zooms the photo data stored in Photo Data Storage Area 20646b1 (Paragraph [0241]). In this embodiment, a certain photo selected by the user of Communication Device 200 is displayed on LCD 201 (FIG. 1). Assuming that the user intends to zoom Object 20646Obj, the object displayed on LCD 201, to a larger size. The user selects Area 46ARa which includes Object 206460Obj by utilizing Input Device 210 (FIG. 1) or via voice recognition system, and the selected area is zoomed to fit the size of LCD 201. The zoomed photo is replaced with the original photo.

Paragraph [0252]—This Paragraph [0252] illustrates the operation performed in RAM 206 (FIG. 1) to implement the zooming function described in Paragraph [0251]. A certain photo data selected by the user of Communication Device 200 is stored in Area 20646ARa of RAM 206. Here, the size of the photo data is as same as that of Area 20646ARa. In this embodiment, Display Area 20646DA is the area which is displayed on LCD 201 (FIG. 1). Area 46ARa is the area which is selected by the user of Communication Device 200. Object 20646Obj is the object included in the photo data. Area 46ARa which includes Object 20646Obj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646b1 (Paragraph [0241]). The portion of the photo data which does not fit Area 20646ARa is cropped.

Paragraph [0253]—This Paragraph [0253] illustrates Digital Zooming Software 20646c4 stored in Digital Camera Software Storage Area 20646c (Paragraph [0243]) which implements the operation described in Paragraph [0252]. In this embodiment, CPU 211 (FIG. 1) displays a list of the photo IDs representing the photo data stored in Photo Data Storage Area 20646b1 (Paragraph [0241]) as well as the thumbnails (S1). A certain photo data is selected by utilizing Input Device 210 (FIG. 1) or via voice recognition system (S2), and the selected photo data is displayed on LCD 201 (FIG. 1) as described in Paragraph [0251] (S3). Area 46ARa described in Paragraph [0251] is selected by utilizing Input Device 210 or via voice recognition system (S4). When a zooming signal is input by utilizing Input Device 210 or via voice recognition system (S5), CPU 211 (FIG. 1) implements the process described in Paragraph [0252] and replaces the original photo data with the zoomed photo data, which is stored in Photo Data Storage Area 20646b1 (Paragraph [0241]) (S6).

Paragraph [0254]—This Paragraph [0254] illustrates one embodiment of the trimming function which trims the photo data stored in Photo Data Storage Area 20646b1 (Paragraph [0241]) and thereby moves the selected object to the center of the photo data. In this embodiment, a certain photo selected by the user of Communication Device 200 is displayed on LCD 201 (FIG. 1). Point 20646PTa adjacent to Object 20646Obj is selected by utilizing Input Device 210 (FIG. 1) or via voice recognition system, and the photo is centered at Point 20646PTa. The trimmed photo is replaced with the original photo.

Paragraph [0255]—This Paragraph [0255] illustrates the operation performed in RAM 206 (FIG. 1) to implement the trimming function described in Paragraph [0254]. In this embodiment, Display Area 20646DA is the portion of the photo data which is displayed on LD 201 (FIG. 1). Object 20646Obj is the object included in the photo data. Point 20646PTa is the point selected by the user of Communication Device 200 adjacent to Object 206460bj which is centered by the present function. In this embodiment, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area 20646b1 (Paragraph [0241]). The portion of the photo data which does not fit Area 20646ARa is cropped.

Paragraph [0256]—This Paragraph [0256] illustrates Trimming Software 20646c3 stored in Digital Camera Software Storage Area 20646c (Paragraph [0243]) which implements the operation described in Paragraph [0255]. In this embodiment, CPU 211 (FIG. 1) displays a list of the photo IDs representing the photo data stored in Photo Data Storage Area 20646b1 (Paragraph [0241]) as well as the thumbnails (S1). A certain photo data is selected by utilizing Input Device 210 (FIG. 1) or via voice recognition system (S2), and the selected photo data is displayed on LCD 201 (FIG. 1) as described in Paragraph [0254] (S3). Point 20646PTa described in Paragraph [0254] is selected by utilizing Input Device 210 or via voice recognition system (S4). When a trimming signal is input by utilizing Input Device 210 or via voice recognition system (S5), CPU 211 (FIG. 1) centers the photo data at Point 20646PTa and replaces the original photo data with the trimmed photo data, which is stored in Photo Data Storage Area 20646b1 (Paragraph [0241]) (S6).

Paragraph [0257]—<<Multiple Language Displaying Function>>

Paragraph [0258]—Paragraph [0259] through Paragraph [0307] illustrate the multiple language displaying function wherein a language is selected from a plurality of languages, such as English, Japanese, French, and German, which is utilized to operate Communication Device 200.

Paragraph [0259]—This Paragraph [0259] illustrates the storage area included in RAM 206 (FIG. 1). In the present embodiment, RAM 206 includes Multiple Language Displaying Info Storage Area 20654a of which the data and the software programs stored therein are described in Paragraph [0261].

Paragraph [0260]—The data and/or the software programs stored in Multiple Language Displaying Info Storage Area 20654a (Paragraph [0259]) may be downloaded from Host H (Paragraph [0025]).

Paragraph [0261]—This Paragraph [0261] illustrates the storage areas included in Multiple Language Displaying Info Storage Area 20654a (Paragraph [0259]). In the present embodiment, Multiple Language Displaying Info Storage Area 20654a includes Multiple Language Displaying Data Storage Area 20654b and Multiple Language Displaying Software Storage Area 20654c. Multiple Language Displaying Data Storage Area 20654b stores the data necessary to implement the present function, such as the ones described in Paragraph [0262] through Paragraph [0270]. Multiple Language Displaying Software Storage Area 20654c stores the software programs necessary to implement the present function, such as the ones described in Paragraph [0271].

Paragraph [0262]—This Paragraph [0262] illustrates the storage areas included in Multiple Language Displaying Data Storage Area 20654b (Paragraph [0261]). In the present embodiment, Multiple. Language Displaying Data Storage Area 20654b includes Language Tables Storage Area 20654b1, Language Type Data Storage Area 20654b2, Language Item Data Storage Area 20654b3, and Selected Language Table ID Storage Area 20654b4. Language Tables Storage Area 20654b1 stores the data described in Paragraph [0263]. Language Type Data Storage Area 20654b2 stores the data described in Paragraph [0269]. Language Item Data Storage Area 20654b3 stores the data described in Paragraph [0270]. Selected Language Table ID Storage Area 20654b4 stores the language table ID selected in S4s of Paragraph [0273], Paragraph [0282], Paragraph [0291], and Paragraph [0300].

Paragraph [0263]—This Paragraph [0263] illustrates the storage areas included in Language Tables Storage Area 20654b1 (Paragraph [0262]). In the present embodiment, Language Tables Storage Area 20654b1 includes Language Table#1 Storage Area 20654b1a, Language Table#2 Storage Area 20654b1b, Language Table#3 Storage Area 20654b1c, and Language Table#4 Storage Area 20654b1d. Language Table#1 Storage Area 20654b1a stores the data described in Paragraph [0264]. Language Table#2 Storage Area 20654b1b stores the data described in Paragraph [0266]. Language Table#3 Storage Area 20654b1c stores the data described in Paragraph [0267]. Language Table#4 Storage Area 20654b1d stores the data described in Paragraph [0268].

Paragraph [0264]—This Paragraph [0264] illustrates the data stored in Language Table#1 Storage Area 20654b1a (Paragraph [0263]). In the present embodiment, Language Table#1 Storage Area 20654b1a comprises two columns, i.e., 'Language Item ID' and 'Language Text Data'. Column 'Language Item ID' stores the language item IDs, and each language item ID represents the identification of the corresponding language text data.

Paragraph [0265]—Column 'Language Text Data' stores the language text data, and each language text data represents the English text data displayed on LCD 201 (FIG. 1). In the present embodiment, Language Table#1 Storage Area 20654b1a stores the following data: the language item ID 'Language Item#1' and the corresponding language text data 'Open file'; the language item ID 'Language Item#2' and the corresponding language text data 'Close file'; the language item ID 'Language Item#3' and the corresponding language text data 'Delete'; the language item ID 'Language Item#4' and the corresponding language text data 'Copy'; the language item ID 'Language Item#5' and the corresponding language text data 'Cut'; the language item ID 'Language Item#6' and the corresponding language text data 'Paste'; the language item ID 'Language Item#7' and the corresponding language text data 'Insert'; the language item ID 'Language Item#8' and the corresponding language text data 'File'; the language item ID 'Language Item#9' and the corresponding language text data 'Edit'; the language item ID 'Language Item#10' and the corresponding language text data 'View'; the language item ID 'Language Item# 11' and the corresponding language text data 'Format'; the language item ID 'Language Item#12' and the corresponding language text data 'Tools'; the language item ID 'Language Item#13' and the corresponding language text data 'Window'; the language item ID 'Language Item#14' and the corresponding language text data 'Help'; the language item ID 'Language Item# 15' and the corresponding language text data 'My Network'; the language item ID 'Language Item#16' and the corresponding language text data 'Trash'; the language item ID 'Language Item#17' and the corresponding language text data 'Local Disk'; the language item ID 'Language Item#18' and the corresponding language text data 'Save'; the language item ID 'Language Item#19' and the corresponding language text data 'Yes'; the language item ID 'Language Item#20' and the corresponding language text data 'No'; and the language item ID 'Language Item#21' and the corresponding language text data 'Cancel'.

Paragraph [0266]—This Paragraph [0266] illustrates the data stored in Language Table#1 Storage Area 20654b1b (Paragraph [0263]). In the present embodiment, Language Table#1 Storage Area 20654b1b comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In the present embodiment, Language Table#1 Storage Area 20654b1b stores the following data: the language item ID 'Language Item#1' and the corresponding language text data meaning 'Open file' in Japanese; the language item ID 'Language Item#2' and the corresponding language text data meaning 'Close file' in Japanese; the language item ID 'Language Item#3' and the corresponding language text data meaning 'Delete' in Japanese; the language item ID 'Language Item#4' and the corresponding language text data meaning 'Copy' in Japanese; the language item ID 'Language Item#5' and the corresponding language text data meaning 'Cut' in Japanese; the language item ID 'Language Item#6' and the corresponding language text data meaning 'Paste' in Japanese; the language item ID 'Language Item#7' and the corresponding language text data meaning 'Insert' in Japanese; the language item ID 'Language Item#8' and the corresponding language text data meaning 'File' in Japanese; the language item ID 'Language Item#9' and the corresponding language text data meaning 'Edit' in Japanese; the language item ID 'Language Item# 10' and the corresponding language text data meaning 'View' in Japanese; the language item ID 'Language Item# 11' and the corresponding language text data meaning 'Format' in Japanese; the language item ID 'Language Item#12' and the corresponding language text data meaning 'Tools' in Japanese; the language item ID 'Language Item#13' and the corresponding language text data meaning 'Window' in Japanese; the language item ID 'Language Item#14' and the corresponding language text data meaning 'Help' in Japanese; the language item ID 'Language Item#15' and the corresponding language text data meaning 'My Network' in Japanese; the language item ID 'Language Item#16' and the corresponding language text data meaning 'Trash' in Japanese; the language item ID 'Language Item#17' and the corresponding language text data meaning 'Local Disk' in Japanese; the language item ID 'Language Item#18' and the corresponding language text data meaning 'Save' in Japanese; the language item ID 'Language Item#19' and the corresponding language text data meaning 'Yes' in Japanese; the language item ID 'Language Item#20' and the corresponding language text data meaning 'No' in Japanese; and the language item ID 'Language Item#21' and the corresponding language text data meaning 'Cancel' in Japanese.

Paragraph [0267]—This Paragraph [0267] illustrates the data stored in Language Table#1 Storage Area 20654b1c (Paragraph [0263]). In the present embodiment, Language Table#1 Storage Area 20654b1c comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In the present embodiment, Language Table#1 Storage Area 20654b1c stores the following data: the language item ID 'Language Item#1' and the corresponding language text data 'French#1' meaning 'Open file' in French; the language item ID 'Language Item#2' and the corresponding language text data 'French#2' meaning 'Close file' in French; the language item ID 'Language Item#3' and the corresponding language text data 'French#3' meaning 'Delete' in French; the language item ID 'Language Item#4' and the corresponding language text data 'French#4' meaning 'Copy' in French; the language item ID 'Language Item#5' and the corresponding language text data 'French#5' meaning 'Cut' in French; the language item ID 'Language Item#6' and the corresponding language text data 'French#6' meaning 'Paste' in French; the language item ID 'Language Item#7' and the corresponding language text data 'French#7' meaning 'Insert' in French; the language item ID 'Language Item#8' and the corresponding language text data 'French#8' meaning 'File' in French; the language item ID 'Language Item#9' and the corresponding language text data 'French#9' meaning 'Edit' in French; the language item ID 'Language Item#10' and the corresponding language text data 'French#10' meaning 'View' in French; the language item ID 'Language Item#11' and the corresponding language text data 'French#11' meaning 'Format' in French; the language item ID 'Language Item#12' and the corresponding language text data 'French#12' meaning 'Tools' in French; the language item ID 'Language Item#13' and the corresponding language text data 'French#13' meaning 'Window' in French; the language item ID 'Language Item#14' and the corresponding language text data 'French#14' meaning 'Help' in French; the language item ID 'Language Item#15' and the corresponding language text data 'French#15' meaning 'My Network' in French; the language item ID 'Language Item#16' and the corresponding language text data 'French#16' meaning 'Trash' in French; the language item ID 'Language Item#17' and the corresponding language text data 'French#17' meaning 'Local Disk' in French; the language item ID 'Language Item#18' and the corresponding language text data 'French#18' meaning 'Save' in French; the language item ID 'Language Item#19' and the corresponding language text data 'French#19' meaning 'Yes' in French; the language item ID 'Language Item#20' and the corresponding language text data 'French#20' meaning 'No' in French; and the language item ID 'Language Item#21' and the corresponding language text data 'French#21' meaning 'Cancel' in French.

Paragraph [0268]—This Paragraph [0268] illustrates the data stored in Language Table#1 Storage Area 20654b1d (Paragraph [0263]). In the present embodiment, Language Table#1 Storage Area 20654b1d comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In the present embodiment, Language Table#1 Storage Area 20654b1d stores the following data: the language item ID 'Language Item#1' and the corresponding language text data 'German#1' meaning 'Open file' in German; the language item ID 'Language Item#2' and the corresponding language text data 'German#2' meaning 'Close file' in German; the language item ID 'Language Item#3' and the corresponding language text data 'German#3' meaning 'Delete' in German; the language item ID 'Language Item#4' and the corresponding language text data 'German#4' meaning 'Copy' in German; the language item ID 'Language Item#5' and the corresponding language text data 'German#5' meaning 'Cut' in German; the language item ID 'Language Item#6' and the corresponding language text data 'German#6' meaning 'Paste' in German; the language item ID 'Language Item#7' and the corresponding language text data 'German#7' meaning 'Insert' in German; the language item ID 'Language Item#8' and the corresponding language text data 'German#8' meaning 'File' in German; the language item ID 'Language Item#9' and the corresponding language text data 'German#9' meaning 'Edit' in German; the language item ID 'Language Item#10' and the corresponding language text data 'German# 10' meaning 'View' in German; the language item ID 'Language Item# 11' and the corresponding language text data 'German# 11' meaning 'Format' in German; the language item ID 'Language Item#12' and the corresponding language text data 'German#12' meaning 'Tools' in German; the language item ID 'Language Item#13' and the corresponding language text data 'German# 13' meaning 'Window' in German; the language item ID 'Language Item#14' and the corresponding language text data 'German#14' meaning 'Help' in German; the language item ID 'Language Item#15' and the corresponding language text data 'German#15' meaning 'My Network' in German; the language item ID 'Language Item#16' and the corresponding language text data 'German#16' meaning 'Trash' in German; the language item ID 'Language Item#17' and the corresponding language text data 'German#17' meaning 'Local Disk' in German; the language item ID 'Language Item#18' and the corresponding language text data 'German#18' meaning 'Save' in German; the language item ID 'Language Item#19' and the corresponding language text data 'German#19' meaning 'Yes' in German; the language item ID 'Language Item#20' and the corresponding language text data 'German#20' meaning 'No' in German; and the language item ID 'Language Item#21' and the corresponding language text data 'German#21' meaning 'Cancel' in German.

Paragraph [0269]—This Paragraph [0269] illustrates data stored in Language Type Data Storage Area 20654*b*2 (Paragraph [0262]). In the present embodiment, Language Type Data Storage Area 20654*b*2 comprises two columns, i.e., 'Language Table ID' and 'Language Type Data'. Column 'Language Table ID' stores the language table ID, and each language table ID represents the identification of the storage areas included in Language Tables Storage Area 20654*b*1 (Paragraph [0263]). Column 'Language Type Data' stores the language type data, and each language type data represents the type of the language utilized in the language table of the corresponding language table ID. In the present embodiment, Language Type Data Storage Area 20654*b*2 stores the following data: the language table ID 'Language Table#1' and the corresponding language type data 'English' the language table ID 'Language Table#2' and the corresponding language type data 'Japanese' the language table ID 'Language Table#3' and the corresponding language type data 'French'; and the language table ID 'Language Table#4' and the corresponding language type data 'German'. Here, the language table ID 'Language Table# 1' is an identification of Language Table#1 Storage Area 20654*b*1*a* (Paragraph [0264]); the language table ID 'Language Table#2' is an identification of Language Table#2 Storage Area 20654*b*1*b* (Paragraph [0266]); the language table ID 'Language Table#3' is an identification of Language Table#3 Storage Area 20654*b*1*c* (Paragraph [0267]); and the language table ID 'Language Table#4' is an identification of Language Table#4 Storage Area 20654*b*1*d* (Paragraph [0268]).

Paragraph [0270]—This Paragraph [0270] illustrates the data stored in Language Item Data Storage Area 20654*b*3 (Paragraph [0262]). In the present embodiment, Language Item Data Storage Area 20654*b*3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In the present embodiment, Language Item Data Storage Area 20654*b*3 stores the following data: the language item ID 'Language Item#1' and the corresponding language item data 'Open file'; the language item ID 'Language Item#2' and the corresponding language item data 'Close file'; the language item ID 'Language Item#3' and the corresponding language item data 'Delete'; the language item ID 'Language Item#4' and the corresponding language item data 'Copy'; the language item ID 'Language Item#5' and the corresponding language item data 'Cut'; the language item ID 'Language Item#6' and the corresponding language item data 'Paste'; the language item ID 'Language Item#7' and the corresponding language item data 'Insert'; the language item ID 'Language Item#8' and the corresponding language item data 'File'; the language item ID 'Language Item#9' and the corresponding language item data 'Edit'; the language item ID 'Language Item#10' and the corresponding language item data 'View'; the language item ID 'Language Item#11' and the corresponding language item data 'Format'; the language item ID 'Language Item#12' and the corresponding language item data 'Tools'; the language item ID 'Language Item#13' and the corresponding language item data 'Window'; the language item ID 'Language Item#14' and the corresponding language item data 'Help'; the language item ID 'Language Item#15' and the corresponding language item data 'My Network'; the language item ID 'Language Item#16' and the corresponding language item data 'Trash'; the language item ID 'Language Item#17' and the corresponding language item data 'Local Disk'; the language item ID 'Language Item#18' and the corresponding language item data 'Save'; the language item ID 'Language Item#19' and the corresponding language item data 'Yes'; the language item ID 'Language Item#20' and the corresponding language item data 'No'; and the language item ID 'Language Item#21' and the corresponding language item data 'Cancel'. Primarily, the data stored in column 'Language Item Data' are same as the ones stored in column 'Language Text Data' of Language Table#1 Storage Area 20654*b*1*a* (Paragraph [0264]).

Paragraph [0271]—This Paragraph [0271] illustrates the software program stored in Multiple Language Displaying Software Storage Area 20654*c* (Paragraph [0261]). In the present embodiment, Multiple Language Displaying Software Storage Area 20654*c* stores Language Selecting Software 20654*c*1, Selected Language Displaying Software 20654*c*2, Language Text Data Displaying Software For Word Processor 20654*c*3*a*, Language Text Data Displaying Software For Word Processor 20654*c*3*b*, and Language Text Data Displaying Software For Explorer 20654*c*4.Language Selecting Software 20654*c*1 is the software program described in Paragraph [0273], Paragraph [0282], Paragraph [0291], and Paragraph [0300]. Selected Language Displaying Software 20654*c*2 is the software program described in Paragraph [0274], Paragraph [0283], Paragraph [0292], and Paragraph [0301]. Language Text Data Displaying Software For Word Processor 20654*c*3*a* is the software program described in Paragraph [0275], Paragraph [0284], Paragraph [0293], and Paragraph [0302]. Language Text Data Displaying Software For Word Processor 20654*c*3*b* is the software program described in Paragraph [0277], Paragraph [0286], Paragraph [0295], and Paragraph [0304]. Language Text Data Displaying Software For Explorer 20654*c*4 is the software program described in Paragraph [0279], Paragraph [0288], Paragraph [0297], and Paragraph [0306].

Paragraph [0272]—<<Multiple Language Displaying Function—Utilizing English>>

Paragraph [0273]—This Paragraph [0273] illustrates Language Selecting Software 20654*c*1 stored in Multiple Language Displaying Software Storage Area 20654*c* (Paragraph [0271]) which selects the language utilized to operate Communication Device 200 from a plurality of languages. In the present embodiment, CPU 211 (FIG. 1) of Communication Device 200 retrieves the language type data from Language Type Data Storage Area 20654*b*2 (Paragraph [0269]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654*b*2 (Paragraph [0269]), and stores the language table ID (Language Table#1) in Selected Language Table ID Storage Area 20654*b*4 (Paragraph [0262]) (S4).

Paragraph [0274]—This Paragraph [0274] illustrates Selected Language Displaying Software 20654*c*2 stored in Multiple Language Displaying Software Storage Area 20654*c* (Paragraph [0271]) which displays and operates with the language selected in S3 of Paragraph [0273] (i.e., English). In the present embodiment, when Communication Device 200 is powered on (S1), CPU 211 (FIG. 1) of Communication Device 200 retrieves the selected language table ID (Language Table#1) from Selected Language Table ID Storage Area 20654*b*4 (Paragraph [0262]) (S2). CPU 211 then identifies the storage area corresponding to the language table ID selected in S2 (Language Table#1 Storage Area 20654*b*1*a* (Paragraph [0264])) in Language Tables Storage Area 20654*b*1 (Paragraph [0263]) (S3). Language text data displaying process is initiated thereafter of which the details are described hereinafter (S4).

Paragraph [0275]—This Paragraph [0275] illustrates Language Text Data Displaying Software For Word Processor 20654*c*3*a* stored in Multiple Language Displaying Software Storage Area 20654*c* (Paragraph [0271]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#1 Storage Area 20654*b*1*a* (Paragraph [0264]) and displays the corresponding language text data 'File' at the predetermined location in the word processor (S2). CPU 211 identifies the language item ID 'Language Item#9' in Language Table#1 Storage Area 20654*b*1*a* (Paragraph [0264]) and displays the corresponding language text data 'Edit' at the predetermined location in the word processor (S3). CPU 211 identifies the language item ID 'Language Item#10' in Language Table#1 Storage Area 20654*b*1*a* (Paragraph [0264]) and displays the corresponding language text data 'View' at the predetermined location in the word processor (S4). CPU 211 identifies the language item ID 'Language Item#11' in Language Table#1 Storage Area 20654*b*1*a* (Paragraph [0264]) and displays the corresponding language text data 'Format' at the predetermined location in the word processor (S5). CPU 211 identifies the language item ID 'Language Item#12' in Language Table#1 Storage Area 20654*b*1*a* (Paragraph [0264]) and displays the corresponding language text data 'Tools' at the predetermined location in the word processor (S6). CPU 211 identifies the language item ID 'Language Item#13' in Language Table#1 Storage Area 20654*b*1*a* (Paragraph [0264]) and displays the corresponding language text data 'Window' at the predetermined location in the word processor (S7). CPU 211 identifies the language item ID 'Language Item#14' in Language Table#1 Storage Area 20654*b*1*a* (Paragraph [0264]) and displays the corresponding language text data 'Help' at the predetermined location in the word processor (S8). Alphanumeric data is input to the word processor by utilizing Input Device 210 (FIG. 1) or via voice recognition system thereafter (S9).

Paragraph [0276]—This Paragraph [0276] illustrates the data displayed on LCD 201 (FIG. 1) of Communication Device 200 at the time Language Text Data Displaying Software For Word Processor 20654*c*3*a* (Paragraph [0275]) is implemented. In the present embodiment, the word processor described in Paragraph [0275] is primarily composed of Menu Bar 20154MB and Alphanumeric Data Input Area 20154ADIA wherein the language text data described in S2 through S8 of Paragraph [0275] are displayed on Menu Bar 20154MB and alphanumeric data are input in Alphanumeric Data Input Area 20154ADIA. In the present embodiment, 20154MBF is the language text data processed in S2 of the previous Paragraph; 20154MBE is the language text data processed in S3 of the previous Paragraph; 20154MBV is the language text data processed in S4 of the previous Paragraph; 20154MBF is the language text data processed in S5 of the previous Paragraph; 20154MBT is the language text data processed in S6 of the previous Paragraph; 20154MBW is the language text data processed in S7 of the previous Paragraph; and 20154MBH is the language text data processed in S8 of the previous Paragraph.

Paragraph [0277]—This Paragraph [0277] illustrates Language Text Data Displaying Software For Word Processor 20654*c*3*b* stored in Multiple Language Displaying Software Storage Area 20654*c* (Paragraph [0271]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#1 Storage Area 20654*b*1*a* (Paragraph [0264]) and displays the corresponding language text data 'Save' at the predetermined location in the word processor (S2). CPU 211 identifies the language item ID 'Language Item#19' in Language Table#1 Storage Area 20654*b*1*a* (Paragraph [0264]) and displays the corresponding language text data 'Yes' at the predetermined location in the word processor (S3). CPU 211 identifies the language item ID 'Language Item#20' in Language Table#1 Storage Area 20654*b*1*a* (Paragraph [0264]) and displays the corresponding language text data 'No' at the predetermined location in the word processor (S4). CPU 211 identifies the language item ID 'Language Item#21' in Language Table#1 Storage Area 20654*b*1*a* (Paragraph [0264]) and displays the corresponding language text data 'Cancel' at the predetermined location in the word processor (S5). The save signal indicating to save the alphanumeric data input in S9 of Paragraph [0275] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0278]—This Paragraph [0278] illustrates the data displayed on LCD 201 (FIG. 1) of Communication Device 200 at the time Language Text Data Displaying Software For Word Processor 20654*c*3*b* (Paragraph [0277]) is implemented. In the present embodiment, Prompt 20154Pr is displayed on LCD 201 (FIG. 1) at the time Language Text Data Displaying Software For Word Processor 20654*c*3*a*

(Paragraph [0275]) is closed. In the present embodiment, Prompt 20154Pr is primarily composed of 20154PrS, 20154PrY, 20154PrN, and 20154PrC. In the present embodiment, 20154PrS is the language text data processed in S2 of the previous Paragraph; 20154PrY is the language text data processed in S3 of the previous Paragraph; 20154PrN is the language text data processed in S4 of the previous Paragraph; and 20154PrC is the language text data processed in S5 of the previous Paragraph.

Paragraph [0279]—This Paragraph [0279] illustrates Language Text Data Displaying Software For Explorer 20654$c4$ stored in Multiple Language Displaying Software Storage Area 20654$c$ (Paragraph [0271]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item#15' in Language Table#1 Storage Area 20654$b1a$ (Paragraph [0264]) and displays the corresponding language text data 'My Network' at the predetermined location in the Windows Explorer like software program (S2). CPU 211 identifies the language item ID 'Language Item#16' in Language Table#1 Storage Area 20654$b1a$ (Paragraph [0264]) and displays the corresponding language text data 'Trash' at the predetermined location in the Windows Explorer like software program (S3). CPU 211 identifies the language item ID 'Language Item#17' in Language Table#1 Storage Area 20654$b1a$ (Paragraph [0264]) and displays the corresponding language text data 'Local Disk' at the predetermined location in the Windows Explorer like software program (S4).

Paragraph [0280]—This Paragraph [0280] illustrates the data displayed on LCD 201 (FIG. 1) of Communication Device 200 at the time Language Text Data Displaying Software For Explorer 20654$c4$ (Paragraph [0279]) is executed. In the present embodiment, 20154LD, 20154MN, and 20154Tr are displayed on LCD 201 (FIG. 1) at the time Language Text Data Displaying Software For Explorer 20654$c4$ is executed. In the present embodiment, 20154LD is the language text data processed in S4 of the previous Paragraph; 20154MN is the language text data processed in S2 of the previous Paragraph; and 20154Tr is the language text data processed in S3 of the previous Paragraph.

Paragraph [0281]—<<Multiple Language Displaying Function—Utilizing Japanese>>

Paragraph [0282]—This Paragraph [0282] illustrates Language Selecting Software 20654$c1$ stored in Multiple Language Displaying Software Storage Area 20654$c$ (Paragraph [0271]) which selects the language utilized to operate Communication Device 200 from a plurality of languages. In the present embodiment, CPU 211 (FIG. 1) of Communication Device 200 retrieves the language type data from Language Type Data Storage Area 20654$b2$ (Paragraph [0269]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'Japanese' is selected in S3. CPU 211 then identifies the language table ID corresponding to the language type data in Language Type Data Storage Area 20654$b2$ (Paragraph [0269]), and stores the language table ID (Language Table#2) in Selected Language Table ID Storage Area 20654$b4$ (Paragraph [0262]) (S4).

Paragraph [0283]—This Paragraph [0283] illustrates Selected Language Displaying Software 20654$c2$ stored in Multiple Language Displaying Software Storage Area 20654$c$ (Paragraph [0271]) which displays and operates with the language selected in S3 of Paragraph (i.e., Japanese). In the present embodiment, when Communication Device 200 is powered on (S1), CPU 211 (FIG. 1) of Communication Device 200 retrieves the selected language table ID (Language Table#2) from Selected Language Table ID Storage Area 20654$b4$ (Paragraph [0262]) (S2). CPU 211 then identifies the storage area corresponding to the language table ID selected in S2 (Language Table#2 Storage Area 20654$b1b$ (Paragraph [0266])) in Language Tables Storage Area 20654$b1$ (Paragraph [0263]) (S3). Language text data displaying process is initiated thereafter of which the details are described hereinafter (S4).

Paragraph [0284]—This Paragraph [0284] illustrates Language Text Data Displaying Software For Word Processor 20654$c3a$ stored in Multiple Language Displaying Software Storage Area 20654$c$ (Paragraph [0271]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#2 Storage Area 20654$b1b$ (Paragraph [0266]) and displays the corresponding language text data indicating 'File' in Japanese at the predetermined location in the word processor (S2). CPU 211 identifies the language item ID 'Language Item#9' in Language Table#2 Storage Area 20654$b1b$ (Paragraph [0266]) and displays the corresponding language text data indicating 'Edit' in Japanese at the predetermined location in the word processor (S3). CPU 211 identifies the language item ID 'Language Item#10' in Language Table#2 Storage Area 20654$b1b$ (Paragraph [0266]) and displays the corresponding language text data indicating 'View' in Japanese at the predetermined location in the word processor (S4). CPU 211 identifies the language item ID 'Language Item#11' in Language Table#2 Storage Area 20654$b1b$ (Paragraph [0266]) and displays the corresponding language text data indicating 'Format' in Japanese at the predetermined location in the word processor (S5). CPU 211 identifies the language item ID 'Language Item#12' in Language Table#2 Storage Area 20654$b1b$ (Paragraph [0266]) and displays the corresponding language text data indicating 'Tools' in Japanese at the predetermined location in the word processor (S6). CPU 211 identifies the language item ID 'Language Item#13' in Language Table#2 Storage Area 20654$b1b$ (Paragraph [0266]) and displays the corresponding language text data indicating 'Window' in Japanese at the predetermined location in the word processor (S7). CPU 211 identifies the language item ID 'Language Item#14' in Language Table#2 Storage Area 20654$b1b$ (Paragraph [0266]) and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

Paragraph [0285]—This Paragraph [0285] illustrates the data displayed on LCD 201 (FIG. 1) of Communication Device 200 at the time Language Text Data Displaying Software For Word Processor 20654c3a (Paragraph [0284]) is implemented. In the present embodiment, the word processor described in Paragraph [0284] is primarily composed of Menu Bar 20154MB and Alphanumeric Data Input Area 20154ADIA wherein the language text data described in S2 through S8 of Paragraph [0284] are displayed on Menu Bar 20154MB and alphanumeric data are input in Alphanumeric Data Input Area 20154ADIA. In the present embodiment, 20154MBF is the language text data processed in S2 of the previous Paragraph; 20154MBE is the language text data processed in S3 of the previous Paragraph; 20154MBV is the language text data processed in S4 of the previous Paragraph; 20154MBF is the language text data processed in S5 of the previous Paragraph; 20154MBT is the language text data processed in S6 of the previous Paragraph; 20154MBW is the language text data processed in S7 of the previous Paragraph; and 20154MBH is the language text data processed in S8 of the previous Paragraph. Paragraph [0286]—This Paragraph [0286] illustrates Language Text Data Displaying Software For Word Processor 20654c3b stored in Multiple Language Displaying Software Storage Area 20654c (Paragraph [0271]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#2 Storage Area 20654b1b (Paragraph [0266]) and displays the corresponding language text data indicating 'Save' in Japanese at the predetermined location in the word processor (S2). CPU 211 identifies the language item ID 'Language Item#19' in Language Table#2 Storage Area 20654b1b (Paragraph [0266]) and displays the corresponding language text data indicating 'Yes' in Japanese at the predetermined location in the word processor (S3). CPU 211 identifies the language item ID 'Language Item#20' in Language Table#2 Storage. Area 20654b1b (Paragraph [0266]) and displays the corresponding language text data indicating 'No' in Japanese at the predetermined location in the word processor (S4). CPU 211 identifies the language item ID 'Language Item#21' in Language Table#2 Storage Area 20654b1b (Paragraph [0266]) and displays the corresponding language text data indicating 'Cancel' in Japanese at the predetermined location in the word processor (S5). The save signal indicating to save the alphanumeric data input in S9 of Paragraph [0284] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0287]—This Paragraph [0287] illustrates the data displayed on LCD 201 (FIG. 1) of Communication Device 200 at the time Language Text Data Displaying Software For Word Processor 20654c3b (Paragraph [0286]) is implemented. In the present embodiment, Prompt 20154Pr is displayed on LCD 201 (FIG. 1) at the time Language Text Data Displaying Software For Word Processor 20654c3a (Paragraph [0284]) is closed. In the present embodiment, Prompt 20154Pr is primarily composed of 20154PrS, 20154PrY, 20154PrN, and 20154PrC. In the present embodiment, 20154PrS is the language text data processed in S2 of the previous Paragraph; 20154PrY is the language text data processed in S3 of the previous Paragraph; 20154PrN is the language text data processed in S4 of the previous Paragraph; and 20154PrC is the language text data processed in S5 of the previous Paragraph.

Paragraph [0288]—This Paragraph [0288] illustrates Language Text Data Displaying Software For Explorer 20654c4 stored in Multiple Language Displaying Software Storage Area 20654c (Paragraph [0271]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#2 Storage Area 20654b1b (Paragraph [0266]) and displays the corresponding language text data indicating 'My Network' in Japanese at the predetermined location in the Windows Explorer like software program (S2). CPU 211 identifies the language item ID 'Language Item#16' in Language Table#2 Storage Area 20654b1b (Paragraph [0266]) and displays the corresponding language text data indicating 'Trash' in Japanese at the predetermined location in the Windows Explorer like software program (S3). CPU 211 identifies the language item ID 'Language Item#17' in Language Table#2 Storage Area 20654b1b (Paragraph [0266]) and displays the corresponding language text data indicating 'Local Disk' in Japanese at the predetermined location in the Windows Explorer like software program (S4).

Paragraph [0289]—This Paragraph [0289] illustrates the data displayed on LCD 201 (FIG. 1) of Communication Device 200 at the time Language Text Data Displaying Software For Explorer 20654c4 (Paragraph [0288]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous Paragraph; 20154MN is the language text data processed in S2 of the previous Paragraph; and 20154Tr is the language text data processed in S3 of the previous Paragraph.

Paragraph [0290]—<<Multiple Language Displaying Function—Utilizing French>>

Paragraph [0291]—This Paragraph [0291] illustrates Language Selecting Software 20654c1 stored in Multiple Language Displaying Software Storage Area 20654c (Paragraph [0271]) which selects the language utilized to operate Communication Device 200 from a plurality of languages. In the present embodiment, CPU 211 (FIG. 1) of Communication Device 200 retrieves the language type data from Language Type Data Storage Area 20654b2 (Paragraph [0269]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'French' is selected in S3. CPU 211 then identifies the language table ID corresponding to the language type data in Language Type Data Storage Area 20654b2 (Paragraph [0269]), and stores the language table ID (Language Table#3) in Selected Language Table ID Storage Area 20654b4 (Paragraph [0262]) (S4).

Paragraph [0292]—This Paragraph [0292] illustrates Selected Language Displaying Software 20654c2 stored in Multiple Language Displaying Software Storage Area 20654*c* (Paragraph [0271]) which displays and operates with the language selected in S3 of Paragraph (i.e., French). In the present embodiment, when Communication Device 200 is powered on (S1), CPU 211 (FIG. 1) of Communication Device 200 retrieves the selected language table ID (Language Table#3) from Selected Language Table ID Storage Area 20654*b*4 (Paragraph [0262]) (S2). CPU 211 then identifies the storage area corresponding to the language table ID selected in S2 (Language Table#3 Storage Area 20654*b*1*c* (Paragraph [0267])) in Language Tables Storage Area 20654*b*1 (Paragraph [0263]) (S3). Language text data displaying process is initiated thereafter of which the details are described hereinafter (S4).

Paragraph [0293]—This Paragraph [0293] illustrates Language Text Data Displaying Software For Word Processor 20654*c*3*a* stored in Multiple Language Displaying Software Storage Area 20654*c* (Paragraph [0271]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#3 Storage Area 20654*b*1*c* (Paragraph [0267]) and displays the corresponding language text data 'French#8' indicating 'File' in French at the predetermined location in the word processor (S2). CPU 211 identifies the language item ID 'Language Item#9' in Language Table#3 Storage Area 20654*b*1*c* (Paragraph [0267]) and displays the corresponding language text data 'French#9' indicating 'Edit' in French at the predetermined location in the word processor (S3). CPU 211 identifies the language item ID 'Language Item#10' in Language Table#3 Storage Area 20654*b*1*c* (Paragraph [0267]) and displays the corresponding language text data 'French#10' indicating 'View' in French at the predetermined location in the word processor (S4). CPU 211 identifies the language item ID 'Language Item#11' in Language Table#3 Storage Area 20654*b*1*c* (Paragraph [0267]) and displays the corresponding language text data 'French#11' indicating 'Format' in French at the predetermined location in the word processor (S5). CPU 211 identifies the language item ID 'Language Item#12' in Language Table#3 Storage Area 20654*b*1*c* (Paragraph [0267]) and displays the corresponding language text data 'French#12' indicating 'Tools' in French at the predetermined location in the word processor (S6). CPU 211 identifies the language item ID 'Language Item#13' in Language Table#3 Storage Area 20654*b*1*c* (Paragraph [0267]) and displays the corresponding language text data 'French#13' indicating 'Window' in French at the predetermined location in the word processor (S7). CPU 211 identifies the language item ID 'Language Item#14' in Language Table#3 Storage Area 20654*b*1*c* (Paragraph [0267]) and displays the corresponding language text data 'French#14' indicating 'Help' in French at the predetermined location in the word processor (S8). Alphanumeric data is input to the word processor by utilizing Input Device 210 (FIG. 1) or via voice recognition system thereafter (S9).

Paragraph [0294]—This Paragraph [0294] illustrates the data displayed on LCD 201 (FIG. 1) of Communication Device 200 at the time Language Text Data Displaying Software For Word Processor 20654*c*3*a* (Paragraph [0293]) is implemented. In the present embodiment, the word processor described in Paragraph [0293] is primarily composed of Menu Bar 20154MB and Alphanumeric Data Input Area 20154ADIA wherein the language text data described in S2 through S8 of Paragraph [0293] are displayed on Menu Bar 20154MB and alphanumeric data are input in Alphanumeric Data Input Area 20154ADIA. In the present embodiment, 20154MBF is the language text data processed in S2 of the previous Paragraph; 20154MBE is the language text data processed in S3 of the previous Paragraph; 20154MBV is the language text data processed in S4 of the previous Paragraph; 20154MBF is the language text data processed in S5 of the previous Paragraph; 20154MBT is the language text data processed in S6 of the previous Paragraph; 20154MBW is the language text data processed in S7 of the previous Paragraph; and 20154MBH is the language text data processed in S8 of the previous Paragraph.

Paragraph [0295]—This Paragraph [0295] illustrates Language Text Data Displaying Software For Word Processor 20654*c*3*b* stored in Multiple Language Displaying Software Storage Area 20654*c* (Paragraph [0271]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#3 Storage Area 20654*b*1*c* (Paragraph [0267]) and displays the corresponding language text data 'French#18' indicating 'Save' in French at the predetermined location in the word processor (S2). CPU 211 identifies the language item ID 'Language Item#19' in Language Table#3 Storage Area 20654*b*1*c* (Paragraph [0267]) and displays the corresponding language text data 'French#19' indicating 'Yes' in French at the predetermined location in the word processor (S3). CPU 211 identifies the language item. ID 'Language Item#20' in Language Table#3 Storage Area 20654*b*1*c* (Paragraph [0267]) and displays the corresponding language text data 'French#20' indicating 'No' in French at the predetermined location in the word processor (S4). CPU 211 identifies the language item ID 'Language Item#21' in Language Table#3 Storage Area 20654*b*1*c* (Paragraph [0267]) and displays the corresponding language text data 'French#21' indicating 'Cancel' in French at the predetermined location in the word processor (S5). The save signal indicating to save the alphanumeric data input in S9 of Paragraph [0293] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0296]—This Paragraph [0296] illustrates the data displayed on LCD 201 (FIG. 1) of Communication Device 200 at the time Language Text Data Displaying Software For Word Processor 20654*c*3*b* (Paragraph [0295]) is implemented. In the present embodiment, Prompt 20154Pr is displayed on LCD 201 (FIG. 1) at the time Language Text Data Displaying Software For Word Processor 20654*c*3*a* (Paragraph [0293]) is closed. In the present embodiment, Prompt 20154Pr is primarily composed of 20154PrS, 20154PrY, 20154PrN, and 20154PrC. In the present embodiment, 20154PrS is the language text data processed in S2 of the previous Paragraph; 20154PrY is the language text data processed in S3 of the previous Paragraph; 20154PrN is the language text data processed in S4 of the previous Paragraph; and 20154PrC is the language text data processed in S5 of the previous Paragraph.

Paragraph [0297]—This Paragraph [0297] illustrates Language Text Data Displaying Software For Explorer 20654c4 stored in Multiple Language Displaying Software Storage Area 20654c (Paragraph [0271]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#3 Storage Area 20654b1c (Paragraph [0267]) and displays the corresponding language text data 'French#15' indicating 'My Network' in French at the predetermined location in the Windows Explorer like software program (S2). CPU 211 identifies the language item ID 'Language Item#16' in Language Table#3 Storage Area 20654b1c (Paragraph [0267]) and displays the corresponding language text data 'French#16' indicating 'Trash' in French at the predetermined location in the Windows Explorer like software program (S3). CPU 211 identifies the language item ID 'Language Item#17' in Language Table#3 Storage Area 20654b1c (Paragraph [0267]) and displays the corresponding language text data 'French#17' indicating 'Local Disk' in French at the predetermined location in the Windows Explorer like software program (S4).

Paragraph [0298]—This Paragraph [0298] illustrates the data displayed on LCD 201 (FIG. 1) of Communication Device 200 at the time Language Text Data Displaying Software For Explorer 20654c4 (Paragraph [0297]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous Paragraph; 20154MN is the language text data processed in S2 of the previous Paragraph; and 20154Tr is the language text data processed in S3 of the previous Paragraph.

Paragraph [0299]—<<Multiple Language Displaying Function—Utilizing German>>

Paragraph [0300]—This Paragraph [0300] illustrates Language Selecting Software 20654c1 stored in Multiple Language Displaying Software Storage Area 20654c (Paragraph [0271]) which selects the language utilized to operate Communication Device 200 from a plurality of languages. In the present embodiment, CPU 211 (FIG. 1) of Communication Device 200 retrieves the language type data from Language Type Data Storage Area 20654b2 (Paragraph [0269]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'German' is selected in S3. CPU 211 then identifies the language table ID corresponding to the language type data in Language Type Data Storage Area 20654b2 (Paragraph [0269]), and stores the language table ID (Language Table#4) in Selected Language Table ID Storage Area 20654b4 (Paragraph [0262]) (S4).

Paragraph [0301] illustrates Selected Language Displaying Software 20654c2 stored in Multiple Language Displaying Software Storage Area 20654c (Paragraph [0271]) which displays and operates with the language selected in S3 of Paragraph (i.e., German). In the present embodiment, when Communication Device 200 is powered on (S1), CPU 211 (FIG. 1) of Communication Device 200 retrieves the selected language table ID (Language Table#4) from Selected Language Table ID Storage Area 20654b4 (Paragraph [0262]) (S2). CPU 211 then identifies the storage area corresponding to the language table ID selected in S2 (Language Table#4 Storage Area 20654b1d (Paragraph [0268])) in Language Tables Storage Area 20654b1 (Paragraph [0263]) (S3). Language text data displaying process is initiated thereafter of which the details are described hereinafter (S4).

Paragraph [0302]—This Paragraph [0302] illustrates Language Text Data Displaying Software For Word Processor 20654c3a stored in Multiple Language Displaying Software Storage Area 20654c (Paragraph [0271]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#4 Storage Area 20654b1d (Paragraph [0268]) and displays the corresponding language text data 'German#8' indicating 'File' in German at the predetermined location in the word processor (S2). CPU 211 identifies the language item ID 'Language Item#9' in Language Table#4 Storage Area 20654b1d (Paragraph [0268]) and displays the corresponding language text data 'German#9' indicating 'Edit' in German at the predetermined location in the word processor (S3). CPU 211 identifies the language item ID 'Language Item#10' in Language Table#4 Storage Area 20654b1d (Paragraph [0268]) and displays the corresponding language text data 'German#10' indicating 'View' in German at the predetermined location in the word processor (S4). CPU 211 identifies the language item ID 'Language Item#11' in Language Table#4 Storage Area 20654b1d (Paragraph [0268]) and displays the corresponding language text data 'German#11' indicating 'Format' in German at the predetermined location in the word processor (S5). CPU 211 identifies the language item ID 'Language Item#12' in Language Table#4 Storage Area 20654b1d (Paragraph [0268]) and displays the corresponding language text data 'German#12' indicating 'Tools' in German at the predetermined location in the word processor (S6). CPU 211 identifies the language item ID 'Language Item#13' in Language Table#4 Storage Area 20654b1d (Paragraph [0268]) and displays the corresponding language text data 'German#13' indicating 'Window' in German at the predetermined location in the word processor (S7). CPU 211 identifies the language item ID 'Language Item#14' in Language Table#4 Storage Area 20654b1d (Paragraph [0268]) and displays the corresponding language text data 'German#14' indicating 'Help' in German at the predetermined location in the word processor (S8). Alphanumeric data is input to the word processor by utilizing Input Device 210 (FIG. 1) or via voice recognition system thereafter (S9).

Paragraph [0303]—This Paragraph [0303] illustrates the data displayed on LCD 201 (FIG. 1) of Communication Device 200 at the time Language Text Data Displaying Software For Word Processor 20654c3a (Paragraph [0302]) is implemented. In the present embodiment, the word processor described in Paragraph [0302] is primarily composed of Menu Bar 20154MB and Alphanumeric Data Input Area 20154ADIA wherein the language text data described in S2 through S8 of Paragraph [0302] are displayed on Menu Bar 20154MB and alphanumeric data are input in Alphanumeric Data Input Area 20154ADIA. In the present embodiment, 20154MBF is the language text data processed in S2 of the previous Paragraph; 20154MBE is the language text data processed in S3 of the previous Paragraph; 20154MBV is the language text data processed in S4 of the previous Paragraph; 20154MBF is the language text data processed in S5 of the previous Paragraph; 20154MBT is the language text data processed in S6 of the previous Paragraph; 20154MBW is the language text data processed in S7 of the previous Paragraph; and 20154MBH is the language text data processed in S8 of the previous Paragraph.

Paragraph [0304]—This Paragraph [0304] illustrates Language Text Data Displaying Software For Word Processor 20654c3b stored in Multiple Language Displaying Software Storage Area 20654c (Paragraph [0271]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#4 Storage Area 20654b1d (Paragraph [0268]) and displays the corresponding language text data 'German#18' indicating 'Save' in German at the predetermined location in the word processor (S2). CPU 211 identifies the language item ID 'Language Item#19' in Language Table#4 Storage Area 20654b1d (Paragraph [0268]) and displays the corresponding language text data 'German#19' indicating 'Yes' in German at the predetermined location in the word processor (S3). CPU 211 identifies the language item ID 'Language Item#20' in Language Table#4 Storage Area 20654b1d (Paragraph [0268]) and displays the corresponding language text data 'German#20' indicating 'No' in German at the predetermined location in the word processor (S4). CPU 211 identifies the language item ID 'Language Item#21' in Language Table#4 Storage Area 20654b1d (Paragraph [0268]) and displays the corresponding language text data 'German#21' indicating 'Cancel' in German at the predetermined location in the word processor (S5). The save signal indicating to save the alphanumeric data input in S9 of Paragraph [0302] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0305]—This Paragraph [0305] illustrates the data displayed on LCD 201 (FIG. 1) of Communication Device 200 at the time Language Text Data Displaying Software For Word Processor 20654c3b (Paragraph [0304]) is implemented. In the present embodiment, Prompt 20154Pr is displayed on LCD 201 (FIG. 1) at the time Language Text Data Displaying Software For Word Processor 20654c3a (Paragraph [0302]) is closed. In the present embodiment, Prompt 20154Pr is primarily composed of 20154PrS, 20154PrY, 20154PrN, and 20154PrC. In the present embodiment, 20154PrS is the language text data processed in S2 of the previous Paragraph; 20154PrY is the language text data processed in S3 of the previous Paragraph; 20154PrN is the language text data processed in S4 of the previous Paragraph; and 20154PrC is the language text data processed in S5 of the previous Paragraph.

Paragraph [0306]—This Paragraph [0306] illustrates Language Text Data Displaying Software For Explorer 20654c4 stored in Multiple Language Displaying Software Storage Area 20654c (Paragraph [0271]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#4 Storage Area 20654b1d (Paragraph [0268]) and displays the corresponding language text data 'German#15' indicating 'My Network' in German at the predetermined location in the Windows Explorer like software program (S2). CPU 211 identifies the language item ID 'Language Item#16' in Language Table#4 Storage Area 20654b1d (Paragraph [0268]) and displays the corresponding language text data 'German#16' indicating 'Trash' in German at the predetermined location in the Windows Explorer like software program (S3). CPU 211 identifies the language item ID 'Language Item#17' in Language Table#4 Storage Area 20654b1d (Paragraph [0268]) and displays the corresponding language text data 'German#17' indicating 'Local Disk' in German at the predetermined location in the Windows Explorer like software program (S4).

Paragraph [0307]—This Paragraph [0307] illustrates the data displayed on LCD 201 (FIG. 1) of Communication Device 200 at the time Language Text Data Displaying Software For Explorer 20654c4 (Paragraph [0306]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous Paragraph; 20154MN is the language text data processed in S2 of the previous Paragraph; and 20154Tr is the language text data processed in S3 of the previous Paragraph.

Paragraph [0308]—<<Multiple Language Displaying Function—Utilizing Other Languages>>

Paragraph [0309]—For the avoidance of doubt, the present function is not limited to select a language, to operate Communication Device 200, only from the foregoing four languages of English, Japanese, French, and German. The present function is also capable to select a language from Dutch, Chinese, Arabic, Korean, Spanish, Italian, and any other languages existing in this world, in addition to the foregoing four languages.

Paragraph [0310]—<<Caller's Information Displaying Function>>

Paragraph [0311]—Paragraph [0315] through Paragraph [0360] illustrate the Caller's Information displaying function which displays the Information regarding the caller (e.g., name, phone number, email address, and home address, etc.) on LCD 201 (FIG. 1) when Communication Device 200 is utilized as a 'TV phone'.

Paragraph [0312]—Paragraph [0315] through Paragraph [0322] illustrate the data and software programs stored in RAM 206 (FIG. 1) of Caller's Device, a Communication Device 200, utilized by the caller.

Paragraph [0313]—Paragraph [0323] through Paragraph [0330] illustrate the data and software programs stored in RAM 206 (FIG. 1) of Callee's Device, a Communication Device 200, utilized by the callee.

Paragraph [0314]—Paragraph [0331] through Paragraph [0334] illustrate the data and software programs stored in Host H (Paragraph [0025]).

Paragraph [0315] —This Paragraph [0315] illustrates the storage area included in RAM 206 (FIG. 1) of Caller's Device. In the present embodiment, RAM 206 of Caller's Device includes Caller's Information Displaying Information Storage Area 20655a of which the data and the software programs stored therein are described in Paragraph [0316].

Paragraph [0316]—This Paragraph [0316] illustrates the storage areas included in Caller's Information Displaying Information Storage Area 20655a (Paragraph [0315]). In the present embodiment, Caller's Information Displaying Information Storage Area 20655a includes Caller's Information Displaying Data Storage Area 20655b and Caller's Information Displaying Software Storage Area 20655c. Caller's Information Displaying Data Storage Area 20655b stores the data necessary to implement the present function on the side of Caller's Device, such as the ones described in Paragraph [0317] through Paragraph [0321]. Caller's Information Displaying Software Storage Area 20655c stores the software programs necessary to implement the present function on the side of Caller's Device, such as the ones described in Paragraph [0322].

Paragraph [0317]—This Paragraph [0317] illustrates the storage areas included in Caller's Information Displaying Data Storage Area 20655b. In the present embodiment, Caller's Information Displaying Data Storage Area 20655b includes Caller's Audiovisual Data Storage Area 20655b1, Callee's Audiovisual Data Storage Area 20655b2, Caller's Personal Data Storage Area 20655b3, Callee's Personal Data Storage Area 20655b4, Caller's Calculated GPS Data Storage Area 20655b5, Callee's Calculated GPS Data Storage Area 20655b6, Caller's Map Data Storage Area 20655b7, Callee's Map Data Storage Area 20655b8, and Work Area 20655b9. Caller's Audiovisual Data Storage Area 20655b1 stores the data described in Paragraph [0318]. Callee's Audiovisual Data Storage Area 20655b2 stores the data described in Paragraph [0319]. Caller's Personal Data Storage Area 20655b3 stores the data described in Paragraph [0320]. Callee's Personal Data Storage Area 20655b4 stores the data described in Paragraph [0321]. Caller's Calculated GPS Data Storage Area 20655b5 stores the caller's calculated GPS data which represents the current geographic location of Caller's Device in (x, y, z) format. Callee's Calculated GPS Data Storage Area 20655b6 stores the callee's calculated GPS data which represents the current geographic location of Callee's Device in (x, y, z) format. Caller's Map Data Storage Area 20655b7 stores the map data representing the surrounding area of the location indicated by the caller's calculated GPS data. Callee's Map Data Storage Area 20655b8 stores the map data representing the surrounding area of the location indicated by the callee's calculated GPS data. Work Area 20655b9 is a storage area utilized to perform calculation and to temporarily store data.

Paragraph [0318]—This Paragraph [0318] illustrates the storage areas included in Caller's Audiovisual Data Storage Area 20655b1 (Paragraph [0317]). In the present embodiment, Caller's Audiovisual Data Storage Area 20655b1 includes Caller's Audio Data Storage Area 20655b1a and Caller's Visual Data Storage Area 20655b1b. Caller's Audio Data Storage Area 20655b1a stores the caller's audio data which represents the audio data input via Microphone 215 (FIG. 1) of Caller's Device. Caller's Visual Data Storage Area 20655b1b stores the caller's visual data which represents the visual data input via CCD Unit 214 (FIG. 1) of Caller's Device.

Paragraph [0319]—This Paragraph [0319] illustrates the storage areas included in Callee's Audiovisual Data Storage Area 20655b2 (Paragraph [0317]). In the present embodiment, Callee's Audiovisual Data Storage Area 20655b2 includes Callee's Audio Data Storage Area 20655b2a and Callee's Visual Data Storage Area 20655b2b. Callee's Audio Data Storage Area 20655b2a stores the callee's audio data which represents the audio data sent from Callee's Device. Callee's Visual Data Storage Area 20655b2b stores the callee's visual data which represents the visual data sent from Callee's Device.

Paragraph [0320]—This Paragraph [0320] illustrates the data stored in Caller's Personal Data Storage Area 20655b3 (Paragraph [0317]). In the present embodiment, Caller's Personal Data Storage Area 20655b3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In the present embodiment, Caller's Personal Data Storage Area 20655b3 stores the following data: the caller's name and the corresponding permitted caller's personal data flag '1'; the caller's phone number and the corresponding permitted caller's personal data flag '1'; the caller's email address and the corresponding permitted caller's personal data flag '1'; the caller's home address and the corresponding permitted caller's personal data flag '1'; the caller's business address and the corresponding permitted caller's personal data flag '0'; the caller's title and the corresponding permitted caller's personal data flag '0'; the caller's hobby and the corresponding permitted caller's personal data flag '0'; the caller's blood type and the corresponding permitted caller's personal data flag '0'; the caller's gender and the corresponding permitted caller's personal data flag '0'; the caller's age and the corresponding permitted caller's personal data flag '0'; and caller's date of birth and the corresponding permitted caller's personal data flag '0'.

Paragraph [0321]—This Paragraph [0321] illustrates the data stored in Callee's Personal Data Storage Area 20655b4 (Paragraph [0317]). In the present embodiment, Callee's Personal Data Storage Area 20655b4 stores the callee's personal data which represent the personal data of the callee which are displayed on LCD 201 (FIG. 1) of Caller's Device. In the present embodiment, Callee's Personal Data Storage Area 20655b4 stores the callee's name and phone number.

Paragraph [0322]—This Paragraph [0322] illustrates the software programs stored in Caller's Information Displaying Software Storage Area 20655c (Paragraph [0316]). In the present embodiment, Caller's Information Displaying Software Storage Area 20655c stores Permitted Caller's Personal Data Selecting Software 20655c1, Dialing Software 20655c2, Caller's Device Pin-pointing Software 20655c3, Map Data Sending/Receiving Software 20655c4, Caller's Audiovisual Data Collecting Software 20655c5, Caller's Information Sending/Receiving Software 20655c6, Callee's Information Sending/Receiving Software 20655c6a, Permitted Callee's Personal Data Displaying Software 20655c7, Map Displaying Software 20655c8, Callee's Audio Data Outputting Software 20655c9, and Callee's Visual Data Displaying Software 20655c10. Permitted Caller's Personal Data Selecting Software 20655c1 is the software program described in Paragraph [0336]. Dialing Software 20655c2 is the software program described in Paragraph [0337]. Caller's Device Pin-pointing Software 20655$c$3 is the software program described in Paragraph [0338] and Paragraph [0339]. Map Data Sending/Receiving Software 20655$c$4 is the software program described in Paragraph [0340]. Caller's Audiovisual Data Collecting Software 20655$c$5 is the software program described in Paragraph [0341]. Caller's Information Sending/Receiving Software 20655$c$6 is the software program described in Paragraph [0342]. Callee's Information Sending/Receiving Software 20655$c$6$a$ is the software program described in Paragraph [0356]. Permitted Callee's Personal Data Displaying Software 20655$c$7 is the software program described in Paragraph [0357]. Map Displaying Software 20655$c$8 is the software program described in Paragraph [0358]. Callee's Audio Data Outputting Software 20655$c$9 is the software program described in Paragraph [0359]. Callee's Visual Data Displaying Software 20655$c$10 is the software program described in Paragraph [0360].

Paragraph [0323]—This Paragraph [0323] illustrates the storage area included in RAM 206A (FIG. 1) of Callee's Device. In the present embodiment, RAM 206A of Callee's Device includes Callee's Information Displaying Information Storage Area 20655$a$A of which the data and the software programs stored therein are described in Paragraph [0324].

Paragraph [0324]—This Paragraph [0324] illustrates the storage areas included in Callee's Information Displaying Information Storage Area 20655$a$A (Paragraph [0323]). In the present embodiment, Callee's Information Displaying Information Storage Area 20655$a$A includes Callee's Information Displaying Data Storage Area 20655$b$A and Callee's Information Displaying Software Storage Area 20655$c$A. Callee's Information Displaying Data Storage Area 20655$b$A stores the data necessary to implement the present function on the side of Callee's Device, such as the ones described in Paragraph [0325] through Paragraph [0329]. Callee's Information Displaying Software Storage Area 20655$c$A stores the software programs necessary to implement the present function on the side of Callee's Device, such as the ones described in Paragraph [0330].

Paragraph [0325]—This Paragraph [0325] illustrates the storage areas included in Callee's Information Displaying Data Storage Area 20655$b$A. In the present embodiment, Callee's Information Displaying Data Storage Area 20655$b$A includes Caller's Audiovisual Data Storage Area 20655$b$1A, Callee's Audiovisual Data Storage Area 20655$b$2A, Caller's Personal Data Storage Area 20655$b$3A, Callee's Personal Data Storage Area 20655$b$4A, Caller's Calculated GPS Data Storage Area 20655$b$5A, Callee's Calculated GPS Data Storage Area 20655$b$6A, Caller's Map Data Storage Area 20655$b$7A, Callee's Map Data Storage Area 20655$b$8A, and Work Area 20655$b$9A. Caller's Audiovisual Data Storage Area 20655$b$1A stores the data described in Paragraph [0326]. Callee's Audiovisual Data Storage Area 20655$b$2A stores the data described in Paragraph [0327]. Caller's Personal Data Storage Area 20655$b$3A stores the data described in Paragraph [0328]. Callee's Personal Data Storage Area 20655$b$4A stores the data described in Paragraph [0329]. Caller's Calculated GPS Data Storage Area 20655$b$5A stores the caller's calculated GPS data which represents the current geographic location of Caller's Device in (x, y, z) format. Callee's Calculated GPS Data Storage Area 20655$b$6A stores the callee's calculated GPS data which represents the current geographic location of Callee's Device in (x, y, z) format. Caller's Map Data Storage Area 20655$b$7A stores the map data representing the surrounding area of the location indicated by the caller's calculated GPS data. Callee's Map Data Storage Area 20655$b$8A stores the map data representing the surrounding area of the location indicated by the callee's calculated GPS data. Work Area 20655$b$9A is a storage area utilized to perform calculation and to temporarily store data.

Paragraph [0326]—This Paragraph [0326] illustrates the storage areas included in Caller's Audiovisual Data Storage Area 20655$b$1A (Paragraph [0325]). In the present embodiment, Caller's Audiovisual Data Storage Area 20655$b$1A includes Caller's Audio Data Storage Area 20655$b$1$a$A and Caller's Visual Data Storage Area 20655$b$1$b$A. Caller's Audio Data Storage Area 20655$b$1$a$A stores the caller's audio data which represents the audio data sent from Caller's Device in a wireless fashion. Caller's Visual Data Storage Area 20655$b$1$b$A stores the caller's visual data which represents the visual data input sent from Caller's Device in a wireless fashion.

Paragraph [0327]—This Paragraph [0327] illustrates the storage areas included in Callee's Audiovisual Data Storage Area 20655$b$2A (Paragraph [0325]). In the present embodiment, Callee's Audiovisual Data Storage Area 20655$b$2A includes Callee's Audio Data Storage Area 20655$b$2$a$A and Callee's Visual Data Storage Area 20655$b$2$b$A. Callee's Audio Data Storage Area 20655$b$2$a$A stores the callee's audio data which represents the audio data input via Microphone 215 (FIG. 1) of Callee's Device. Callee's Visual Data Storage Area 20655$b$2$b$A stores the callee's visual data which represents the visual data input via CCD Unit 214 (FIG. 1) of Callee's Device.

Paragraph [0328]—This Paragraph [0328] illustrates the data stored in Caller's Personal Data Storage Area 20655$b$3A (Paragraph [0325]). In the present embodiment, Caller's Personal Data Storage Area 20655$b$3A stores the caller's personal data which represent the personal data of the caller which are displayed on LCD 201 (FIG. 1) of Caller's Device. In the present embodiment, Caller's Personal Data Storage Area 20655$b$3A stores the caller's name, phone number, email address, and home address.

Paragraph [0329]—This Paragraph [0329] illustrates the data stored in Callee's Personal Data Storage Area 20655$b$4A (Paragraph [0325]). In the present embodiment, Callee's Personal Data Storage Area 20655$b$4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the present embodiment, Callee's Personal Data Storage Area 20655$b$4A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

Paragraph [0330]—This Paragraph [0330] illustrates the software programs stored in Callee's Information Displaying Software Storage Area 20655cA (Paragraph [0324]). In the present embodiment, Callee's Information Displaying Software Storage Area 20655cA stores Permitted Callee's Personal Data Selecting Software 20655c1A, Dialing Software 20655c2A, Callee's Device Pin-pointing Software 20655c3A, Map Data Sending/Receiving Software 20655c4A, Callee's Audiovisual Data Collecting Software 20655c5A, Callee's Information Sending/Receiving Software 20655c6A, Caller's Information Sending/Receiving Software 20655c6aA, Permitted Caller's Personal Data Displaying Software 20655c7A, Map Displaying Software 20655c8A, Caller's Audio Data Outputting Software 20655c9A, and Caller's Visual Data Displaying Software 20655c10A. Permitted Callee's Personal Data Selecting Software 20655c1A is the software program described in Paragraph [0349]. Dialing Software 20655c2A is the software program described in Paragraph [0350]. Callee's Device Pin-pointing Software 20655c3A is the software program described in Paragraph [0351] and Paragraph [0352]. Map Data Sending/Receiving Software 20655c4A is the software program described in Paragraph [0353]. Callee's Audiovisual Data Collecting Software 20655c5A is the software program described in Paragraph [0354]. Callee's Information Sending/Receiving Software 20655c6A is the software program described in Paragraph [0355]. Caller's Information Sending/Receiving Software 20655c6aA is the software program described in Paragraph [0343]. Permitted Caller's Personal Data Displaying Software 20655c7A is the software program described in Paragraph [0344]. Map Displaying Software 20655c8A is the software program described in Paragraph [0345]. Caller's Audio Data Outputting Software 20655c9A is the software program described in Paragraph [0346]. Caller's Visual Data Displaying Software 20655c10A is the software program described in Paragraph [0347].

Paragraph [0331]—This Paragraph [0331] illustrates the storage area included in Host H (Paragraph [0025]). In the present embodiment, Host H includes Caller/Callee Information Storage Area H55a of which the data and the software programs stored therein are described in Paragraph [0332].

Paragraph [0332]—This Paragraph [0332] illustrates the storage areas included in Caller/Callee Information Storage Area H55a. In the present embodiment, Caller/Callee Information Storage Area H55a includes Caller/Callee Data Storage Area H55b and Caller/Callee Software Storage Area H55c. Caller/Callee Data Storage Area H55b stores the data necessary to implement the present function on the side of Host H (Paragraph [0025]), such as the ones described in Paragraph [0333]. Caller/Callee Software Storage Area H55c stores the software programs necessary to implement the present function on the side of Host H, such as the ones described in Paragraph [0334].

Paragraph [0333]—This Paragraph [0333] illustrates the storage areas included in Caller/Callee Data Storage Area H55b. In the present embodiment, Caller/Callee Data Storage Area H55b includes Caller's Information Storage Area H55b1, Callee's Information Storage Area H55b2, Map Data Storage Area H55b3, Work Area h55b4, Caller's Calculated GPS Data Storage Area H55b5, and Callee's Calculated GPS Data Storage Area H55b6. Caller's Information Storage Area H55b1 stores the Caller's Information received Caller's Device. Callee's Information Storage Area H55b2 stores the Callee's Information received Callee's Device. Map Data Storage Area H55b3 stores the map data received from Caller's Device and Callee's Device. Work Area H55b4 is a storage area utilized to perform calculation and to temporarily store data. Caller's Calculated GPS Data Storage Area H55b5 stores the caller's calculated GPS data. Callee's Calculated GPS Data Storage Area H55b6 stores the callee's calculated GPS data.

Paragraph [0334]—This Paragraph [0334] illustrates the software programs stored in Caller/Callee Software Storage Area H55c (Paragraph [0334]). In the present embodiment, Caller/Callee Software Storage Area H55c stores Dialing Software H55c2, Caller's Device Pin-pointing Software H55c3, Callee's Device Pin-pointing Software H55c3a, Map Data Sending/Receiving Software H55c4, Caller's Information Sending/Receiving Software H55c6, and Callee's Information Sending/Receiving Software H55c6a. Dialing Software H55c2 is the software program described in Paragraph [0337] and Paragraph [0350]. Caller's Device Pin-pointing Software H55c3 is the software program described in Paragraph [0338]. Callee's Device Pin-pointing Software H55c3a is the software program described in Paragraph [0351]. Map Data Sending/Receiving Software H55c4 is the software program described in Paragraph and Paragraph [0353]. Caller's Information Sending/Receiving Software H55c6 is the software program described in Paragraph [0342]. Callee's Information Sending/Receiving Software H55c6a is the software program described in Paragraph [0355] and Paragraph [0356].

Paragraph [0335]—Paragraph [0336] through Paragraph [0347] primarily illustrate the sequence to output the Caller's Information (which is defined hereinafter) from Callee's Device.

Paragraph [0336]—This Paragraph [0336] illustrates Permitted Caller's Personal Data Selecting Software 20655c1 stored in Caller's Information Displaying Software Storage Area 20655c (Paragraph [0322]) of Caller's Device, which selects the permitted caller's personal data to be displayed on LCD 201 (FIG. 1) of Callee's Device. In the present embodiment, CPU 211 (FIG. 1) of Caller's Device retrieves all of the caller's personal data from Caller's Personal Data Storage Area 20655b3 (Paragraph [0320]) (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4).

Paragraph [0337]—This Paragraph [0337] illustrates Dialing Software H55c2 stored in Caller/Callee Software Storage Area H55c (Paragraph [0334]) of Host H (Paragraph [0025]), Dialing Software 20655c2 stored in Caller's Information Displaying Software Storage Area 20655c (Paragraph [0322]) of Caller's Device, and Dialing Software 20655c2A stored in Callee's Information Displaying Software Storage Area 20655cA (Paragraph [0330]) of Callee's Device, which enables to connect between Caller's Device and Callee's Device via Host H (Paragraph [0025]) in a wireless fashion. In the present embodiment, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

Paragraph [0338]—This Paragraph [0338] illustrates Caller's Device Pin-pointing Software H55c3 (Paragraph [0334]) stored in Caller/Callee Software Storage Area H55c (Paragraph [0334]) of Host H (Paragraph [0025]) and Caller's Device Pin-pointing Software 20655c3 stored in Caller's Information Displaying Software Storage Area 20655c (Paragraph [0322]) of Caller's Device, which identifies the current geographic location of Caller's Device. In the present embodiment, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55b5 (Paragraph [0333]) (S5). Host H then retrieves the caller's calculated GPS data from Caller's Calculated GPS Data Storage Area H55b5 (Paragraph [0333]) (S6), and sends the data to Caller's Device (S7). Upon receiving the caller's calculated GPS data from Host H (S8), CPU 211 stores the data in Caller's Calculated GPS Data Storage Area 20655b5 (Paragraph [0317]) (S9). Here, the GPS raw data are the primitive data utilized to produce the caller's calculated GPS data, and the caller's calculated GPS data is the data representing the location of Caller's Device in (x, y, z) format. The sequence described in the present Paragraph is repeated periodically.

Paragraph [0339]—This Paragraph [0339] illustrates another embodiment of the sequence described in Paragraph [0338] in which the entire process is performed solely by Caller's Device Pin-pointing Software 20655c3 stored in Caller's Information Displaying Software Storage Area 20655c (Paragraph [0322]) of Caller's Device. In the present embodiment, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655b5 (Paragraph [0317]) (S3). The sequence described in the present Paragraph is repeated periodically.

Paragraph [0340]—This Paragraph [0340] illustrates Map Data Sending/Receiving Software H55c4 stored in Caller/Callee Software Storage Area H55c (Paragraph [0334]) of Host H (Paragraph [0025]) and Map Data Sending/Receiving Software 20655c4 stored in Caller's Information Displaying Software Storage Area 20655c (Paragraph [0322]) of Caller's Device, which sends and receives the map data. In the present embodiment, CPU 211 (FIG. 1) of Caller's Device retrieves the caller's calculated GPS data from Caller's Calculated GPS Data Storage Area 20655b5 (Paragraph [0317]) (S1), and sends the data to Host H (S2). Upon receiving the calculated GPS data from Caller's Device (S3), Host H identifies the map data in Map Data Storage Area H55b3 (Paragraph [0333]) (S4). Here, the map data represents the surrounding area of the location indicated by the caller's calculated GPS data. Host H retrieves the map data from Map Data Storage Area H55b3 (Paragraph [0333]) (S5), and sends the data to Caller's Device (S6). Upon receiving the map data from Host H (S7), Caller's Device stores the data in Caller's Map Data Storage Area 20655b7 (Paragraph [0317]) (S8). The sequence described in the present Paragraph is repeated periodically.

Paragraph [0341]—This Paragraph [0341] illustrates Caller's Audiovisual Data Collecting Software 20655c5 stored in Caller's Information Displaying Software Storage Area 20655c (Paragraph [0322]) of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655b1a (Paragraph [0318]) (S2), and the caller's visual data in Caller's Visual Data Storage Area 20655b1b (Paragraph [0318]) (S3). The sequence described in the present Paragraph is repeated periodically.

Paragraph [0342]—This Paragraph [0342] illustrates Caller's Information Sending/Receiving Software H55c6 stored in Caller/Callee Software Storage Area H55c (Paragraph [0334]) of Host H (Paragraph [0025]) and Caller's Information Sending/Receiving Software 20655c6 stored in Caller's Information Displaying Software Storage Area 20655c (Paragraph [0322]) of Caller's Device, which sends and receives the Caller's Information (which is defined hereinafter) between Caller's Device and Host H. In the present embodiment, CPU 211 (FIG. 1) of Caller's Device retrieves the permitted caller's personal data from Caller's Personal Data Storage Area 20655b3 (Paragraph [0320]) (S1). CPU 211 retrieves the caller's calculated GPS data from Caller's Calculated GPS Data Storage Area 20655b5 (Paragraph [0317]) (S2). CPU 211 retrieves the map data from Caller's Map Data Storage Area 20655b7 (Paragraph [0317]) (S3). CPU 211 retrieves the caller's audio data from Caller's Audio Data Storage Area 20655b1a (Paragraph [0318]) (S4). CPU 211 retrieves the caller's visual data from Caller's Visual Data Storage Area 20655b1b (Paragraph [0318]) (S5). CPU 211 then sends the data retrieved in S1 through S5 (collectively defined as the 'Caller's Information' hereinafter) to Host H (S6). Upon receiving the Caller's Information from Caller's Device (S7), Host H stores the Caller's Information in Caller's Information Storage Area H55b1 (Paragraph [0333]) (S8). The sequence described in the present Paragraph is repeated periodically.

Paragraph [0343]—This Paragraph [0343] illustrates Caller's Information Sending/Receiving Software H55c6 stored in Caller/Callee Software Storage Area H55c (Paragraph [0334]) of Host H (Paragraph [0025]) and Caller's Information Sending/Receiving Software 20655c6aA (Paragraph [0330]) stored in Caller's Information Displaying Software Storage Area 20655c (Paragraph [0322]) of Caller's Device, which sends and receives the Caller's Information between Host H and Callee's Device. In the present embodiment, Host H retrieves the Caller's Information from Caller's Information Storage Area H55b1 (Paragraph [0333]) (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655b3A (Paragraph [0328]) (S4). CPU 211 stores the caller's calculated GPS data in Caller's Calculated GPS Data Storage Area 20655b5A (Paragraph [0325]) (S5). CPU 211 stores the map data in Caller's Map Data Storage Area 20655b7A (Paragraph [0325]) (S6). CPU 211 stores the caller's audio data in Caller's Audio Data Storage Area 20655b1aA (Paragraph [0326]) (S7). CPU 211 stores the caller's visual data in Caller's Visual Data Storage Area 20655b1bA (Paragraph [0326]) (S8). The sequence described in the present Paragraph is repeated periodically.

Paragraph [0344]—This Paragraph [0344] illustrates Permitted Caller's Personal Data Displaying Software 20655c7A stored in Callee's Information Displaying Software Storage Area 20655cA (Paragraph [0330]) of Callee's Device, which displays the permitted caller's personal data on LCD 201 (FIG. 1) of Callee's Device. In the present embodiment, CPU 211 (FIG. 1) of Callee's Device retrieves the permitted caller's personal data from Caller's Personal Data Storage Area 20655*b*3A (Paragraph [0328]) (S1). CPU 211 then displays the permitted caller's personal data on LCD 201 (FIG. 1) (S2). The sequence described in the present Paragraph is repeated periodically.

Paragraph [0345]—This Paragraph [0345] illustrates Map Displaying Software 20655*c*8A stored in Callee's Information Displaying Software Storage Area 20655*c*A (Paragraph [0330]) of Callee's Device, which displays the map representing the surrounding area of the location indicated by the caller's calculated GPS data. In the present embodiment, CPU 211 (FIG. 1) of Callee's Device retrieves the caller's calculated GPS data from Caller's Calculated GPS Data Storage Area 20655*b*5A (Paragraph [0325]) (S1). CPU 211 then retrieves the map data from Caller's Map Data Storage Area 20655*b*7A (Paragraph [0325]) (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present Paragraph is repeated periodically.

Paragraph [0346]—This Paragraph [0346] illustrates Caller's Audio Data Outputting Software 20655*c*9A stored in Caller's Information Displaying Software Storage Area 20655*c* (Paragraph [0322]) of Caller's Device, which outputs the caller's audio data from Speaker 216 (FIG. 1) of Callee's Device. In the present embodiment, CPU 211 (FIG. 1) of Callee's Device retrieves the caller's audio data from Caller's Audio Data Storage Area 20655*b*1*a*A (Paragraph [0326]) (S1). CPU 211 then outputs the caller's audio data from Speaker 216 (FIG. 1) (S2). The sequence described in the present Paragraph is repeated periodically.

Paragraph [0347]—This Paragraph [0347] illustrates Caller's Visual Data Displaying Software 20655*c*10A stored in Callee's Information Displaying Software Storage Area 20655*c*A (Paragraph [0330]) of Callee's Device, which displays the caller's visual data on LCD 201 (FIG. 1) of Callee's Device. In the present embodiment, CPU 211 (FIG. 1) of Callee's Device retrieves the caller's visual data from Caller's Visual Data Storage Area 20655*b*1*b*A (Paragraph [0326]) (S1). CPU 211 then displays the caller's visual data on LCD 201 (FIG. 1) (S2). The sequence described in the present Paragraph is repeated periodically.

Paragraph [0348]—Paragraph [0349] through Paragraph [0360] primarily illustrate the sequence to output the Callee's Information (which is defined hereinafter) from Caller's Device.

Paragraph [0349]—This Paragraph [0349] illustrates Permitted Callee's Personal Data Selecting Software 20655*c*1A stored in Callee's Information Displaying Software Storage Area 20655*c*A (Paragraph [0330]) of Callee's Device, which selects the permitted callee's personal data to be displayed on LCD 201 (FIG. 1) of Caller's Device. In the present embodiment, CPU 211 (FIG. 1) of Callee's Device retrieves all of the callee's personal data from Callee's Personal Data Storage Area 20655*b*4A (Paragraph [0329]) (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

Paragraph [0350]—This Paragraph [0350] illustrates Dialing Software H55*c*2 stored in Caller/Callee Software Storage Area H55*c* (Paragraph [0334]) of Host H (Paragraph [0025]), Dialing Software 20655*c*2A stored in Callee's Information Displaying Software Storage Area 20655*c*A (Paragraph [0330]) of Callee's Device, and Dialing Software 20655*c*2 stored in Caller's Information Displaying Software Storage Area 20655*c* (Paragraph [0322]) of Caller's Device, which enables to connect between Callee's Device and Caller's Device via Host H (Paragraph [0025]) in a wireless fashion. In the present embodiment, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present Paragraph is not necessarily implemented if the connection between Caller's Device and Callee's Device is established as described in Paragraph [0337]. The sequence described in the present Paragraph may be implemented if the connection is accidentally terminated by Callee's Device and the connection process is initiated by Callee's Device.

Paragraph [0351]—This Paragraph [0351] illustrates Callee's Device Pin-pointing Software H55*c*3*a* stored in Caller/Callee Software Storage Area H55*c* (Paragraph [0334]) of Host H (Paragraph [0025]) and Callee's Device Pin-pointing Software 20655*c*3A stored in Callee's Information Displaying Software Storage Area 20655*c*A of Callee's Device, which identifies the current geographic location of Callee's Device. In the present embodiment, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55*b*6 (Paragraph [0333]) (S5). Host H then retrieves the callee's calculated GPS data from Callee's Calculated GPS Data Storage Area H55*b*6 (Paragraph [0333]) (S6), and sends the data to Callee's Device (S7). Upon receiving the callee's calculated GPS data from Host H (S8), CPU 211 stores the data in Callee's Calculated GPS Data Storage Area 20655*b*6A (Paragraph [0325]) (S9). Here, the GPS raw data are the primitive data utilized to produce the callee's calculated GPS data, and the callee's calculated GPS data is the data representing the location of Callee's Device in (x, y, z) format. The sequence described in the present Paragraph is repeated periodically.

Paragraph [0352]—This Paragraph [0352] illustrates another embodiment of the sequence described in Paragraph [0351] in which the entire process is performed solely by Callee's Device Pin-pointing Software 20655*c*3A stored in Callee's Information Displaying Software Storage Area 20655*c*A (Paragraph [0330]) of Callee's Device. In the present embodiment, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655*b*6A (Paragraph [0325]) (S3). The sequence described in the present Paragraph is repeated periodically.

Paragraph [0353]—This Paragraph [0353] illustrates Map Data Sending/Receiving Software H55*c*4 stored in Caller/Callee Software Storage Area H55*c* (Paragraph [0334]) of Host H (Paragraph [0025]) and Map Data Sending/Receiving Software 20655*c*4A stored in Callee's Information Displaying Software Storage Area 20655*c*A (Paragraph [0330]) of Callee's Device, which sends and receives the map data. In the present embodiment, CPU 211 (FIG. 1) of Callee's Device retrieves the callee's calculated GPS data from Callee's Calculated GPS Data Storage Area 20655*b*6A (Paragraph [0325]) (S1), and sends the data to Host H (S2). Upon receiving the calculated GPS data from Callee's Device (S3), Host H identifies the map data in Map Data Storage Area H55b3 (Paragraph [0333]) (S4). Here, the map data represents the surrounding area of the location indicated by the callee's calculated GPS data. Host H retrieves the map data from Map Data Storage Area H55b3 (Paragraph [0333]) (S5), and sends the data to Callee's Device (S6). Upon receiving the map data from Host H (S7), Callee's Device stores the data in Callee's Map Data Storage Area 20655b8A (Paragraph [0325]) (S8). The sequence described in the present Paragraph is repeated periodically.

Paragraph [0354]—This Paragraph [0354] illustrates Callee's Audiovisual Data Collecting Software 20655c5A stored in Callee's Information Displaying Software Storage Area 20655cA (Paragraph [0330]) of Callee's Device, which collects the audiovisual data of the callee to be sent to Caller's Device via Antenna 218 (FIG. 1) thereof CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655b2aA (Paragraph [0327]) (S2), and the callee's visual data in Callee's Visual Data Storage Area 20655b2bA (Paragraph [0327]) (S3). The sequence described in the present Paragraph is repeated periodically.

Paragraph [0355]—This Paragraph [0355] illustrates Callee's Information

Sending/Receiving Software H55c6a (Paragraph [0334]) stored in Caller/Callee Software Storage Area H55c (Paragraph [0334]) of Host H (Paragraph [0025]) and Callee's Information Sending/Receiving Software 20655c6A (Paragraph [0330]) stored in Callee's Information Displaying Software Storage Area 20655cA of Callee's Device, which sends and receives the Callee's Information (which is defined hereinafter) between Callee's Device and Host H. In the present embodiment, CPU 211 (FIG. 1) of Callee's Device retrieves the permitted callee's personal data from Callee's Personal Data Storage Area 20655b4A (Paragraph [0329]) (51). CPU 211 retrieves the callee's calculated GPS data from Callee's Calculated GPS Data Storage Area 20655b6A (Paragraph [0325]) (S2). CPU 211 retrieves the map data from Callee's Map Data Storage Area 20655b8A (Paragraph [0325]) (S3). CPU 211 retrieves the callee's audio data from Callee's Audio Data Storage Area 20655b2aA (Paragraph [0327]) (S4). CPU 211 retrieves the callee's visual data from Callee's Visual Data Storage Area 20655b2bA (Paragraph [0327]) (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55b2 (Paragraph [0333]) (S8). The sequence described in the present Paragraph is repeated periodically.

Paragraph [0356]—This Paragraph [0356] illustrates Callee's Information Sending/Receiving Software H55c6a stored in Caller/Callee Software Storage Area H55c (Paragraph [0334]) of Host H (Paragraph [0025]) and Callee's Information Sending/Receiving Software 20655c6a stored in Caller's Information Displaying Software Storage Area 20655c (Paragraph [0322]) of Caller's Device, which sends and receives the Callee's Information between Host H and Caller's Device. In the present embodiment, Host H retrieves the Callee's Information from Callee's Information Storage Area H55b2 (Paragraph [0333]) (51), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655b4 (Paragraph [0321]) (S4). CPU 211 stores the callee's calculated GPS data in Callee's Calculated GPS Data Storage Area 20655b6 (Paragraph [0317]) (S5). CPU 211 stores the map data in Callee's Map Data Storage Area 20655b8 (Paragraph [0317]) (S6). CPU 211 stores the callee's audio data in Callee's Audio Data Storage Area 20655b2a (Paragraph [0319]) (S7). CPU 211 stores the callee's visual data in Callee's Visual Data Storage Area 20655b2b (Paragraph [0319]) (S8). The sequence described in the present Paragraph is repeated periodically.

Paragraph [0357]—This Paragraph [0357] illustrates Permitted Callee's Personal Data Displaying Software 20655c7 stored in Caller's Information Displaying Software Storage Area 20655c (Paragraph [0322]) of Caller's Device, which displays the permitted callee's personal data on LCD 201 (FIG. 1) of Caller's Device. In the present embodiment, CPU 211 (FIG. 1) of Caller's Device retrieves the permitted callee's personal data from Callee's Personal Data Storage Area 20655b4 (Paragraph [0321]) (S1). CPU 211 then displays the permitted callee's personal data on LCD 201 (FIG. 1) (S2). The sequence described in the present Paragraph is repeated periodically.

Paragraph [0358]—This Paragraph [0358] illustrates Map Displaying Software 20655c8 stored in Caller's Information Displaying Software Storage Area 20655c (Paragraph [0322]) of Caller's Device, which displays the map representing the surrounding area of the location indicated by the callee's calculated GPS data. In the present embodiment, CPU 211 (FIG. 1) of Caller's Device retrieves the callee's calculated GPS data from Callee's Calculated GPS Data Storage Area 20655b6 (Paragraph [0317]) (S1). CPU 211 then retrieves the map data from Callee's Map Data Storage Area 20655b8 (Paragraph [0317]) (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4). The sequence described in the present Paragraph is repeated periodically.

Paragraph [0359]—This Paragraph [0359] illustrates Callee's Audio Data Outputting Software 20655c9 stored in Caller's Information Displaying Software Storage Area 20655c (Paragraph [0322]) of Caller's Device, which outputs the callee's audio data from Speaker 216 (FIG. 1) of Caller's Device. In the present embodiment, CPU 211 (FIG. 1) of Caller's Device retrieves the callee's audio data from Callee's Audio Data Storage Area 20655b2a (Paragraph [0319]) (S1). CPU 211 then outputs the caller's audio data from Speaker 216 (FIG. 1) (S2). The sequence described in the present Paragraph is repeated periodically.

Paragraph [0360]—This Paragraph [0360] illustrates Callee's Visual Data Displaying Software 20655c10 stored in Caller's Information Displaying Software Storage Area 20655c (Paragraph [0322]) of Caller's Device, which displays the callee's visual data on LCD 201 (FIG. 1) of Caller's Device. In the present embodiment, CPU 211 (FIG. 1) of Caller's Device retrieves the callee's visual data from Callee's Visual Data Storage Area 20655b2b (Paragraph [0319]) (S1). CPU 211 then displays the callee's visual data on LCD 201 (FIG. 1) (S2). The sequence described in the present Paragraph is repeated periodically.

Paragraph [0361]—<<Communication Device Remote Controlling Function (By Web)>>

Paragraph [0362]—Paragraph [0363] through Paragraph [0386] illustrate the communication device remote controlling function (by web) which enables the user of Communication Device 200 to remotely control Communication Device 200 by an ordinary personal computer (Personal Computer PC) via the Internet, i.e., by accessing a certain web site. Here, Personal Computer PC may be any type of personal computer, including a desktop computer, lap top computer, and PDA.

Paragraph [0363]—This Paragraph [0363] illustrates the storage areas included in Host H (Paragraph [0025]). In the present embodiment, Host H includes Communication Device Controlling Information Storage Area H58a of which the data and the software programs stored therein are described in Paragraph [0364].

Paragraph [0364]—This Paragraph [0364] illustrates the storage areas included in Communication Device Controlling Information Storage Area H58a (Paragraph [0363]). In the present embodiment, Communication Device Controlling Information Storage Area H58a includes Communication Device Controlling Data Storage Area H58b and Communication Device Controlling Software Storage Area H58c. Communication Device Controlling Data Storage Area H58b stores the data necessary to implement the present function on the side of Host H (Paragraph [0025]), such as the ones described in Paragraph [0365] through Paragraph [0368]. Communication Device Controlling Software Storage Area H58c stores the software programs necessary to implement the present function on the side of Host H, such as the ones described in Paragraph [0369].

Paragraph [0365]—This Paragraph [0365] illustrates the storage areas included in Communication Device Controlling Data Storage Area H58b (Paragraph [0364]). In the present embodiment, Communication Device Controlling Data Storage Area H58b includes Password Data Storage Area H58b1, Phone Number Data Storage Area H58b2, Web Display Data Storage Area H58b3, and Work Area H58b4. Password Data Storage Area H58b1 stores the data described in Paragraph [0366]. Phone Number Data Storage Area H58b2 stores the data described in Paragraph [0367]. Web Display Data Storage Area H58b3 stores the data described in Paragraph [0368]. Work Area H58b4 is utilized as a work area to perform calculation and to temporarily store data.

Paragraph [0366]—This Paragraph [0366] illustrates the data stored in Password Data Storage Area H58b1 (Paragraph [0365]). In the present embodiment, Password Data Storage Area H58b1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the present embodiment, Password Data Storage Area H58b1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5'. Paragraph [0367]—This Paragraph [0367] illustrates the data stored in Phone Number Data Storage Area H58b2 (Paragraph [0365]). In the present embodiment, Phone Number Data Storage Area H58b2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the present embodiment, Phone Number Data Storage Area H58b2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5'.

Paragraph [0368]—This Paragraph [0368] illustrates the data stored in Web Display Data Storage Area H58b3 (Paragraph [0365]). In the present embodiment, Web Display Data Storage Area H58b3 comprises two columns, i.e., 'Web Display ID' and 'Web Display Data'. Column 'Web Display ID' stores the web display IDs, and each web display ID represents the identification of the web display data stored in column 'Web Display Data'. Column 'Web Display Data' stores the web display data, and each web display data represents a message displayed on Personal Computer PC. In the present embodiment, Web Display Data Storage Area H58b3 stores the following data: the web display ID 'Web Display#0' and the corresponding web display data 'Web Display Data#0'; the web display ID 'Web Display#1' and the corresponding web display data 'Web Display Data#1'; the web display ID 'Web Display#2' and the corresponding web display data 'Web Display Data#2'; the web display ID 'Web Display#3' and the corresponding web display data 'Web Display Data#3'; the web display ID 'Web Display#4' and the corresponding web display data 'Web Display Data#4'; the web display ID 'Web Display#5' and the corresponding web display data 'Web Display Data#5'; and the web display ID 'Web Display#6' and the corresponding web display data 'Web Display Data#6'. 'Web Display Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Web Display Data#1' represents the message: 'The manner mode has been deactivated.' 'Web Display Data#2' represents the message: 'The manner mode has been deactivated and your mobile phone has been rung.' 'Web Display Data#3' represents the message: 'Your mobile phone has been rung.' 'Web Display Data#4' represents the message: 'The password of your mobile phone has been changed.' 'Web Display Data#5' represents the message: 'Your mobile phone has been changed.' 'Web Display Data#6' represents the message: 'Your mobile phone has been power-offed.' Paragraph [0368] a illustrates the display of Personal Computer PC. In the present embodiment, Home Page 20158HP, i.e., a home page to implement the present function is displayed on Personal Computer PC. Home Page 20158HP is primarily composed of Web Display Data#0 (Paragraph [0368]) and six buttons, i.e., Buttons 1 through 6. Following the instruction described in Web Display Data#0, the user may select one of the buttons to implement the desired function as described hereinafter.

Paragraph [0369]—This Paragraph [0369] illustrates the software programs stored in Communication Device Controlling Software Storage Area H58c (Paragraph [0364]). In the present embodiment, Communication Device Controlling Software Storage Area H58c stores User Authenticating Software H58c1, Menu Introducing Software H58c2, Line Connecting Software H58c3, Manner Mode Deactivating Software H58c4, Manner Mode Deactivating & Ringing Software H58c5, Ringing Software H58c6, Password Changing Software H58*c*7, Device Locking Software H58*c*8, and Power Off Software H58*c*9. User Authenticating Software H58*c*1 is the software program described in Paragraph [0378]. Menu Introducing Software H58*c*2 is the software program described in Paragraph [0379]. Line Connecting Software H58*c*3 is the software program described in Paragraph [0380]. Manner Mode Deactivating Software H58*c*4 is the software program described in Paragraph [0381]. Manner Mode Deactivating & Ringing Software H58*c*5 is the software program described in Paragraph [0382]. Ringing Software H58*c*6 is the software program described in Paragraph [0383]. Password Changing Software H58*c*7 is the software program described in Paragraph [0384]. Device Locking Software H58*c*8 is the software program described in Paragraph [0385]. Power Off Software H58*c*9 is the software program described in Paragraph [0386].

Paragraph [0370]—This Paragraph [0370] illustrates the storage area included in RAM 206 (FIG. 1). In the present embodiment, RAM 206 includes Communication Device Controlling Information Storage Area 20658*a* of which the data and the software programs stored therein are described in Paragraph [0371].

Paragraph [0371]—This Paragraph [0371] illustrates the storage areas included in Communication Device Controlling Information Storage Area 20658*a* (Paragraph [0370]). In the present embodiment, Communication Device Controlling Information Storage Area 20658*a* includes Communication Device Controlling Data Storage Area 20658*b* and Communication Device Controlling Software Storage Area 20658*c*. Communication Device Controlling Data Storage Area 20658*b* stores the data necessary to implement the present function on the side of Communication Device 200, such as the ones described in Paragraph [0373] through Paragraph [0375]. Communication Device Controlling Software Storage Area 20658*c* stores the software programs necessary to implement the present function on the side of Communication Device 200, such as the ones described in Paragraph [0376].

Paragraph [0372]—The data and/or the software programs stored in Communication Device Controlling Information Storage Area 20658*a* (Paragraph [0371]) may be downloaded from Host H (Paragraph [0025]).

Paragraph [0373]—This Paragraph [0373] illustrates the storage areas included in Communication Device Controlling Data Storage Area 20658*b* (Paragraph [0371]). In the present embodiment, Communication Device Controlling Data Storage Area 20658*b* includes Password Data Storage Area 20658*b*1 and Work Area 20658*b*4. Password Data Storage Area 20658*b*1 stores the data described in Paragraph [0374]. Work Area 20658*b*4 is utilized as a work area to perform calculation and to temporarily store data.

Paragraph [0374]—This Paragraph [0374] illustrates the data stored in Password Data Storage Area 20658*b*1 (Paragraph [0373]). In the present embodiment, Password Data Storage Area 20658*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the present embodiment, Password Data Storage Area H58*b*1 stores the following data: the user ID 'User#1' and the corresponding password data 'Password Data#1'.

Paragraph [0375]—This Paragraph [0375] illustrates the data stored in Phone Number Data Storage Area 20658*b*2 (Paragraph [0373]). In the present embodiment, Phone Number Data Storage Area 20658*b*2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the present embodiment, Phone Number Data Storage Area H58*b*2 stores the following data: the user ID 'User#1' and the corresponding phone number data 'Phone Number Data#1'.

Paragraph [0376]—This Paragraph [0376] illustrates the software programs stored in Communication Device Controlling Software Storage Area 20658*c* (Paragraph [0371]). In the present embodiment, Communication Device Controlling Software Storage Area 20658*c* stores Line Connecting Software 20658*c*3, Manner Mode Deactivating Software 20658*c*4, Manner Mode Deactivating & Ringing Software 20658*c*5, Ringing Software 20658*c*6, Password Changing Software 20658*c*7, Device Locking Software 20658*c*8, and Power Off Software 20658*c*9. Line Connecting Software 20658*c*3 is the software program described in Paragraph [0380]. Manner Mode Deactivating Software 20658*c*4 is the software program described in Paragraph [0381]. Manner Mode Deactivating & Ringing Software 20658*c*5 is the software program described in Paragraph [0382]. Ringing Software 20658*c*6 is the software program described in Paragraph [0383]. Password Changing Software 20658*c*7 is the software program described in Paragraph [0384]. Device Locking Software 20658*c*8 is the software program described in Paragraph [0385]. Power Off Software 20658*c*9 is the software program described in Paragraph [0386].

Paragraph [0377]—Paragraph [0378] through Paragraph [0386] illustrate the software programs which enables the user of Communication Device 200 to remotely control Communication Device 200 by Personal Computer PC.

Paragraph [0378]—This Paragraph [0378] illustrates User Authenticating Software H58*c*1 (Paragraph [0369]) stored in Communication Device Controlling Software Storage Area H58*c* of Host H (Paragraph [0025]), which authenticates the user of Communication Device 200 to implement the present function via Personal Computer PC. In the present embodiment, Personal Computer PC sends an access request to Host H via the Internet (S1). Upon receiving the request from Personal Computer PC (S2) and the line is connected therebetween (S3), the user, by utilizing Personal Computer PC, inputs both his/her password data (S4) and the phone number data of Communication Device 200 (S5). Host H initiates the authentication process by referring to Password Data Storage Area H58*b*1 (Paragraph [0366]) and Phone Number Data Storage Area H58*b*2 (Paragraph [0367])) (S6). The authentication process is completed (and the sequences described hereafter are enabled thereafter) if the password data and the phone number data described in S4 and S5 match with the data stored in Password Data Storage Area H58*b*1 and Phone Number Data Storage Area H58*b*2.

Paragraph [0379]—This Paragraph [0379] illustrates Menu Introducing Software H58*c*2 (Paragraph [0369]) stored in Communication Device Controlling Software Storage Area H58*c* of Host H (Paragraph [0025]), which introduces the menu on Personal Computer PC. In the present embodiment, Host H retrieves Web Display Data#0 from Web Display Data Storage Area H58*b*3 (Paragraph [0368]) (S1), and sends the data to Personal Computer PC (S2). Upon receiving Web Display Data#0 from Host H (S3), Personal Computer PC displays Web Display Data#0 on its display (S4). The user selects from one of the buttons of '1' through '6' wherein the sequences implemented thereafter are described in Paragraph [0380] through Paragraph [0386] (S5).

Paragraph [0380]—This Paragraph [0380] illustrates Line Connecting Software H58c3 (Paragraph [0369]) stored in Communication Device Controlling Software Storage Area H58c of Host H (Paragraph [0025]) and Line Connecting Software 20658c3 (Paragraph [0376]) stored in Communication Device Controlling Software Storage Area 20658c of Communication Device 200, which connect line between Host H and Communication Device 200. In the present embodiment, Host H calls Communication Device 200 by retrieving the corresponding phone number data from Phone Number Data Storage Area H58b2 (Paragraph [0367]) (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

Paragraph [0381]—This Paragraph [0381] illustrates Manner Mode Deactivating Software H58c4 (Paragraph [0369]) stored in Communication Device Controlling Software Storage Area H58c of Host H (Paragraph [0025]) and Manner Mode Deactivating Software 20658c4 (Paragraph [0376]) stored in Communication Device Controlling Software Storage Area 20658c of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user selects button '1' displayed on Personal Computer PC (S1). In response, Personal Computer PC sends the corresponding signal to Host H via the Internet (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Web Display Data#1 from Web Display Data Storage Area H58b3 (Paragraph [0368]) and sends the data to Personal Computer PC (S6). Upon receiving Web Display Data#1 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58c5 and Manner Mode Deactivating & Ringing Software 20658c5 is merely to let the user to identify the location of Communication Device 200. Therefore, a voice communication between human beings is not enabled thereafter.

Paragraph [0382]—This Paragraph [0382] illustrates Manner Mode Deactivating & Ringing Software H58c5 (Paragraph [0369]) stored in Communication Device Controlling Software Storage Area H58c of Host H (Paragraph [0025]) and Manner Mode Deactivating & Ringing Software 20658c5 (Paragraph [0376]) stored in Communication Device Controlling Software Storage Area 20658c of Communication Device 200, which deactivate the manner mode of Communication Device 200 and outputs a ringing sound thereafter. Assume that the user selects button '2' displayed on Personal Computer PC (S1). In response, Personal Computer PC sends the corresponding signal to Host H via the Internet (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Web Display Data#2 from Web Display Data Storage Area H58b3 (Paragraph [0368]) and sends the data to Personal Computer PC (S7). Upon receiving Web Display Data#2 from Host H, Personal Computer PC displays the data (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58c5 and Manner Mode Deactivating & Ringing Software 20658c5 is merely to let the user to identify the location of Communication Device 200. Therefore, a voice communication between human beings is not enabled thereafter by implementing the present function.

Paragraph [0383]—This Paragraph [0383] illustrates Ringing Software H58c6 (Paragraph [0369]) stored in Communication Device Controlling Software Storage Area H58c of Host H (Paragraph [0025]) and Ringing Software 20658c6 (Paragraph [0376]) stored in Communication Device Controlling Software Storage Area 20658c of Communication Device 200, which output a ringing sound from Speaker 216 (FIG. 1). Assume that the user selects button '3' displayed on Personal Computer PC (S1). In response, Personal Computer PC sends the corresponding signal to Host H via the Internet (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Web Display Data#3 from Web Display Data Storage Area H58b3 (Paragraph [0368]) and sends the data to Personal Computer PC (S6). Upon receiving Web Display Data#3 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H58c6 and Ringing Software 20658c6 is merely to let the user to identify the location of Communication Device 200. Therefore, a voice communication between human beings is not enabled thereafter by implementing the present function.

Paragraph [0384]—This Paragraph [0384] illustrates Password Changing Software H58c7 (Paragraph [0369]) stored in Communication Device Controlling Software Storage Area H58c of Host H (Paragraph [0025]) and Password Changing Software 20658c7 (Paragraph [0376]) stored in Communication Device Controlling Software Storage Area 20658c of Communication Device 200, which change the password necessary to operate Communication Device 200. Assume that the user selects button '4' displayed on Personal Computer PC (S1). In response, Personal Computer PC sends the corresponding signal to Host H via the Internet (S2). The user then enters a new password data by utilizing Personal Computer PC (S3), which is sent to Communication Device 200 by Host H (S4). Upon receiving the new password data from Host H (S5), Communication Device 200 stores the new password data in Password Data Storage Area 20658b1 (Paragraph [0374]) and the old password data is erased (S6). Host H retrieves Web Display Data#4 from Web Display Data Storage Area H58*b*3 (Paragraph [0368]) and sends the data to Personal Computer PC (S7). Upon receiving Web Display Data#4 from Host H, Personal Computer PC displays the data (S8).

Paragraph [0385]—This Paragraph [0385] illustrates Device Locking Software H58*c*8 (Paragraph [0369]) stored in Communication Device Controlling Software Storage Area H58*c* of Host H (Paragraph [0025]) and Device Locking Software 20658*c*8 (Paragraph [0376]) stored in Communication Device Controlling Software Storage Area 20658*c* of Communication Device 200, which lock Communication Device 200, i.e., nullify any input signal input via Input Device 210 (FIG. 1). Assume that the user selects button '5' displayed on Personal Computer PC (S1). In response, Personal Computer PC sends the corresponding signal to Host H via the Internet (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20658*b*1 (Paragraph [0374]) is entered (S5). Host H retrieves Web Display Data#5 from Web Display Data Storage Area H58*b*3 (Paragraph [0368]) and sends the data to Personal Computer PC (S6). Upon receiving Web Display Data#5 from Host H, Personal Computer PC displays the data (S7).

Paragraph [0386]—This Paragraph [0386] illustrates Power Off Software H58*c*9 (Paragraph [0369]) stored in Communication Device Controlling Software Storage Area H58*c* of Host H (Paragraph [0025]) and Power Off Software 20658*c*9 (Paragraph [0376]) stored in Communication Device Controlling Software Storage Area 20658*c* of Communication Device 200, which turn off the power of Communication Device 200. Assume that the user selects button '6' displayed on Personal Computer PC (S1). In response, Personal Computer PC sends the corresponding signal to Host H via the Internet (S2). Host H, upon receiving the signal described in S2, sends a power off command to Communication Device 200 (S3). Upon receiving the power off command from Host H (S4), Communication Device 200 turns off the power of itself (S5). Host H retrieves Web Display Data#6 from Web Display Data Storage Area H58*b*3 (Paragraph [0368]) and sends the data to Personal Computer PC (S6). Upon receiving Web Display Data#6 from Host H, Personal Computer PC displays the data (S7).

Paragraph [0387]—<<Shortcut Icon Displaying Function>>

Paragraph [0388]—Paragraph [0389] through Paragraph [0409] illustrate the shortcut icon displaying function which displays one or more of shortcut icons on LCD 201 (FIG. 1) of Communication Device 200. The user of Communication Device 200 can execute the software programs in a convenient manner by selecting (e.g., clicking or double clicking) the shortcut icons. The foregoing software programs may be any software programs described in this specification.

Paragraph [0389]—This Paragraph [0389] illustrates the shortcut icons displayed on LCD 201 (FIG. 1) of Communication Device 200 by implementing the present function. In this embodiment, three shortcut icons are displayed on LCD 201 (FIG. 1), i.e., Shortcut Icon#1, Shortcut Icon#2, and Shortcut Icon#3. The user of Communication Device 200 can execute the software programs by selecting (e.g., clicking or double clicking) one of the shortcut icons. For example, assume that Shortcut Icon#1 represents MS Word 97. By selecting (e.g., clicking or double clicking) Shortcut Icon#1, the user can execute MS Word 97 installed in Communication Device 200 or Host H. Three shortcut icons are illustrated in the present drawing, however, only for purposes of simplifying the explanation of the present function. Therefore, as many shortcut icons equivalent to the number of the software programs described in this specification may be displayed on LCD 201, and the corresponding software programs may be executed by implementing the present function.

Paragraph [0390]—This Paragraph [0390] illustrates the storage area included in RAM 206 (FIG. 1). In this embodiment, RAM 206 includes Shortcut Icon Displaying Information Storage Area 20659*a* of which the data and the software programs stored therein are described in Paragraph [0391].

Paragraph [0391]—This Paragraph [0391] illustrates the storage areas included in Shortcut Icon Displaying Information Storage Area 20659*a* (Paragraph [0390]). In this embodiment, Shortcut Icon Displaying Information Storage Area 20659*a* includes Shortcut Icon Displaying Data Storage Area 20659*b* and Shortcut Icon Displaying Software Storage Area 20659*c*. Shortcut Icon Displaying Data Storage Area 20659*b* stores the data necessary to implement the present function, such as the ones described in Paragraph [0393]. Shortcut Icon Displaying Software Storage Area 20659*c* stores the software programs necessary to implement the present function, such as the ones described in Paragraph [0398].

Paragraph [0392]—The data and/or the software programs stored in Shortcut Icon Displaying Software Storage Area 20659*c* (Paragraph [0391]) may be downloaded from Host H (Paragraph [0025]).

Paragraph [0393]—This Paragraph [0393] illustrates the storage areas included in Shortcut Icon Displaying Data Storage Area 20659*b* (Paragraph [0391]). In this embodiment, Shortcut Icon Displaying Data Storage Area 20659*b* includes Shortcut Icon Image Data Storage Area 20659*b*1, Shortcut Icon Location Data Storage Area 20659*b*2, Shortcut Icon Link Data Storage Area 20659*b*3, and Selected Shortcut Icon Data Storage Area 20659*b*4. Shortcut Icon Image Data Storage Area 20659*b*1 stores the data described in Paragraph [0394]. Shortcut Icon Location Data Storage Area 20659*b*2 stores the data described in Paragraph [0395]. Shortcut Icon Link Data Storage Area 20659*b*3 stores the data described in Paragraph [0396]. Selected Shortcut Icon Data Storage Area 20659*b*4 stores the data described in Paragraph [0397].

Paragraph [0394]—This Paragraph [0394] illustrates the data stored in Shortcut Icon Image Data Storage Area 20659*b*1 (Paragraph [0393]). In this embodiment, Shortcut Icon Image Data Storage Area 20659*b*1 comprises two columns, i.e., 'Shortcut Icon ID' and 'Shortcut Icon Image Data'. Column 'Shortcut Icon ID' stores the shortcut icon IDs, and each shortcut icon ID is the identification of the corresponding shortcut icon image data stored in column 'Shortcut Icon Image Data'. Column 'Shortcut Icon Image Data' stores the shortcut icon image data, and each shortcut icon image data is the image data of the shortcut icon displayed on LCD 201 (FIG. 1) as described in Paragraph [0389]. In this embodiment, Shortcut Icon Image Data Storage Area 20659*b*1 stores the following data: the shortcut icon ID 'Shortcut Icon#1' and the corresponding shortcut icon image data 'Shortcut Icon Image Data#1'; the shortcut icon ID 'Shortcut Icon#2' and the corresponding shortcut icon image data 'Shortcut Icon Image Data#2'; the shortcut icon ID 'Shortcut Icon#3' and the corresponding shortcut icon image data 'Shortcut Icon Image Data#3'; and the shortcut icon ID 'Shortcut Icon#4' and the corresponding shortcut icon image data 'Shortcut Icon Image Data#4'.

Paragraph [0395]—This Paragraph [0395] illustrates the data stored in Shortcut Icon Location Data Storage Area 20659*b*2 (Paragraph [0393]). In this embodiment, Shortcut Icon Location Data Storage Area 20659b2 comprises two columns, i.e., 'Shortcut Icon ID' and 'Shortcut Icon Location Data'. Column 'Shortcut Icon ID' stores the shortcut icon IDs described hereinbefore. Column 'Shortcut Icon Location Data' stores the shortcut icon location data, and each shortcut icon location data indicates the location displayed on LCD 201 (FIG. 1) in (x,y) format of the shortcut icon image data of the corresponding shortcut icon ID. In this embodiment, Shortcut Icon Location Data Storage Area 20659b2 stores the following data: the shortcut icon ID 'Shortcut Icon#1' and the corresponding shortcut icon location data 'Shortcut Icon Location Data#1'; the shortcut icon ID 'Shortcut Icon#2' and the corresponding shortcut icon location data 'Shortcut Icon Location Data#2'; the shortcut icon ID 'Shortcut Icon#3' and the corresponding shortcut icon location data 'Shortcut Icon Location Data#3'; and the shortcut icon ID 'Shortcut Icon#4' and the corresponding shortcut icon location data 'Shortcut Icon Location Data#4'.

Paragraph [0396]—This Paragraph [0396] illustrates the data stored in Shortcut Icon Link Data Storage Area 20659b3 (Paragraph [0393]). In this embodiment, Shortcut Icon Link Data Storage Area 20659b3 comprises two columns, i.e., 'Shortcut Icon ID' and 'Shortcut Icon Link Data'. Column 'Shortcut Icon ID' stores the shortcut icon IDs described hereinbefore. Column 'Shortcut Icon Link Data' stores the shortcut icon link data, and each shortcut icon link data represents the location in Communication Device 200 of the software program stored therein represented by the shortcut icon of the corresponding shortcut icon ID. In this embodiment, Shortcut Icon Link Data Storage Area 20659b3 stores the following data: the shortcut icon ID 'Shortcut Icon#1' and the corresponding shortcut icon link data 'Shortcut Icon Link Data#1'; 'the shortcut icon ID' 'Shortcut Icon#2' and the corresponding shortcut icon link data 'Shortcut Icon Link Data#2'; the shortcut icon ID 'Shortcut Icon#3' and the corresponding shortcut icon link data 'Shortcut Icon Link Data#3'; and the shortcut icon ID 'Shortcut Icon#4' and the corresponding shortcut icon link data 'Shortcut Icon Link Data#4'. The foregoing software program may be any software program described in this specification.

Paragraph [0397]—This Paragraph [0397] illustrates the data stored in Selected Shortcut Icon Data Storage Area 20659b4 (Paragraph [0393]). In this embodiment, Selected Shortcut Icon Data Storage Area 20659b4 stores one or more of shortcut icon IDs. Only the shortcut icon image data of the shortcut icon IDs stored in Selected Shortcut Icon Data Storage Area 20659b4 are displayed on LCD 201 (FIG. 1). In this embodiment, Selected Shortcut Icon Data Storage Area 20659b4 stores the following data: the shortcut icon IDs 'Shortcut Icon#1', 'Shortcut Icon#2', and 'Shortcut Icon#3', which means that only the shortcut icon image data corresponding to 'Shortcut Icon#1', 'Shortcut Icon#2', and 'Shortcut Icon#3' are displayed on LCD 201.

Paragraph [0398]—This Paragraph [0398] illustrates the software programs stored in Shortcut Icon Displaying Software Storage Area 20659c (Paragraph [0391]). In this embodiment, Shortcut Icon Displaying Software Storage Area 20659c stores Shortcut Icon Displaying Software 20659c1, Software Executing Software 20659c2, Shortcut Icon Location Data Changing Software 20659c3, and Software Executing Software 20659c4. Shortcut Icon Displaying Software 20659c1 is the software program described in Paragraph [0399]. Software Executing Software 20659c2 is the software program described in Paragraph [0400]. Shortcut Icon Location Data Changing Software 20659c3 is the software program described in Paragraph [0401]. Software Executing Software 20659c4 is the software program described in Paragraph [0409].

Paragraph [0399]—This Paragraph [0399] illustrates Shortcut Icon Displaying Software 20659c1 stored in Shortcut Icon Displaying Software Storage Area 20659c of Communication Device 200, which displays the shortcut icon image data displayed on LCD 201 (FIG. 1) of Communication Device 200. In this embodiment, CPU 211 (FIG. 1) refers to the shortcut icon IDs stored in Selected Shortcut Icon Data Storage Area 20659b4 (Paragraph [0397]) to identify the shortcut icon image data to be displayed on LCD 201 (FIG. 1) (S1). CPU 211 then retrieves the shortcut icon image data of the corresponding shortcut icon IDs identified in S1 from Shortcut Icon Image Data Storage Area 20659b1 (Paragraph [0394]) (S2). CPU 211 further retrieves the shortcut icon location data of the corresponding shortcut icon IDs identified in S1 from Shortcut Icon Location Data Storage Area 20659b2 (Paragraph [0395]) (S3). CPU 211 displays on LCD 201 (FIG. 1) the shortcut icon image data thereafter (S4).

Paragraph [0400]—This Paragraph [0400] illustrates Software Executing Software 20659c2 stored in Shortcut Icon Displaying Software Storage Area 20659c of Communication Device 200, which executes the corresponding software program upon selecting the shortcut icon image data displayed on LCD 201 (FIG. 1) of Communication Device 200. In this embodiment, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659b3 (Paragraph [0396]) from the shortcut icon ID identified in S2 (S3), and executes the corresponding software program (S4).

Paragraph [0401]—This Paragraph [0401] illustrates Shortcut Icon Location Data Changing Software 20659c3 stored in Shortcut Icon Displaying Software Storage Area 20659c of Communication Device 200, which enables the user of Communication Device 200 to change the location of the shortcut icon image data displayed on LCD 201 (FIG. 1). In this embodiment, the user of Communication Device 200 selects the shortcut icon image data displayed on LCD 201 (S1). CPU 211 (FIG. 1) then identifies the shortcut icon ID of the shortcut icon image data selected in S1 (S2). The user moves the shortcut icon selected in S1 by utilizing Input Device 210 (FIG. 1) or via voice recognition system (S3). CPU 211 then identifies the new location thereof (S4), and updates the shortcut icon location data stored in Shortcut Icon Location Data Storage Area 20659b2 (Paragraph [0395]) (S5).

Paragraph [0402]—<<Shortcut Icon Displaying Function—Executing Software In Host H>>

Paragraph [0403]—Paragraph [0404] through Paragraph [0409] illustrate the implementation of the present invention wherein the user of Communication Device 200 executes the software programs stored in Host H (Paragraph [0025]) by selecting the shortcut icons displayed on LCD 201 (FIG. 1).

Paragraph [0404]—This Paragraph [0404] illustrates the storage areas included in Host H (Paragraph [0025]). In this embodiment, Host H includes Shortcut Icon Displaying Information Storage Area H59a of which the data and the software programs stored therein are described in Paragraph [0405].

Paragraph [0405]—This Paragraph [0405] illustrates the storage areas included in Shortcut Icon Displaying Information Storage Area H59a (Paragraph [0404]). In this embodiment, Shortcut Icon Displaying Information Storage Area H59a includes Shortcut Icon Displaying Data Storage Area H59b and Shortcut Icon Displaying Software Storage Area H59c. Shortcut Icon Displaying Data Storage Area H59b stores the data necessary to implement the present function on the side of Host H, such as the ones described in Paragraph [0406] and Paragraph [0407]. Shortcut Icon Displaying Software Storage Area H59c stores the software programs necessary to implement the present function on the side of Host H, such as the ones described in Paragraph [0408].

Paragraph [0406]—This Paragraph [0406] illustrates the storage area included in Shortcut Icon Displaying Data Storage Area H59b (Paragraph [0405]). In this embodiment, Shortcut Icon Displaying Data Storage Area H59b includes Software Programs Storage Area H59b1. Software Programs Storage Area H59b1 stores the data described in Paragraph [0407].

Paragraph [0407]—This Paragraph [0407] illustrates the data stored in Software Programs Storage Area H59b1 (Paragraph [0406]). In this embodiment, Software Programs Storage Area H59b1 comprises two columns, i.e., 'Software ID' and 'Software Program'. Column 'Software ID' stores the software IDs, and each software ID is an identification of the software program stored in column 'Software Program'. Column 'Software Program' stores the software programs. In this embodiment, Software Programs Storage Area H59b1 stores the following data: software ID 'Software#3' and the corresponding software program 'Software Program#3'; software ID 'Software#4' and the corresponding software program 'Software Program#4'; software ID 'Software#5' and the corresponding software program 'Software Program#5'; and software ID 'Software#6' and the corresponding software program 'Software Program#6'. Here, the software programs may be any software programs which are stored in Host H (Paragraph [0025]) described in this specification. As another embodiment, the software programs may be any software programs stored in RAM 206 (FIG. 1) of Communication Device 200 described in this specification.

Paragraph [0408]—This Paragraph [0408] illustrates the software program stored in Shortcut Icon Displaying Software Storage Area H59c (Paragraph [0405]). In this embodiment, Shortcut Icon Displaying Software Storage Area H59c stores Software. Executing Software H59c4. Software Executing Software H59c4 is the software program described in Paragraph [0409].

Paragraph [0409]—This Paragraph [0409] illustrates Software Executing Software H59c4 stored in Shortcut Icon Displaying Software Storage Area H59c (Paragraph [0408]) of Host H (Paragraph [0025]) and Software Executing Software 20659c4 stored in Shortcut Icon Displaying Software Storage Area 20659c (Paragraph [0398]) of Communication Device 200, which execute the corresponding software program upon selecting the shortcut icon image data displayed on LCD 201 (FIG. 1) of Communication Device 200. In this embodiment, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659b3 (Paragraph [0396]) from the shortcut icon ID identified in S2 (S3), which is sent to Host H (S4). Upon receiving the shortcut icon link data from Communication Device 200 (S5), Host H executes the corresponding software program (S6) and produces the relevant display data, which are send to Communication Device 200 (S7). Upon receiving the relevant display data from Host H, Communication Device 200 displays the data on LCD 201 (S8).

Paragraph [0410]—<<Multiple Channel Processing Function>>

Paragraph [0411]—Paragraph [0412] through Paragraph [0441] illustrates the multiple channel processing function which enables Communication Device 200 to send and receive a large amount of data in a short period of time by increasing the upload and download speed.

Paragraph [0412]—This Paragraph [0412] illustrates the storage area included in Host H (Paragraph [0025]). In this embodiment, Host H includes Multiple Channel Processing Information Storage Area H61a of which the data and the software programs stored therein are described in Paragraph [0413]. Here, Host H is a base station which communicates with Communication Device 200 in a wireless fashion.

Paragraph [0413]—This Paragraph [0413] illustrates the storage areas included in Multiple Channel Processing Information Storage Area H61a (Paragraph [0412]). In this embodiment, Multiple Channel Processing Information Storage Area H61a includes Multiple Channel Processing Data Storage Area H61b and Multiple Channel Processing Software Storage Area H61c. Multiple Channel Processing Data Storage Area H61b stores the data necessary to implement the present function on the side of Host H (Paragraph [0025]), such as the ones described in Paragraph [0414] through Paragraph [0419]. Multiple Channel Processing Software Storage Area H61c stores the software programs necessary to implement the present function on the side of Host H, such as the ones described in Paragraph [0420].

Paragraph [0414]—This Paragraph [0414] illustrates the storage areas included in Multiple Channel Processing Data Storage Area H61b (Paragraph [0413]). In this embodiment, Multiple Channel Processing Data Storage Area H61b includes User Data Storage Area H61b1, Channel Number Storage Area H61b2, and Signal Type Data Storage Area H61b3. User Data Storage Area H61b1 stores the data described in Paragraph [0415]. Channel Number Storage Area H61b2 stores the data described in Paragraph [0416] and Paragraph [0417]. Signal Type Data Storage Area H61b3 stores the data described in Paragraph [0418] and Paragraph [0419].

Paragraph [0415]—This Paragraph [0415] illustrates the data stored in User Data Storage Area H61b1 (Paragraph [0414]). In this embodiment, User Data Storage Area H61b1 comprises two columns, i.e., 'User ID' and 'User Data'. Column 'User ID' stores the user IDs, and each user ID in an identification of the user of Communication Device 200. Column 'User Data' stores the user data, and each user data represents the personal data of the user of the corresponding user ID, such as name, home address, office address, phone number, email address, fax number, age, sex, credit card number of the user of the corresponding user ID. In this embodiment, User Data Storage Area H61b1 stores the following data: the user ID 'User#1' and the corresponding user data 'User Data#1'; the user ID 'User#2' and the corresponding user data 'User Data#2'; the user ID 'User#3' and the corresponding user data 'User Data#3'; and the user ID 'User#4' and the corresponding user data 'User Data#4'.

Paragraph [0416]—This Paragraph [0416] illustrates the data stored in Channel Number Storage Area H61b2 (Paragraph [0414]). In this embodiment, Channel Number Storage Area H61b2 comprises two columns, i.e., 'Channel ID' and 'User ID'. Column 'Channel ID' stores the channel IDs, and each channel ID is an identification of the channel which is assigned to each Communication Device 200 and through which Host H (Paragraph [0025]) and Communication Device 200 send and receive data. Normally one channel ID is assigned to one user ID. Column 'User ID' stores the user IDs described hereinbefore. In this embodiment, Channel Number Storage Area H61*b*2 stores the following data: the channel ID 'Channel#1' and the user ID 'User#1'; the channel ID 'Channel#2' with no corresponding user ID stored; the channel ID 'Channel#3' and the user ID 'User#3'; and the channel ID 'Channel#4' and the user ID 'User#4'. Here, the foregoing data indicates that, to communicate with Host H (Paragraph [0025]), the channel ID 'Channel#1' is utilized by Communication Device 200 represented by the user ID 'User#1'; the channel ID 'Channel#2' is not utilized by any Communication Device 200 (i.e., vacant); the channel ID 'Channel#3' is utilized by Communication Device 200 represented by the user ID 'User#3'; and the channel ID 'Channel#4' is utilized by Communication Device 200 represented by the user ID 'User#4'.

Paragraph [0417]—This Paragraph [0417] illustrates another example of the data stored in Channel Number Storage Area H61*b*2 (Paragraph [0416]). In this embodiment, Channel Number Storage Area H61*b*2 comprises two columns, i.e., 'Channel ID' and 'User ID'. Column 'Channel ID' stores the channel IDs described hereinbefore. Column 'User ID' stores the user IDs described hereinbefore. In this embodiment, Channel Number Storage Area H61*b*2 stores the following data: the channel ID 'Channel#1' and the user ID 'User#1'; the channel ID 'Channel#2' and the user ID 'User#1'; the channel ID 'Channel#3' and the user ID 'User#3'; and the channel ID 'Channel#4' and the user ID 'User#4'. Here, the foregoing data indicates that, to communicate with Host H (Paragraph [0025]), the channel ID 'Channel#1' is utilized by Communication Device 200 represented by the user ID 'User#1'; the channel ID 'Channel#2' is also utilized by Communication Device 200 represented by the user ID 'User#1'; the channel ID 'Channel#3' is utilized by Communication Device 200 represented by the user ID 'User#3'; and the channel ID 'Channel#4' is utilized by Communication Device 200 represented by the user ID 'User#4'. In sum, the foregoing data indicates that two channel IDs, i.e., 'Channel#1' and 'Channel#2' are utilized by one Communication Device 200 represented by the user ID 'User#1'.

Paragraph [0418]—This Paragraph [0418] illustrates the data stored in Signal Type Data Storage Area H61*b*3 (Paragraph [0414]). In this embodiment, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area H61*b*3 stores the following data: the channel ID 'Channel#1' and the corresponding signal type data 'cdma2000'; the channel ID 'Channel#2' and the corresponding signal type data 'cdma2000'; the channel ID 'Channel#3' and the corresponding signal type data 'W-CDMA'; and the channel ID 'Channel#4' and the corresponding signal type data 'cdma2000'. The foregoing data indicates that the channel identified by the channel ID 'Channel#1' is assigned to the signal type data 'cdma2000'; the channel identified by the channel ID 'Channel#2' is assigned to the signal type data 'cdma2000'; the channel identified by the channel ID 'Channel#3' is assigned to the signal type data 'W-CDMA'; and the channel identified by the channel ID 'Channel#4' is assigned to the signal type data 'cdma2000'. Assuming that Communication Device 200 represented by the user ID 'User#1' utilizes the channels represented by the channel ID 'Channel#1' and 'Channel#2' as described in Paragraph [0417]. In this embodiment, Communication Device 200 represented by the user ID 'User#1' utilizes the signal type data 'cdma2000' for the channels represented by the channel ID 'Channel#1' and 'Channel#2' for communicating with Host H (Paragraph [0025]).

Paragraph [0419]—This Paragraph [0419] illustrates another example of the data stored in Signal Type Data Storage Area H61*b*3 (Paragraph [0414]). In this embodiment, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area H61*b*3 stores the following data: the channel ID 'Channel#1' and the corresponding signal type data 'cdma2000'; the channel ID 'Channel#2' and the corresponding signal type data 'W-CDMA'; the channel ID 'Channel#3' and the corresponding signal type data 'W-CDMA'; and the channel ID 'Channel#4' and the corresponding signal type data 'cdma2000'. The foregoing data indicates that the channel identified by the channel ID 'Channel#1' is assigned to the signal type data 'cdma2000'; the channel identified by the channel ID 'Channel#2' is assigned to the signal type data 'W-CDMA'; the channel identified by the channel ID 'Channel#3' is assigned to the signal type data 'W-CDMA'; and the channel identified by the channel ID 'Channel#4' is assigned to the signal type data 'cdma2000'. Assuming that Communication Device 200 represented by the user ID 'User#1' utilizes the channels represented by the channel ID 'Channel#1' and 'Channel#2' as described in Paragraph [0417]. In this embodiment, Communication Device 200 represented by the user ID 'User#1' utilizes the signal type data in a hybrid manner for communicating with Host H (Paragraph [0025]), i.e., the signal type data 'cdma2000' for 'Channel#1' and the signal type data 'W-CDMA' for 'Channel#2'.

Paragraph [0420]—This Paragraph [0420] illustrates the software programs stored in Multiple Channel Processing Software Storage Area H61*c* (Paragraph [0413]). In this embodiment, Multiple Channel Processing Software Storage Area H61*c* stores Signal Type Data Detecting Software H61*c*1, User ID Identifying Software H61*c*2, Data Sending/Receiving Software H61*c*2*a*, Channel Number Adding Software H61*c*3, Data Sending/Receiving Software H61*c*3*a*, Signal Type Data Adding Software H61*c*4, and Data Sending/Receiving Software H61*c*4*a*. Signal Type Data Detecting Software H61*c*1 is the software program described in Paragraph [0431] and Paragraph [0432]. User ID Identifying Software H61*c*2 is the software program described in Paragraph [0433]. Data Sending/Receiving Software H61*c*2*a* is the software program described in Paragraph [0434] and Paragraph [0435]. Channel Number Adding Software H61*c*3 is the software program described in Paragraph [0436]. Data Sending/Receiving Software H61*c*3*a* is the software program described in Paragraph [0437] and Paragraph [0438]. Signal Type Data Adding Software H61*c*4 is the software program described in Paragraph [0439]. Data Sending/Receiving Software H61*c*4*a* is the software program described in Paragraph and Paragraph [0441].

Paragraph [0421]—This Paragraph [0421] illustrates the storage area included in RAM 206 (FIG. 1) of Communication Device 200. In this embodiment, RAM 206 includes Multiple Channel Processing Information Storage Area 20661*a* of which the data and the software programs stored therein are described in Paragraph [0422].

Paragraph [0422]—This Paragraph [0422] illustrates the storage areas included in Multiple Channel Processing Information Storage Area 20661*a* (Paragraph [0421]). In this embodiment, Multiple Channel Processing Information Storage Area 20661*a* includes Multiple Channel Processing Data Storage Area 20661*b* and Multiple Channel Processing Software Storage Area 20661*c*. Multiple Channel Processing Data Storage Area 20661*b* stores the data necessary to implement the present function on the side of Communication Device 200 (Paragraph [0025]), such as the ones described in Paragraph [0425] through Paragraph [0429]. Multiple Channel Processing Software Storage Area 20661*c* stores the software programs necessary to implement the present function on the side of Communication Device 200, such as the ones described in Paragraph [0430].

Paragraph [0423]—The data and/or the software programs stored in Multiple Channel Processing Software Storage Area 20661*c* (Paragraph [0422]) may be downloaded from Host H (Paragraph [0025]).

Paragraph [0424]—This Paragraph [0424] illustrates the storage areas included in Multiple Channel Processing Data Storage Area 20661*b* (Paragraph [0422]). In this embodiment, Multiple Channel Processing Data Storage Area 20661*b* includes User Data Storage Area 20661*b*1, Channel Number Storage Area 20661*b*2, and Signal Type Data Storage Area 20661*b*3. User Data Storage Area 20661*b*1 stores the data described in Paragraph [0425]. Channel Number Storage Area 20661*b*2 stores the data described in Paragraph [0426] and Paragraph [0427]. Signal Type Data Storage Area 20661*b*3 stores the data described in Paragraph [0428] and Paragraph [0429].

Paragraph [0425]—This Paragraph [0425] illustrates the data stored in User Data Storage Area 20661*b*1 (Paragraph [0424]). In this embodiment, User Data Storage Area 20661*b*1 comprises two columns, i.e., 'User ID' and 'User Data'. Column 'User ID' stores the user ID which is an identification of Communication Device 200. Column 'User Data' stores the user data represents the personal data of the user of Communication Device 200, such as name, home address, office address, phone number, email address, fax number, age, sex, credit card number of the user. In this embodiment, User Data Storage Area 20661*b*1 stores the following data: the user ID 'User#1' and the corresponding user data 'User Data#1'.

Paragraph [0426]—This Paragraph [0426] illustrates the data stored in Channel Number Storage Area 20661*b*2 (Paragraph [0424]). In this embodiment, Channel Number Storage Area 20661*b*2 comprises two columns, i.e., 'Channel ID' and 'User ID'. Column 'Channel ID' stores the channel ID which is an identification of the channel through which Host H (Paragraph [0025]) and Communication Device 200 send and receive data. Column 'User ID' stores the user ID described hereinbefore. In this embodiment, Channel Number Storage Area 20661*b*2 stores the following data: the channel ID 'Channel#1' and the corresponding user ID 'User#1'. The foregoing data indicates that, to communicate with Host H (Paragraph [0025]), the channel ID 'Channel#1' is utilized by Communication Device 200 represented by the user ID 'User#1'.

Paragraph [0427]—This Paragraph [0427] illustrates another example of the data stored in Channel Number Storage Area 20661*b*2 (Paragraph [0424]). In this embodiment, Channel Number Storage Area 20661*b*2 comprises two columns, i.e., 'Channel ID' and 'User ID'. Column 'Channel ID' stores the channel IDs, and each channel ID is an identification of the channel through which Host H (Paragraph [0025]) and Communication Device 200 send and receive data. Column 'User ID' stores the user ID described hereinbefore. In this embodiment, Channel Number Storage Area 20661*b*2 stores the following data: the channel ID 'Channel#1' and the corresponding user ID 'User#1'; and the channel ID 'Channel#2' and the corresponding user ID 'User#2'. The foregoing data indicates that, to communicate with Host H (Paragraph [0025]), the channel IDs of 'Channel#1' and 'Channel#2' are utilized by Communication Device 200 represented by the user ID 'User#1'.

Paragraph [0428]—This Paragraph [0428] illustrates the data stored in Signal Type Data Storage Area 20661*b*3 (Paragraph [0424]). In this embodiment, Signal Type Data Storage Area 20661*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area 20661*b*3 stores the following data: the channel ID 'Channel#1' and the corresponding signal type data 'cdma2000'; and the channel ID 'Channel#2' and the corresponding signal type data 'cdma2000'. The foregoing data indicates that the channel identified by the channel ID 'Channel#1' is assigned to the signal type data 'cdma2000'; and the channel identified by the channel ID 'Channel#2' is assigned to the signal type data 'cdma2000'. In this embodiment, Communication Device 200 represented by the user ID 'User#1' utilizes the signal type data 'cdma2000' for the channels represented by the channel ID 'Channel#1' and 'Channel#2' for communicating with Host H (Paragraph [0025]).

Paragraph [0429]—This Paragraph [0429] illustrates another example of the data stored in Signal Type Data Storage Area 20661*b*3 (Paragraph [0424]). In this embodiment, Signal Type Data Storage Area 20661*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area 20661*b*3 stores the following data: the channel ID 'Channel#1' and the corresponding signal type data 'cdma2000'; and the channel ID 'Channel#2' and the corresponding signal type data 'W-CDMA'. The foregoing data indicates that the channel identified by the channel ID 'Channel#1' is assigned to the signal type data 'cdma2000'; and the channel identified by the channel ID 'Channel#2' is assigned to the signal type data 'W-CDMA'. In this embodiment, Communication Device 200 represented by the user ID 'User#1' utilizes the signal type data in a hybrid manner for communicating with Host H (Paragraph [0025]), i.e., the signal type data 'cdma2000' for 'Channel#1' and the signal type data 'W-CDMA' for 'Channel#2'.

Paragraph [0430]—This Paragraph [0430] illustrates the software programs stored in Multiple Channel Processing Software Storage Area 20661*c* (Paragraph [0422]). In this embodiment, Multiple Channel Processing Software Storage Area 20661*c* stores Signal Type Data Detecting Software 20661*c*1, User ID Identifying Software 20661*c*2, Data Sending/Receiving Software 20661*c*2*a*, Channel Number Adding Software 20661*c*3, Data Sending/Receiving Software 20661*c*3*a*, Signal Type Data Adding Software 20661*c*4, and Data Sending/Receiving Software 20661*c*4*a*. Signal Type Data Detecting Software 20661*c*1 is the software program described in Paragraph [0431] and Paragraph [0432]. User ID Identifying Software 20661*c*2 is the software program described in Paragraph [0433]. Data Sending/Receiving Software 20661*c*2*a* is the software program described in Paragraph [0434] and Paragraph [0435]. Channel Number Adding Software 20661*c*3 is the software program described in Paragraph [0436]. Data Sending/Receiving Software 20661*c*3*a* is the software program described in Paragraph [0437] and Paragraph [0438]. Signal Type Data Adding Software 20661*c*4 is the software program described in Paragraph [0439]. Data Sending/Receiving Software 20661*c*4*a* is the software program described in Paragraph [0440] and Paragraph [0441].

Paragraph [0431]—This Paragraph [0431] illustrates Signal Type Data Detecting Software H61*c*1 (Paragraph [0420]) of Host H (Paragraph [0025]) and Signal Type Data Detecting Software 20661*c*1 (Paragraph [0430]) of Communication Device 200, which detect the signal type utilized for the communication between Host H and Communication Device 200 from any signal type categorized as 2G, 3G, and 4G The detection of the signal type is implemented by Host H in the present embodiment. In this embodiment, Host H detects the signal type (S1), and stores the signal type data in Signal Type Data Storage Area H61*b*3 (Paragraph [0418]) at the default channel number (in the present example, Channel#1) (S2). Host H then sends the signal type data to Communication Device 200 (S3). Upon receiving the signal type data from Host H (S4), Communication Device 200 stores the signal type data in Signal Type Data Storage Area 20661*b*3 (Paragraph [0428]) at the default channel number (in the present example, Channel#1) (S5).

Paragraph [0432]—This Paragraph [0432] illustrates another embodiment of Signal Type Data Detecting Software H61*c*1 (Paragraph [0420]) of Host H (Paragraph [0025]) and Signal Type Data Detecting Software 20661*c*1 (Paragraph [0430]) of Communication Device 200, which detect the signal type utilized for the communication between Host H and Communication Device 200 from any signal type categorized as 2G, 3G and 4G The detection of the signal type is implemented by Communication Device 200 in the present embodiment. In this embodiment, CPU 211 (FIG. 1) of Communication Device 200 detects the signal type (S1), and stores the signal type data in Signal Type Data Storage Area 20661*b*3 (Paragraph [0428]) at the default channel number (in the present example, Channel#1) (S2). CPU 211 then sends the signal type data to Host H (S3). Upon receiving the signal type data from Communication Device 200 (S4), Host H stores the signal type data in Signal Type Data Storage Area H61*b*3 (Paragraph [0418]) at the default channel number (in the present example, Channel#1) (S5).

Paragraph [0433]—This Paragraph [0433] illustrates User ID Identifying Software H61*c*2 (Paragraph [0420]) of Host H (Paragraph [0025]) and User ID Identifying Software 20661*c*2 (Paragraph [0430]) of Communication Device 200, which identify the user ID of the corresponding Communication Device 200. In this embodiment, Communication Device 200 sends the user ID to Host H (S1). Upon receiving the User ID from Communication Device 200 (S2), Host H identifies the default channel number (in the present example, Channel#1) for Communication Device 200 (S3), and stores the User ID in Channel Number Storage Area H61*b*2 (Paragraph [0416]) at the channel number identified in S3 (S4).

Paragraph [0434]—This Paragraph [0434] illustrates Data Sending/Receiving Software H61*c*2*a* (Paragraph [0420]) of Host H (Paragraph [0025]) and Data Sending/Receiving Software 20661*c*2*a* (Paragraph [0430]) of Communication Device 200 by which Host H sends data to Communication Device 200. In this embodiment, Host H retrieves the default channel number (in the present example, Channel#1) from Channel Number Storage Area H61*b*2 (Paragraph [0416]) (S1), and sends data (e.g., audiovisual data and alphanumeric data) to Communication Device 200 through the default channel number (in the present example, Channel#1) retrieved in S1 (S2). Communication Device 200 receives the data (e.g., audiovisual data and alphanumeric data) from Host H through the same channel number (S3).

Paragraph [0435]—This Paragraph [0435] illustrates another embodiment of Data Sending/Receiving Software H61*c*2*a* (Paragraph [0420]) of Host H (Paragraph [0025]) and Data Sending/Receiving Software 20661*c*2*a* (Paragraph [0430]) of Communication Device 200 by which Communication Device 200 sends data (e.g., audiovisual data and alphanumeric data) to Host H. In this embodiment, Communication Device 200 retrieves the default channel number (in the present example, Channel#1) from Channel Number Storage Area 20661*b*2 (Paragraph [0426]) (S1), and sends data (e.g., audiovisual data and alphanumeric data) to Host H through the default channel number (in the present example, Channel#1) retrieved in S1 (S2). Host H receives the data (e.g., audiovisual data and alphanumeric data) from Communication Device 200 through the same channel number (S3).

Paragraph [0436]—This Paragraph [0436] illustrates Channel Number Adding Software H61*c*3 (Paragraph [0420]) of Host H (Paragraph [0025]) and Channel Number Adding Software 20661*c*3 (Paragraph [0430]) of Communication Device 200, which add another channel to increase the download and/or upload speed of Communication Device 200. In this embodiment, Communication Device 200 sends a channel number adding request to Host H (S1). Upon receiving the channel number adding request from Communication Device 200 (S2), Host H checks the availability in the same signal type data (S3). Assuming that vacancy is found in the same signal type data, Host H selects a new channel number (in the present example, Channel#2) from the available channel numbers for Communication Device 200 (S4). Host H stores the user ID of Communication Device 200 in Channel Number Storage Area H61*b*2 (Paragraph [0416]) at new channel number (in the present example, Channel#2) selected in S4 (S5). Host H then sends the new channel number (in the present example, Channel#2) selected in S4 to Communication Device 200 (S6). Upon receiving the new channel number (in the present example, Channel#2) from Host H (S7), Communication Device 200 stores the new channel number (in the present example, Channel#2) in Channel Number Storage Area 20661*b*2 (Paragraph [0426]) (S8). As another embodiment, instead of Host H adding a new channel number by receiving a channel number adding request from Communication Device 200, Host H may do so in its own initiative.

Paragraph [0437]—This Paragraph [0437] illustrates Data Sending/Receiving Software H61*c*3*a* (Paragraph [0420]) of Host H (Paragraph [0025]) and Data Sending/Receiving Software 20661*c*3*a* (Paragraph [0430]) of Communication Device 200 by which Host H sends data to Communication Device 200 by increasing the download speed. In this embodiment, Host H retrieves the channel numbers (in the present example, Channel#1 and #2) from Channel Number Storage Area H61*b*2 (Paragraph [0416]) of the corresponding user ID (in the present example, User#1) (S1). Host H splits the data (e.g., audiovisual data and alphanumeric data) to be sent to Communication Device 200 to the First Data and the Second Data (S2). Host H sends the First Data to Communication Device 200 through Channel#1 (S3), and sends the Second Data to Communication Device 200 through Channel#2 (S4). Communication Device 200 receives the First Data from Host H through Channel#1 (S5), and receives the Second Data from Host H through Channel#2 (S6). Communication Device 200 merges the First Data and the Second Data thereafter (S7).

Paragraph [0438]—This Paragraph [0438] illustrates Data Sending/Receiving Software H61c3a (Paragraph [0420]) of Host H (Paragraph [0025]) and Data Sending/Receiving Software 20661c3a (Paragraph [0430]) of Communication Device 200 by which Communication Device 200 sends data to Host H by increasing the upload speed. In this embodiment, Communication Device 200 retrieves the channel numbers (in the present example, Channels #1 and #2) from Channel Number Storage Area 20661b2 (Paragraph [0426]) (S1). Communication Device 200 splits the data (e.g., audiovisual data and alphanumeric data) to be sent to Host H to the Third Data and the Fourth Data (S2). Communication Device 200 sends the Third Data to Host H through Channel#1 (S3), and sends the Fourth Data to Host H through Channel#2 (S4). Host H receives the Third Data from Communication Device 200 through Channel#1 (S5), and receives the Fourth Data from Communication Device 200 through Channel#2 (S6). Host H merges the Third Data and the Fourth Data thereafter (S7).

Paragraph [0439]—This Paragraph [0439] illustrates Signal Type Data Adding Software H61c4 (Paragraph [0420]) of Host H (Paragraph [0025]) and Signal Type Data Adding Software 20661c4 (Paragraph [0430]) of Communication Device 200, which add new channel in different signal type if no available channel is found in the same signal type in S3 of Paragraph [0436]. In this embodiment, Host H checks the availability in other signal type data (S1). Assuming that an available new channel is found in W-CDMA. Host H selects a new channel number (in the present example, Channel#2) In Signal Type Data Storage Area H61b3 (Paragraph [0419]) for Communication Device 200 (S2). Host H stores the user ID (in the present example, User#1) in Channel Number Storage Area H61b2 (Paragraph [0417]) at new channel number selected in S2 (in the present example, Channel#2) (S3). Host H stores the signal type data (in the present example, W-CDMA) in Signal Type Data Storage Area H61b3 (Paragraph [0419]) at new channel number selected in S2 (in the present example, Channel#2) (S4). Host H sends the new channel number (in the present example, Channel#2) and the new signal type data (in the present example, W-CDMA) to Communication Device 200 (S5). Communication Device 200 receives the new channel number (in the present example, Channel#2) and the new signal type data (in the present example, W-CDMA) from Host H (S6). Communication Device 200 stores the new channel number (in the present example, Channel#2) in Channel Number Storage Area 20661b2 (Paragraph [0427]) (S7). Communication Device 200 (in the present example, W-CDMA) in Signal Type Data Storage Area 20661b3 (Paragraph [0429]) (S8).

Paragraph [0440]—This Paragraph [0440] illustrates Data Sending/Receiving Software H61c4a (Paragraph [0420]) of Host H (Paragraph [0025]) and Data Sending/Receiving Software 20661c4a (Paragraph [0430]) of Communication Device 200 by which Host H sends data to Communication Device 200 by increasing the download speed. In this embodiment, Host H retrieves the channel numbers (in the present example, Channel#1 and #2) from Channel Number Storage Area H61b2 (Paragraph [0417]) of the corresponding user ID (in the present example, User#1) (S1). Host H splits the data (e.g., audiovisual data and alphanumeric data) to be sent to Communication Device 200 to the First Data and the Second Data (S2). Host H sends the First Data to Communication Device 200 through Channel#1 in cdma2000 (S3), and sends the Second Data to Communication Device 200 through Channel#2 in W-CDMA (S4). Communication Device 200 receives the First Data from Host H through Channel#1 in cdma2000 (S5), and receives the Second Data from Host H through Channel#2 in W-CDMA (S6). Communication Device 200 merges the First Data and the Second Data thereafter (S7).

Paragraph [0441]—This Paragraph [0441] illustrates Data Sending/Receiving, Software H61c4a (Paragraph [0420]) of Host H (Paragraph [0025]) and Data Sending/Receiving Software 20661c4a (Paragraph [0430]) of Communication Device 200 by which Communication Device 200 sends data to Host H by increasing the upload speed. In this embodiment, Communication Device 200 retrieves the channel numbers (in the present example, Channel#1 and #2) from Channel Number Storage Area 20661b2 (Paragraph [0427]) (S1). Communication Device 200 splits the data (e.g., audiovisual data and alphanumeric data) to be sent to Host H to the Third Data and the Fourth Data (S2). Communication Device 200 sends the Third Data to Host H through Channel#1 in cdma2000 (S3), and sends the Fourth Data to Host H through Channel#2 in W-CDMA (S4). Host H receives the Third Data from Communication Device 200 through Channel#1 in cdma2000 (S5), and receives the Fourth Data from Communication Device 200 through Channel#2 in W-CDMA (S6). Host H merges the Third Data and the Fourth Data thereafter (S7).

Paragraph [0442]—As another embodiment, the present function may be utilized for processing other sets of combination of the signals, such as the 2G signal and the 3G signal. In order to implement this embodiment, the term 'cdma2000' is substituted by '2G' and the term 'W-CDMA' is substituted by '3G' in the explanation set out hereinbefore for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA.

Paragraph [0443]—As another embodiment, the present function may be utilized for processing other sets of combination of the signals, such as the 3G signal and the 4G signal. In order to implement this embodiment, the term 'cdma2000' is substituted by '3G' and the term 'W-CDMA' is substituted by '4G' in the explanation set out hereinbefore for purposes of implementing the present embodiment. Here, the 3G signal may be of any type of signal categorized as 3G, including, but not limited to cdma2000, W-CDMA, and TDS-CDMA, and the 4G signal may be of any type of signal categorized as 4G.

Paragraph [0444]—As another embodiment, the present function may be utilized for processing the first type of 4G signal and the second type of 4G signal. In order to implement this embodiment, the term 'cdma2000' is substituted by 'the first type of 4G signal' and the term 'W-CDMA' is substituted by 'the second type of 4G signal' for purposes of implementing the present embodiment. Here, the first type of 4G signal and the second type of 4G signal may be of any type of signal categorized as 4G.

Paragraph [0445]—As another embodiment, the present function may be utilized for processing the 2G signal and the 3G signal. In order to implement this embodiment, the term 'cdma2000' is substituted by 'the 2G signal' and the term 'W-CDMA' is substituted by 'the 3G signal' for purposes of implementing the present embodiment. Here, the 2G signal may be of any type of signal categorized as 2G, including, but not limited to cdmaOne, GSM, and D-AMPS, and the 3G signal may be of any type of signal categorized as 3G, including, but not limited to cdma2000, W-CDMA, and TDS-CDMA.

Paragraph [0446]—As another embodiment, the present function may be utilized for processing the first type of 2G signal and the second type of 2G signal. In order to implement this embodiment, the term 'cdma2000' is substituted by 'the first type of 2G signal' and the term 'W-CDMA' is substituted by 'the second type of 2G signal' for purposes of implementing the present embodiment. Here, the first type of 2G signal and the second type of 2G signal may be of any type of signal categorized as 2G, including, but not limited to cdmaOne, GSM, and D-AMPS.

Paragraph [0447]—In sum, the present function described hereinbefore may be utilized for processing any combination of any type of signals.

Paragraph [0448]—For the avoidance of doubt, the multiple signal processing function may be utilized while implementing the present function.

Paragraph [0449]—For the avoidance of doubt, all software programs described hereinbefore to implement the present function may be executed solely by CPU 211 (FIG. 1) or by Signal Processor 208 (FIG. 1), or by both CPU 211 and Signal Processor 208.

Paragraph [0450]—<<Automobile Controlling Function>>

Paragraph [0451]—Paragraph [0452] through Paragraph [0493] illustrate the automobile controlling function which enables Communication Device 200 to remotely control an automobile in a wireless fashion via Antenna 218 (FIG. 1).

Paragraph [0452]—This Paragraph [0452] illustrates the storage area included in Automobile 835, i.e., an automobile or a car. In the present embodiment, Automobile 835 includes Automobile Controlling Information Storage Area 83565*a* of which the data and the software programs stored therein are described in Paragraph [0454].

Paragraph [0453]—The data and/or the software programs stored in Automobile Controlling Information Storage Area 83565*a* (Paragraph [0452]) may be downloaded from Host H (Paragraph [0025]).

Paragraph [0454]—This Paragraph [0454] illustrates the storage areas included in Automobile Controlling Information Storage Area 83565*a* (Paragraph [0452]). In the present embodiment, Automobile Controlling Information Storage Area 83565*a* includes Automobile Controlling Data Storage Area 83565*b* and Automobile Controlling Software Storage Area 83565*c*. Automobile Controlling Data Storage Area 83565*b* stores the data necessary to implement the present function on the side of Automobile 835 (Paragraph [0452]), such as the ones described in Paragraph [0455] through Paragraph [0461]. Automobile Controlling Software Storage Area 83565*c* stores the software programs necessary to implement the present function on the side of Automobile 835, such as the ones described in Paragraph [0462].

Paragraph [0455]—This Paragraph [0455] illustrates the storage areas included in Automobile Controlling Data Storage Area 83565*b* (Paragraph [0454]). In the present embodiment, Automobile Controlling Data Storage Area 83565*b* includes User Access Data Storage Area 83565*b*1, Window Data Storage Area 83565*b*2, Door Data Storage Area 83565*b*3, Radio Channel Data Storage Area 83565*b*4, TV Channel Data Storage Area 83565*b*5, Blinker Data Storage Area 83565*b*6, and Work Area 83565*b*7. User Access Data Storage Area 83565*b*1 stores the data described in Paragraph [0456]. Window Data Storage Area 83565*b*2 stores the data described in Paragraph [0457]. Door Data Storage Area 83565*b*3 stores the data described in Paragraph [0458]. Radio Channel Data Storage Area 83565*b*4 stores the data described in Paragraph [0459]. TV Channel Data Storage Area 83565*b*5 stores the data described in Paragraph [0460]. Blinker Data Storage Area 83565*b*6 stores the data described in Paragraph [0461]. Work Area 83565*b*7 is utilized as a work area to perform calculation and temporarily store data. The data stored in Automobile Controlling Data Storage Area 83565*b* excluding the ones stored in User Access Data Storage Area 83565*b*1 and Work Area 83565*b*7 are primarily utilized for reinstallation, i.e., to reinstall the data to Communication Device 200 as described hereinafter in case the data stored in Communication Device 200 are corrupted or lost.

Paragraph [0456]—This Paragraph [0456] illustrates the data stored in User Access Data Storage Area 83565*b*1 (Paragraph [0455]). In the present embodiment, User Access Data Storage Area 83565*b*1 comprises two columns, i.e., 'User ID' and 'Password Data'. Column 'User ID' stores the user IDs, and each user ID is an identification of the user of Communication Device 200 authorized to implement the present function. Column 'Password Data' stores the password data, and each password data represents the password set by the user of the corresponding user ID. The password data is composed of alphanumeric data. In the present embodiment, User Access Data Storage Area 83565*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; and the user ID 'User#4' and the corresponding password data 'Password Data#4'. According to the present example, the users represented by User#1 through #4 are authorized to implement the present function.

Paragraph [0457]—This Paragraph [0457] illustrates the data stored in Window Data Storage Area 83565*b*2 (Paragraph [0455]). In the present embodiment, Window Data Storage Area 83565*b*2 comprises two columns, i.e., 'Window ID' and 'Window Data'. Column 'Window ID' stores the window IDs, and each window ID is an identification of the window (not shown) of Automobile 835 (Paragraph [0452]). Column 'Window Data' stores the window data, and each window data is the image data designed to be displayed on LCD 201 (FIG. 1) which represents the position of the window (not shown) of the corresponding window ID. In the present embodiment, Window Data Storage Area 83565*b*2 stores the following data: the window ID 'Window#1' and the corresponding window data Window Data#1; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controllable by implementing the present function.

Paragraph [0458]—This Paragraph [0458] illustrates the data stored in Door Data Storage Area 83565*b*3 (Paragraph [0455]). In the present embodiment, Door Data Storage Area 83565*b*3 comprises two columns, i.e., 'Door ID' and 'Door Data'. Column 'Door ID' stores the door IDs, and each door ID is an identification of the door (not shown) of Automobile 835 (Paragraph [0452]). Column 'Door Data' stores the door data, and each door data is the image data designed to be displayed on LCD 201 (FIG. 1) which represents the position of the door (not shown) of the corresponding door ID. In the present embodiment, Door Data Storage Area 83565*b*3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 which are represented by the door IDs, 'Door#1' through 'Door#4', are remotely controllable by implementing the present function.

Paragraph [0459]—This Paragraph [0459] illustrates the data stored in Radio Channel Data Storage Area 83565b4 (Paragraph [0455]). In the present embodiment, Radio Channel Data Storage Area 83565b4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (Paragraph [0452]). Column 'Radio Channel Data' stores the radio channel data, and each radio channel data is the image data designed to be displayed on LCD 201 (FIG. 1) which represents the radio channel (not shown) of the corresponding radio channel ID. In the present embodiment, Radio Channel Data Storage Area 83565b4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controllable by implementing the present invention.

Paragraph [0460]—This Paragraph [0460] illustrates the data stored in TV Channel Data Storage Area 83565b5 (Paragraph [0455]). In the present embodiment, TV Channel Data Storage Area 83565b5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (Paragraph [0452]). Column 'TV Channel Data' stores the TV channel data, and each TV channel data is the image data designed to be displayed on LCD 201 (FIG. 1) which represents the TV channel (not shown) of the corresponding TV channel ID. In the present embodiment, TV Channel Data Storage Area 83565b5 stores the following data: the TV channel ID 'TV Channel#1' and the corresponding TV channel data 'TV Channel Data#1' the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4', are remotely controllable by implementing the present invention.

Paragraph [0461]—This Paragraph [0461] illustrates the data stored in Blinker Data Storage Area 83565b6 (Paragraph [0455]). In the present embodiment, Blinker Data Storage Area 83565b6 comprises two columns, i.e., 'Blinker ID' and 'Blinker Data'. Column 'Blinker ID' stores the blinker IDs, and each blinker ID is an identification of the blinker (not shown) of Automobile 835 (Paragraph [0452]). Column 'Blinker Data' stores the blinker data, and each blinker data is the image data designed to be displayed on LCD 201 (FIG. 1) which represents the blinker (not shown) of the corresponding blinker ID. In the present embodiment, Blinker Data Storage Area 83565b6 stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controllable by implementing the present invention. Here, the blinker (not shown) represented by 'Blinker#1' is the right blinker and the blinker (not shown) represented by 'Blinker#2' is the left blinker.

Paragraph [0462]—This Paragraph [0462] illustrates the storage areas included in Automobile Controlling Software Storage Area 83565c (Paragraph [0454]). In the present embodiment, Automobile Controlling Software Storage Area 83565c includes Automobile Controller Storage Area 83565c1 and Remote Controlling Software Storage Area 83565c2. Automobile Controller Storage Area 83565c1 stores the controllers described in Paragraph [0463]. Remote Controlling Software Storage Area 83565c2 stores the software programs described in Paragraph [0464].

Paragraph [0463]—This Paragraph [0463] illustrates the controllers stored in Automobile Controller Storage Area 83565c1 (Paragraph [0462]). In the present embodiment, Automobile Controller Storage Area 83565c1 stores Engine Controller 83565c1a, Direction Controller 83565c1b, Speed Controller 83565c1c, Window Controller 83565c1d, Door Controller 83565c1e, Radio Controller 83565c1f, TV Controller 83565c1g, Radio Channel Selector 83565c1h, TV Channel Selector 83565c1i, Blinker Controller 83565c1j, Emergency Lamp Controller 83565c1k, Cruise Control Controller 83565c1l, and Speaker Volume Controller 83565c1m. Engine Controller 83565c1a is the controller which controls the engine (not shown) of Automobile 835 (Paragraph [0452]). Direction Controller 83565c1b is the controller which controls the steering wheel (not shown) of Automobile 835. Speed Controller 83565c1c is the controller which controls the accelerator (not shown) of Automobile 835. Window Controller 83565c1d is the controller which controls the windows (not shown) of Automobile 835. Door Controller 83565c1e is the controller which controls the doors (not shown) of Automobile 835. Radio Controller 83565c1f is the controller which controls the radio (not shown) of Automobile 835. TV Controller 83565c1g is the controller which controls the TV (not shown) of Automobile 835. Radio Channel Selector 83565c1h is the controller which controls the radio channels (not shown) of the radio (not shown) installed in Automobile 835. TV Channel Selector 83565c1i is the controller which controls the radio channels (not shown) of the radio (not shown) installed in Automobile 835. Blinker Controller 83565c1j is the controller which controls the blinkers (not shown) of Automobile 835. Emergency Lamp Controller 83565c1k is the controller which controls the emergency lamp (not shown) of Automobile 835. Cruise Control Controller 83565c1l is the controller which controls the cruise control (not shown) of Automobile 835. Speaker Volume Controller 83565c1m is the controller which controls the speaker (not shown) of Automobile 835. As another embodiment, the foregoing controllers may be in the form of hardware instead of software.

Paragraph [0464]—This Paragraph [0464] illustrates the software programs stored in Remote Controlling Software Storage Area 83565c2 (Paragraph [0462]). In the present embodiment, Remote Controlling Software Storage Area 83565c2 stores Engine Controlling Software 83565c2a, Direction Controlling Software 83565c2b, Speed Controlling Software 83565c2c, Window Controlling Software 83565c2d, Door Controlling Software 83565c2e, Radio Controlling Software 83565c2f, TV Controlling Software 83565c2g, Radio Channel Selecting Software 83565c2h, TV Channel Selecting Software 83565c2i, Blinker Controlling Software 83565c2j, Emergency Lamp Controlling Software 83565c2k, Cruise Control Controlling Software 83565c2l, Speaker Volume Controlling Software 83565c2m, Controller Reinstalling Software 83565c2n, Data Reinstalling Software 83565c2o, and User Access Authenticating Software 83565c2p. Engine Controlling Software 83565c2a is the software program described in Paragraph [0479]. Direction Controlling Software 83565c2b is the software program described in Paragraph [0480]. Speed Controlling Software 83565c2c is the software program described in Paragraph [0481]. Window Controlling Software 83565c2d is the software program described in Paragraph [0482]. Door Controlling Software 83565c2e is the software program described in Paragraph [0483]. Radio Controlling Software 83565c2f is the software program described in Paragraph [0484]. TV Controlling Software 83565c2g is the software program described in Paragraph [0485]. Radio Channel Selecting Software 83565c2h is the software program described in Paragraph [0486]. TV Channel Selecting Software 83565c2i is the software program described in Paragraph [0487]. Blinker Controlling Software 83565c2j is the software program described in Paragraph [0488]. Emergency Lamp Controlling Software 83565c2k is the software program described in Paragraph [0489]. Cruise Control Controlling Software 83565c2l is the software program described in Paragraph [0490]. Speaker Volume Controlling Software 83565c2m is the software program described in Paragraph [0491]. Controller Reinstalling Software 83565c2n is the software program described in Paragraph [0492]. Data Reinstalling Software 83565c2o is the software program described in Paragraph [0493]. User Access Authenticating Software 83565c2p is the software program described in Paragraph [0478]. The controllers stored in Automobile Controller Storage Area 83565c1 primarily functions as directly controlling Automobile 835 in the manner described in Paragraph [0463], and the software programs stored in Remote Controlling Software Storage Area 83565c2 controls the controllers stored in Automobile Controller Storage Area 83565c1, by cooperating with the software programs stored in Remote Controlling Software Storage Area 20665c2 (Paragraph [0477]) of Communication Device 200, in a wireless fashion via Antenna 218 (FIG. 1).

Paragraph [0465]—This Paragraph [0465] illustrates the storage area included in RAM 206 (FIG. 1) of Communication Device 200. In the present embodiment, RAM 206 includes Automobile Controlling Information Storage Area 20665a of which the data and the software programs stored therein are described in Paragraph [0467].

Paragraph [0466]—The data and/or the software programs stored in Automobile Controlling Information Storage Area 20665a (Paragraph [0465]) may be downloaded from Host H (Paragraph [0025]).

Paragraph [0467]—This Paragraph [0467] illustrates the storage areas included in Automobile Controlling Information Storage Area 20665a (Paragraph [0465]). In the present embodiment, Automobile Controlling Information Storage Area 20665a includes Automobile Controlling Data Storage Area 20665b and Automobile Controlling Software Storage Area 20665c. Automobile Controlling Data Storage Area 20665b stores the data necessary to implement the present function on the side of Communication Device 200, such as the ones described in Paragraph [0468] through Paragraph [0474]. Automobile Controlling Software Storage Area 20665c stores the software programs necessary to implement the present function on the side of Communication Device 200, such as the ones described in Paragraph [0475].

Paragraph [0468]—This Paragraph [0468] illustrates the storage areas included in Automobile Controlling Data Storage Area 20665b (Paragraph [0467]). In the present embodiment, Automobile. Controlling Data Storage Area 20665b includes User Access Data Storage Area 20665b1, Window Data Storage Area 20665b2, Door Data Storage Area 20665b3, Radio Channel Data Storage Area 20665b4, TV Channel Data Storage Area 20665b5, Blinker Data Storage Area 20665b6, and Work Area 20665b7. User Access Data Storage Area 20665b1 stores the data described in Paragraph [0469]. Window Data Storage Area 20665b2 stores the data described in Paragraph [0470]. Door Data Storage Area 20665b3 stores the data described in Paragraph [0471]. Radio Channel Data Storage Area 20665b4 stores the data described in Paragraph [0472]. TV Channel Data Storage Area 20665b5 stores the data described in Paragraph [0473]. Blinker Data Storage Area 20665b6 stores the data described in Paragraph [0474]. Work Area 20665b7 is utilized as a work area to perform calculation and temporarily store data.

Paragraph [0469]—This Paragraph [0469] illustrates the data stored in User Access Data Storage Area 20665b1 (Paragraph [0468]). In the present embodiment, User Access Data Storage Area 20665b1 comprises two columns, i.e., 'User ID' and 'Password Data'. Column 'User ID' stores the user ID which is an identification of the user of Communication Device 200. Column 'Password Data' stores the password data which represents the password set by the user of Communication Device 200. The password data is composed of alphanumeric data. In the present embodiment, User Access Data Storage Area 20665b1 stores the following data: the user ID 'User#1' and the corresponding password data 'Password Data#1'.

Paragraph [0470]—This Paragraph [0470] illustrates the data stored in Window Data Storage Area 20665b2 (Paragraph [0468]). In the present embodiment, Window Data Storage Area 20665b2 comprises two columns, i.e., 'Window ID' and 'Window Data'. Column 'Window ID' stores the window IDs, and each window ID is an identification of the window (not shown) of Automobile 835 (Paragraph [0452]). Column 'Window Data' stores the window data, and each window data is the image data designed to be displayed on LCD 201 (FIG. 1) which represents the position of the window (not shown) of the corresponding window ID. In the present embodiment, Window Data Storage Area 20665b2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controllable by implementing the present function.

Paragraph [0471]—This Paragraph [0471] illustrates the data stored in Door Data Storage Area 20665b3 (Paragraph [0468]). In the present embodiment, Door Data Storage Area 20665b3 comprises two columns, i.e., 'Door ID' and 'Door Data'. Column 'Door Data' stores the door data, and each door data is the image data designed to be displayed on LCD 201 (FIG. 1) which represents the position of the door (not shown) of the corresponding door ID. In the present embodiment, Door Data Storage Area 20665b3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 (Paragraph [0452]) which are represented by the door IDs, 'Door#1' through 'Door#4', are remotely controllable by implementing the present function.

Paragraph [0472]—This Paragraph [0472] illustrates the data stored in Radio Channel Data Storage Area 20665b4 (Paragraph [0468]). In the present embodiment, Radio Channel Data Storage Area 20665b4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (Paragraph [0452]). Column 'Radio Channel Data' stores the radio channel data, and each radio channel data is the image data designed to be displayed on LCD 201 (FIG. 1) which represents the radio channel (not shown) of the corresponding radio channel ID. In the present embodiment, Radio Channel Data Storage Area 20665b4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controllable by implementing the present invention.

Paragraph [0473]—This Paragraph [0473] illustrates the data stored in TV Channel Data Storage Area 20665b5 (Paragraph [0468]). In the present embodiment, TV Channel Data Storage Area 20665b5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (Paragraph [0452]). Column 'TV Channel Data' stores the TV channel data, and each TV channel data is the image data designed to be displayed on LCD 201 (FIG. 1) which represents the TV channel (not shown) of the corresponding TV channel ID. In the present embodiment, TV Channel Data Storage Area 20665b5 stores the following data: the TV channel ID 'TV Channel#1' and the corresponding TV channel data 'TV Channel Data#1'; the TV channel ID 'TV Channel#2' and the corresponding TV channel data 'TV Channel Data#2; the TV channel ID TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4', are remotely controllable by implementing the present invention.

Paragraph [0474]—This Paragraph [0474] illustrates the data stored in Blinker Data Storage Area 20665b6 (Paragraph [0468]). In the present embodiment, Blinker Data Storage Area 20665b6 comprises two columns, i.e., 'Blinker ID' and 'Blinker Data'. Column 'Blinker ID' stores the blinker IDs, and each blinker ID is an identification of the blinker (not shown) of Automobile 835 (Paragraph [0452]). Column 'Blinker Data' stores the blinker data, and each blinker data is the image data designed to be displayed on LCD 201 (FIG. 1) which represents the blinker (not shown) of the corresponding blinker ID. In the present embodiment, Blinker Data Storage Area 20665b6 stores the following data: the blinker ID 'Blinker#1' and the corresponding blinker data 'Blinker Data#1; and the blinker ID 'Blinker#2' and the corresponding blinker data 'Blinker Data#2'. Two blinkers which are represented by the blinker IDs, 'Blinker#1' and 'Blinker#2', are remotely controllable by implementing the present invention. Here, the blinker (not shown) represented by 'Blinker#1' is the right blinker and the blinker (not shown) represented by 'Blinker#2' is the left blinker.

Paragraph [0475]—This Paragraph [0475] illustrates the storage areas included in Automobile Controlling Software Storage Area 20665c (Paragraph [0467]). In the present embodiment, Automobile Controlling Software Storage Area 20665c includes Automobile Controller Storage Area 20665c1 and Remote Controlling Software Storage Area 20665c2. Automobile Controller Storage Area 20665c1 stores the controllers described in Paragraph [0476]. Remote Controlling Software Storage Area 20665c2 stores the software programs described in Paragraph [0477].

Paragraph [0476]—This Paragraph [0476] illustrates the controllers stored in Automobile Controller Storage Area 20665c1 (Paragraph [0475]). In the present embodiment, Automobile Controller Storage Area 20665c1 stores Engine Controller 20665c1a, Direction Controller 20665c1b, Speed Controller 20665c1c, Window Controller 20665c1d, Door Controller 20665c1e, Radio Controller 20665c1f, TV Controller 20665c1g, Radio Channel Selector 20665c1h, TV Channel Selector 20665c1i, Blinker Controller 20665c1j, Emergency Lamp Controller 20665c1k, Cruise Control Controller 20665c1l, and Speaker Volume Controller 20665c1m. Engine Controller 20665c1a is the controller which controls the engine (not shown) of Automobile 206. Direction Controller 20665c1b is the controller-which controls the steering wheel (not shown) of Automobile 206. Speed Controller 20665c1c is the controller which controls the accelerator (not shown) of Automobile 206. Window Controller 20665c1d is the controller which controls the windows (not shown) of Automobile 206. Door Controller 20665c1e is the controller which controls the doors (not shown) of Automobile 206. Radio Controller 20665c1f is the controller which controls the radio (not shown) of Automobile 206. TV Controller 20665c1g is the controller which controls the TV (not shown) of Automobile 206. Radio Channel Selector 20665c1h is the controller which controls the radio channels (not shown) of the radio (not shown) installed in Automobile 206. TV Channel Selector 20665c1i is the controller which controls the radio channels (not shown) of the radio (not shown) installed in Automobile 206. Blinker Controller 20665c1j is the controller which controls the blinkers (not shown) of Automobile 206. Emergency Lamp Controller 20665c1k is the controller which controls the emergency lamp (not shown) of Automobile 206. Cruise Control Controller 20665c1l is the controller which controls the cruise control (not shown) of Automobile 206. Speaker Volume Controller 20665c1m is the controller which controls the speaker (not shown) of Automobile 206. As another embodiment, the foregoing controllers may be in the form of hardware instead of software. The data stored in Automobile Controller Storage Area 20665c1 are primarily utilized for reinstallation, i.e., to reinstall the data to Automobile 835 (Paragraph [0452]) as described hereinafter in case the data stored in Automobile 835 are corrupted or lost.

Paragraph [0477]—This Paragraph [0477] illustrates the software programs stored in Remote Controlling Software Storage Area 20665c2 (Paragraph [0467]). In the present embodiment, Remote Controlling Software Storage Area 20665c2 stores Engine Controlling Software 20665c2a, Direction Controlling Software 20665c2b, Speed Controlling Software 20665c2c, Window Controlling Software 20665c2d, Door Controlling Software 20665c2e, Radio Controlling Software 20665c2f, TV Controlling Software 20665*c*2*g*, Radio Channel Selecting Software 20665*c*2*h*, TV Channel Selecting Software 20665*c*2*i*, Blinker Controlling Software 20665*c*2*j*, Emergency Lamp Controlling Software 20665*c*2*k*, Cruise Control Controlling Software 20665*c*2*l*, Speaker Volume Controlling Software 20665*c*2*m*, Controller Reinstalling Software 20665*c*2*n*, Data Reinstalling Software 20665*c*2*o*, and User Access Authenticating Software 20665*c*2*p*. Engine Controlling Software 20665*c*2*a* is the software program described in Paragraph [0479]. Direction Controlling Software 20665*c*2*b* is the software program described in Paragraph [0480]. Speed Controlling Software 20665*c*2*c* is the software program described in Paragraph [0481]. Window Controlling Software 20665*c*2*d* is the software program described in Paragraph [0482]. Door Controlling Software 20665*c*2*e* is the software program described in Paragraph [0483]. Radio Controlling Software 20665*c*2*f* is the software program described in Paragraph [0484]. TV Controlling Software 20665*c*2*g* is the software program described in Paragraph [0485]. Radio Channel Selecting Software 20665*c*2*h* is the software program described in Paragraph [0486]. TV Channel Selecting Software 20665*c*2*i* is the software program described in Paragraph [0487]. Blinker Controlling Software 20665*c*2*j* is the software program described in Paragraph [0488]. Emergency Lamp Controlling Software 20665*c*2*k* is the software program described in Paragraph [0489]. Cruise Control Controlling Software 20665*c*2*l* is the software program described in Paragraph [0490]. Speaker Volume Controlling Software 20665*c*2*m* is the software program described in Paragraph [0491]. Controller Reinstalling Software 20665*c*2*n* is the software program described in Paragraph [0492]. Data Reinstalling Software 20665*c*2*o* is the software program described in Paragraph [0493]. User Access Authenticating Software 20665*c*2*p* is the software program described in Paragraph [0478]. The controllers stored in Automobile Controller Storage Area 83565*c*1 primarily functions as directly controlling Automobile 835 in the manner described in Paragraph [0463], and the software programs stored in Remote Controlling Software Storage Area 83565*c*2 (Paragraph [0477]) controls the controllers stored in Automobile Controller Storage Area 83565*c*1 (Paragraph [0463]), by cooperating with the software programs stored in Remote Controlling Software Storage Area 83565*c*2 (Paragraph [0464]) of Automobile 835, in a wireless fashion via Antenna 218 (FIG. 1).

Paragraph [0478]—This Paragraph [0478] illustrates User Access Authenticating Software 83565*c*2*p* (Paragraph [0464]) of Automobile 835 (Paragraph [0452]) and User Access Authenticating Software 20665*c*2*p* (Paragraph [0477]) of Communication Device 200, which determine whether Communication Device 200 in question is authorized to remotely control Automobile 835 by implementing the present function. In the present embodiment, the user of Communication Device 200 inputs the user ID and the password data by utilizing Input Device 210 (FIG. 1) or via voice recognition system. The user ID and the password data are temporarily stored in User Access Data Storage Area 20665*b*1 (Paragraph [0469]) from which the two data are sent to Automobile 835 (S1). Assume that the user input 'User#1' as the user ID and 'Password Data#1' as the password data. Upon receiving the user ID and the password data (in the present example, User#1 and Password Data#1) from Communication Device 200, Automobile 835 stores the two data in Work Area 83565*b*7 (Paragraph [0455]) (S2). Automobile 835 then initiates the authentication process to determine whether Communication Device 200 in question is authorized to remotely control Automobile 835 by referring to the data stored in User Access Data Storage Area 83565*b*1 (Paragraph [0456]) (S3). Assume that the authenticity of Communication Device 200 in question is cleared. Automobile 835 permits Communication Device 200 in question to remotely control Automobile 835 in the manner described hereinafter (S4).

Paragraph [0479]—This Paragraph [0479] illustrates Engine Controlling Software 83565*c*2*a* (Paragraph [0464]) of Automobile 835 (Paragraph [0452]) and Engine Controlling Software 20665*c*2*a* (Paragraph [0477]) of Communication Device 200, which ignite or turn off the engine (not shown) of Automobile 835. In the present embodiment, the user of Communication Device 200 inputs an engine controlling signal by utilizing Input Device 210 (FIG. 1) or via voice recognition system. The signal is sent to Automobile 835 (S1). Here, the engine controlling signal indicates either to ignite the engine or turn off the engine. Upon receiving the engine controlling signal from Communication Device 200, Automobile 835 stores the signal in Work Area 83565*b*7 (Paragraph [0455]) (S2). Automobile 835 controls the engine (not shown) via Engine Controller 83565*c*1*a* (Paragraph [0463]) in accordance with the engine controlling signal (S3).

Paragraph [0480]—This Paragraph [0480] illustrates Direction Controlling Software 83565*c*2*b* (Paragraph [0464]) of Automobile 835 (Paragraph [0452]) and Direction Controlling Software 20665*c*2*b* (Paragraph [0477]) of Communication Device 200, which control the direction of Automobile 835. In the present embodiment, the user of Communication Device 200 inputs a direction controlling signal by utilizing Input Device 210 (FIG. 1) or via voice recognition system. The signal is sent to Automobile 835 (S1). Here, the direction controlling signal indicates either to move forward, back, left, or right Automobile 835. Upon receiving the direction controlling signal from Communication Device 200, Automobile 835 stores the signal in Work Area 83565*b*7 (Paragraph [0455]) (S2). Automobile 835 controls the direction via Direction Controller 83565*c*1*b* (Paragraph [0463]) in accordance with the direction controlling signal (S3).

Paragraph [0481]—This Paragraph [0481] illustrates Speed Controlling Software 83565*c*2*c* (Paragraph [0464]) of Automobile 835 (Paragraph [0452]) and Speed Controlling Software 20665*c*2*c* (Paragraph [0477]) of Communication Device 200, which control the speed of Automobile 835. In the present embodiment, the user of Communication Device 200 inputs a speed controlling signal by utilizing Input Device 210 (FIG. 1) or via voice recognition system. The signal is sent to Automobile 835 (51). Here, the speed controlling signal indicates either to increase speed or decrease speed of Automobile 835. Upon receiving the speed controlling signal from Communication Device 200, Automobile 835 stores the signal in Work Area 83565*b*7 (Paragraph [0455]) (S2). Automobile 835 controls the speed via Speed Controller 83565*c*1*c* (Paragraph [0463]) In accordance the with speed controlling signal (S3).

Paragraph [0482]—This Paragraph [0482] illustrates Window Controlling Software 83565*c*2*d* (Paragraph [0464]) of Automobile 835 (Paragraph [0452]) and Window Controlling Software 20665*c*2*d* (Paragraph [0477]) of Communication Device 200, which control the window (not shown) of Automobile 835. In the present embodiment, CPU 211 (FIG. 1) of Communication Device 200 retrieves all window data from Window Data Storage Area 20665*b*2 (Paragraph [0470]) and displays the data on LCD 201 (FIG. 1) (S1). The user of Communication Device 200 selects one of the window data (for example, Window Data#1), and CPU 211 identifies the corresponding window ID (for example, Window#1) by referring to Window Data Storage Area 20665*b*2 (Paragraph

[0470]) (S2). The user further inputs a window controlling signal by utilizing Input Device 210 (FIG. 1) or via voice recognition system (S3). Here, the window controlling signal indicates either to open the window or to close the window. CPU 211 sends the window ID and the window controlling signal to Automobile 835 (S4). Upon receiving the window ID and the window controlling signal from Communication Device 200, Automobile 835 stores both data in Work Area 83565b7 (Paragraph [0455]) (S5). Automobile 835 controls the window identified by the window ID via Window Controller 83565c1d (Paragraph [0463]) in accordance with the window controlling signal (S6).

Paragraph [0483]—This Paragraph [0483] illustrates Door Controlling Software 83565c2e (Paragraph [0464]) of Automobile 835 (Paragraph [0452]) and Door Controlling Software 20665c2e (Paragraph [0477]) of Communication Device 200, which control the door (not shown) of Automobile 835. In the present embodiment, CPU 211 (FIG. 1) of Communication Device 200 retrieves all door data from Door Data Storage Area 20665b3 (Paragraph [0471]) and displays the data on LCD 201 (FIG. 1) (S1). The user of Communication Device 200 selects one of the door data (for example, Door Data#1), and CPU 211 identifies the corresponding door ID (for example, Door#1) by referring to Door Data Storage Area 20665b3 (Paragraph [0471]) (S2). The user further inputs a door controlling signal by utilizing Input Device 210 (FIG. 1) or via voice recognition system. Here, the door controlling signal indicates either to open the door or to close the door (S3). CPU 211 sends the door ID and the door controlling signal to Automobile 835 (S4). Upon receiving the door ID and the door controlling signal from Communication Device 200, Automobile 835 stores both data in Work Area 83565b7 (Paragraph [0455]) (S5). Automobile 835 controls the door identified by the door ID via Door Controller 83565c1e (Paragraph [0463]) in accordance with the door controlling signal (S6).

Paragraph [0484]—This Paragraph [0484] illustrates Radio Controlling Software 83565c2f (Paragraph [0464]) of Automobile 835 (Paragraph [0452]) and Radio Controlling Software 20665c2f (Paragraph [0477]) of Communication Device 200, which turn on or turn off the radio (not shown) installed in Automobile 835. In the present embodiment, the user of Communication Device 200 inputs a radio controlling signal, and CPU 211 sends the signal to Automobile 835 (S1). Here, the radio controlling signal indicates either to turn on the radio or to turn off the radio. Upon receiving the radio controlling signal from Communication Device 200, Automobile 835 stores the signal in Work Area 83565b7 (Paragraph [0455]) (S2). Automobile 835 controls the radio via Radio Controller 83565c1f (Paragraph [0463]) in accordance with the radio controlling signal (S3).

Paragraph [0485]—This Paragraph [0485] illustrates TV Controlling Software 83565c2g (Paragraph [0464]) of Automobile 835 (Paragraph [0452]) and TV Controlling Software 20665c2g (Paragraph [0477]) of Communication Device 200, which turn on or turn off the TV (not shown) installed in Automobile 835. In the present embodiment, the user of Communication Device 200 inputs a TV controlling signal, and CPU 211 (FIG. 1) sends the signal to Automobile 835 (S1). Here, the TV controlling signal indicates either to turn on the TV or to turn off the TV. Upon receiving the TV controlling signal from Communication Device 200, Automobile 835 stores the signal in Work Area 83565b7 (Paragraph [0455]) (S2). Automobile 835 controls the TV via TV Controller 83565c1g (Paragraph [0463]) in accordance with the TV controlling signal (S3).

Paragraph [0486]—This Paragraph [0486] illustrates Radio Channel Selecting Software 83565c2h (Paragraph [0464]) of Automobile 835 (Paragraph [0452]) and Radio Channel Selecting Software 20665c2h (Paragraph [0477]) of Communication Device 200, which select the channel of the radio (not shown) installed in Automobile 835. In the present embodiment, CPU 211 (FIG. 1) of Communication Device 200 retrieves all radio channel data from Radio Channel Data Storage Area 20665b4 (Paragraph [0472]) and Displays the data on LCD 201 (FIG. 1) (S1). The user of Communication Device 200 selects one of the radio channel data (for example, Radio Channel Data#1), and CPU 211 identifies the corresponding radio channel ID (for example, Radio Channel#1) by referring to Radio Channel Data Storage Area 20665b4 (Paragraph [0472]) (S2). CPU 211 sends the radio channel ID and the radio channel controlling signal to Automobile 835 (S3). Here, the radio channel controlling signal indicates to change the radio channel to the one identified by the radio channel ID. Upon receiving the radio channel ID and the radio channel controlling signal from Communication Device 200, Automobile 835 stores both data in Work Area 83565b7 (Paragraph [0455]) (S4). Automobile 835 controls the radio channel of the radio via Radio Channel Selector 83565c1h (Paragraph [0463]) in accordance with the Radio Channel Controlling Signal (S5).

Paragraph [0487]—This Paragraph [0487] illustrates TV Channel Selecting Software 83565c2i (Paragraph [0464]) of Automobile 835 (Paragraph [0452]) and TV Channel Selecting Software 20665c2i (Paragraph [0477]) of Communication Device 200, which select the channel of the TV (not shown) installed in Automobile 835. In the present embodiment, CPU 211 (FIG. 1) of Communication Device 200 retrieves all TV channel data from TV Channel Data Storage Area 20665b5 (Paragraph [0473]) and displays the data on LCD 201 (FIG. 1) (S1). The user of Communication Device 200 selects one of the TV channel data, and CPU 211 identifies the corresponding TV channel ID (for example, TV Channel#1) by referring to TV Channel Data Storage Area 20665b5 (Paragraph [0473]) (S2). CPU 211 sends the TV channel ID and the TV channel controlling signal to Automobile 835 (S3). Here, the TV channel controlling signal indicates to change the TV channel to the one identified by the TV channel ID. Upon receiving the TV channel ID and the TV channel controlling signal from Communication Device 200, Automobile 835 stores both data in Work Area 83565b7 (Paragraph [0455]) (S4). Automobile 835 controls the TV Channel via TV Channel Selector 83565c1i (Paragraph [0463]) in accordance with the TV channel controlling signal (S5).

Paragraph [0488]—This Paragraph [0488] illustrates Blinker Controlling Software 83565c2j (Paragraph [0464]) of Automobile 835 (Paragraph [0452]) and Blinker Controlling Software 20665c2j (Paragraph [0477]) of Communication Device 200, which turn on or turn off the blinker (not shown) of Automobile 835. In the present embodiment, CPU 211 (FIG. 1) of Communication Device 200 retrieves all blinker data from Blinker Data Storage Area 20665b6 (Paragraph [0474]) and displays the data on LCD 201 (FIG. 1) (S1). The user of Communication Device 200 selects one of the blinker data, and CPU 211 identifies the corresponding blinker ID (for example Blinker#1) by referring to Blinker Data Storage Area 20665b6 (Paragraph [0474]) (S2). CPU 211 sends the blinker ID and the blinker controlling signal to Automobile 835 (S3). Here, the blinker controlling signal indicates either to turn on or turn off the blinker identified by the blinker ID. Upon receiving the blinker ID and the blinker controlling signal from Communication Device 200, Automobile 835 stores both data in Work Area 83565*b*7 (Paragraph [0455]) (S4). Automobile 835 controls the blinker via Blinker Controller 20665*c*1*j* in accordance with the blinker controlling signal (S5).

Paragraph [0489]—This Paragraph [0489] illustrates Emergency Lamp Controlling Software 83565*c*2*k* (Paragraph [0464]) of Automobile 835 (Paragraph [0452]) and Emergency Lamp Controlling Software 20665*c*2*k* (Paragraph [0477]) of Communication Device 200, which turn on or turn off the emergency lamp (not shown) installed in Automobile 835. In the present embodiment, the user of Communication Device 200 inputs an emergency lamp controlling signal, and CPU 211 (FIG. 1) sends the signal to Automobile 835 (S1). Here, the emergency lamp controlling signal indicates either to turn on the emergency lamp or to turn off the emergency lamp. Upon receiving the emergency lamp controlling signal from Communication Device 200, Automobile 835 stores the signal in Work Area 83565*b*7 (Paragraph [0455]) (S2). Automobile 835 controls the emergency lamp via Emergency Lamp Controller 83565*c*1*k* (Paragraph [0463]) in accordance with the emergency lamp controlling signal (S3).

Paragraph [0490]—This Paragraph [0490] illustrates Cruise Control Controlling Software 83565*c*2*l* (Paragraph [0464]) of Automobile 835 (Paragraph [0452]) and Cruise Control Controlling Software 20665*c*2*l* (Paragraph [0477]) of Communication Device 200, which turn on or turn off the cruise control (not shown) of Automobile 835. In the present embodiment, the user of Communication Device 200 inputs a cruise control controlling signal, and CPU 211 (FIG. 1) sends the signal to Automobile 835 (S1). Here, the cruise control controlling signal indicates either to turn on the cruise control or turn off the cruise control. Upon receiving the cruise control controlling signal from Communication Device 200, Automobile 835 stores the signal in Work Area 83565*b*7 (Paragraph [0455]) (S2). Automobile 835 controls the cruise control via Cruise Control Controller 83565*c*1*l* (Paragraph [0463]) in accordance with the cruise control controlling signal (S3).

Paragraph [0491]—This Paragraph [0491] illustrates Speaker Volume Controlling Software 83565*c*2*m* (Paragraph [0464]) of Automobile 835 (Paragraph [0452]) and Speaker Volume Controlling Software 20665*c*2*m* (Paragraph [0477]) of Communication Device 200, which raise or lower the volume of the speaker (not shown) of Automobile 835. In the present embodiment, the user of Communication Device 200 inputs a speaker volume controlling signal, and CPU 211 (FIG. 1) sends the signal to Automobile 835 (S1). Here, the speaker volume controlling signal indicates either to raise the volume or lower the volume of the speaker. Upon receiving the speaker volume controlling signal from Communication Device 200, Automobile 835 stores the signal in Work Area 83565*b*7 (Paragraph [0455]) (S2). Automobile 835 controls the speaker volume of the speaker via Speaker Volume Controller 83565*c*1*m* (Paragraph [0463]) in accordance with the speaker volume controlling signal (S3).

Paragraph [0492]—This Paragraph [0492] illustrates Controller Reinstalling Software 83565*c*2*n* (Paragraph [0464]) of Automobile 835 (Paragraph [0452]) and Controller Reinstalling Software 20665*c*2*n* (Paragraph [0477]) of Communication Device 200, which reinstalls the controllers to Automobile Controller Storage Area 83565*c*1. In the present embodiment, CPU 211 (FIG. 1) of Communication Device 200 retrieves all controllers from Automobile Controller Storage Area 20665*c*1, and sends the controllers to Automobile 835 (S1). Upon receiving the controllers from Communication Device 200, Automobile 835 stores the controllers in Work Area 83565*b*7 (Paragraph [0455]) (S2). Automobile 835 then reinstalls the controllers in Automobile Controller Storage Area 83565*c*1 (S3).

Paragraph [0493]—This Paragraph [0493] illustrates Data Reinstalling Software 83565*c*2*o* (Paragraph [0464]) of Automobile 835 (Paragraph [0452]) and Data Reinstalling Software 20665*c*2*o* (Paragraph [0477]) of Communication Device 200, which reinstall the data to Automobile Controlling Data Storage Area 20665*b*. In the present embodiment, Automobile 835 retrieves all data from Automobile Controlling Data Storage Area 83565*b*, and sends the data to Communication Device 200 (S1). Upon receiving the data from Automobile 835, CPU 211 (FIG. 1) of Communication Device 200 stores the data in Work Area 20665*b*7 (S2). CPU 211 then reinstalls the data in Automobile Controlling Data Storage Area 20665*b* (S3).

Paragraph [0494]—For the avoidance of doubt, Automobile 835 (Paragraph [0452]) is not limited to an automobile or a car; the present function may be implemented with any type of carrier or vehicle, such as airplane, space ship, artificial satellite, space station, train, and motor cycle.

Paragraph [0494.01]—<<OCR Function>>

Paragraph [0494.02]—This Paragraph [0494.02] illustrates the storage area included in RAM 206 (FIG. 1). In this embodiment, RAM 206 includes OCR Information Storage Area 20666*a* of which the data and the software programs stored therein are described in Paragraph [0494.03].

Paragraph [0494.02.01]—The data and/or the software programs stored in OCR Information Storage Area 20666*a* (Paragraph [0494.02]) may be downloaded from Host H (Paragraph [0025]).

Paragraph [0494.03]—This Paragraph [0494.03] illustrates the storage areas included in OCR Information Storage Area 20666*a* (Paragraph [0494.02]). In this embodiment, OCR Information Storage Area 20666*a* includes OCR Data Storage Area 20666*b* and OCR Software Storage Area 20666*c*. OCR Data Storage Area 20666*b* stores the data necessary to implement the present function, such as the ones described in Paragraph [0494.04] through Paragraph [0494.09]. OCR Software Storage Area 20666*c* stores the software programs necessary to implement the present function, such as the ones described in Paragraph [0494.10].

Paragraph [0494.04]—This Paragraph [0494.04] illustrates the storage areas included in OCR Data Storage Area 20666*b* (Paragraph [0494.03]). In this embodiment, OCR Data Storage Area 20666*b* includes Web Address Data Storage Area 20666*b*1, Email Address Data Storage Area 20666*b*2, Phone Data Storage Area 20666*b*3, Alphanumeric Data Storage Area 20666*b*4, Image Data Storage Area 20666*b*5, and Work Area 20666*b*6. Web Address Data Storage Area 20666*b*1 stores the data described in Paragraph [0494.05]. Email Address Data Storage Area 20666*b*2 stores the data described in Paragraph [0494.06]. Phone Data Storage Area 20666*b*3 stores the data described in Paragraph [0494.07]. Alphanumeric Data Storage Area 20666*b*4 stores the data described in Paragraph [0494.08]. Image Data Storage Area 20666*b*5 stores the data described in Paragraph [0494.09]. Work Area 20666*b*6 is utilized as a work area to perform calculation and temporarily store data.

Paragraph [0494.05]—This Paragraph [0494.05] illustrates the data stored in Web Address Data Storage Area 20666*b*1 (Paragraph [0494.04]). In this embodiment, Web Address Data Storage Area 20666*b*1 comprises two columns, i.e., 'Web Address ID' and 'Web Address Data'. Column 'Web Address ID' stores the web address IDs, and each web address ID is the title of the corresponding web address data stored in column 'Web Address Data' utilized for identification purposes. Column 'Web Address Data' stores the web address data, and each web address data represents a web address composed of alphanumeric data of which the first portion thereof is 'http://'. In this embodiment, Web Address Data Storage Area 20666b1 stores the following data: the web address ID 'Web Address#1' and the corresponding web address data 'Web Address Data#1'; the web address ID 'Web Address#2' and the corresponding web address data 'Web Address Data#2'; the web address ID 'Web Address#3' and the corresponding web address data 'Web Address Data#3'; and the web address ID 'Web Address#4' and the corresponding web address data 'Web Address Data#4'.

Paragraph [0494.06]—This Paragraph [0494.06] illustrates the data stored in Email Address Data Storage Area 20666b2 (Paragraph [0494.04]). In this embodiment, Email Address Data Storage Area 20666b2 comprises two columns, i.e., 'Email Address ID' and 'Email Address Data'. Column 'Email Address ID' stores the email address IDs, and each email address ID is the title of the corresponding email address data stored in column 'Email Address Data' utilized for identification purposes. Column 'Email Address Data' stores the email address data, and each email address data represents an email address composed of alphanumeric data which includes '@' mark therein. In this embodiment, Email Address Data Storage Area 20666b2 stores the following data: the email address ID 'Email Address#1' and the corresponding email address data 'Email Address Data#1'; the email address ID 'Email Address#2' and the corresponding email address data 'Email Address Data#2'; the email address ID 'Email Address#3' and the corresponding email address data 'Email Address Data#3'; and the email address ID 'Email Address#4' and the corresponding email address data 'Email Address Data#4'.

Paragraph [0494.07]—This Paragraph [0494.07] illustrates the data stored in Phone Data Storage Area 20666b3 (Paragraph [0494.04]). In this embodiment, Phone Data Storage Area 20666b3 comprises two columns, i.e., 'Phone ID' and 'Phone Data'. Column 'Phone ID' stores the phone IDs, and each phone ID is the title of the corresponding phone data stored in column 'Phone Data' utilized for identification purposes. Column 'Phone Data' stores the phone data, and each phone data represents a phone number composed of numeric figure of which the format is 'xxx-xxx-xxxx'. In this embodiment, Phone Data Storage Area 20666b3 stores the following data: the phone ID 'Phone#1' and the corresponding phone data 'Phone Data#1'; the phone ID 'Phone#2' and the corresponding phone data 'Phone Data#2; the phone ID Phone#3' and the corresponding phone data 'Phone Data#3'; and the phone ID 'Phone#4' and the corresponding phone data 'Phone Data#4'.

Paragraph [0494.08]—This Paragraph [0494.08] illustrates the data stored in Alphanumeric Data Storage Area 20666b4 (Paragraph [0494.04]). In this embodiment, Alphanumeric Data Storage Area 20666b4 comprises two columns, i.e., 'Alphanumeric ID' and 'Alphanumeric Data'. Column 'Alphanumeric ID' stores alphanumeric IDs, and each alphanumeric ID is the title of the corresponding alphanumeric data stored in column 'Alphanumeric Data' utilized for identification purposes. Column 'Alphanumeric Data' stores the alphanumeric data, and each alphanumeric data represents alphanumeric figure primarily composed of numbers, texts, words, and letters. In this embodiment, Alphanumeric Data Storage Area 20666b4 stores the following data: the alphanumeric ID 'Alphanumeric#1' and the corresponding alphanumeric data 'Alphanumeric Data#1'; the alphanumeric ID 'Alphanumeric#2' and the corresponding alphanumeric data 'Alphanumeric Data#2'; the alphanumeric ID 'Alphanumeric#3' and the corresponding alphanumeric data 'Alphanumeric Data#3'; and the alphanumeric ID 'Alphanumeric#4' and the corresponding alphanumeric data 'Alphanumeric Data#4'.

Paragraph [0494.09]—This Paragraph [0494.09] illustrates the data stored in Image Data Storage Area 20666b5 (Paragraph [0494.04]). In this embodiment, Image Data Storage Area 20666b5 comprises two columns, i.e., 'Image ID' and 'Image Data'. Column 'Image ID' stores the image IDs, and each image ID is the title of the corresponding image data stored in column 'Image Data' utilized for identification purposes. Column 'Image Data' stores the image data, and each image data is a data composed of image such as the image input via CCD Unit 214 (FIG. 1). In this embodiment, Image Data Storage Area 20666b5 stores the following data: the Image ID 'Image#1' and the corresponding Image Data 'Image Data#1'; the Image ID 'Image#2' and the corresponding Image Data 'Image Data#2'; the Image ID 'Image#3' and the corresponding Image Data 'Image Data#3'; and the Image ID 'Image#4' and the corresponding Image Data 'Image Data#4'.

Paragraph [0494.10]—This Paragraph [0494.10] illustrates the software programs stored in OCR Software Storage Area 20666c (Paragraph [0494.03]). In this embodiment, OCR Software Storage Area 20666c stores Image Data Scanning Software 20666c1, Image Data Storing Software 20666c2, OCR Software 20666c3, Alphanumeric Data Storing Software 20666c4, Web Address Data Identifying Software 20666c5a, Web Address Data Correcting Software 20666c5b, Web Address Data Storing Software 20666c5c, Address Accessing Software 20666c5d, Email Address Data Identifying Software 20666c6a, Email Address Data Correcting Software 20666c6b, Email Address Data Storing Software 20666c6c, Email Editing Software 20666c6d, Phone Data Identifying Software 20666c7 a, Phone Data Correcting Software 20666c7b, Phone Data Storing Software 20666c7 c, and Dialing Software 20666c7 d. Image Data Scanning Software 20666c1 is the software program described in Paragraph [0494.11]. Image Data Storing Software 20666c2 is the software program described in Paragraph [0494.12]. OCR Software 20666c3 is the software program described in Paragraph [0494.13]. Alphanumeric Data Storing Software 20666c4 is the software program described in Paragraph [0494.14]. Web Address Data Identifying Software 20666c5a is the software program described in Paragraph [0494.15]. Web Address Data Correcting Software 20666c5b is the software program described in Paragraph [0494.16]. Web Address Data Storing Software 20666c5c is the software program described in Paragraph [0494.17]. Web Address Accessing Software 20666c5d is the software program described in Paragraph [0494.18]. Email Address Data Identifying Software 20666c6a is the software program described in Paragraph [0494.19]. Email Address Data Correcting Software 20666c6b is the software program described in Paragraph [0494.20]. Email Address Data Storing Software 20666c6c is the software program described in Paragraph [0494.21]. Email Editing Software 20666c6d is the software program described in Paragraph [0494.22]. Phone Data Identifying Software 20666c7 a is the software program described in Paragraph [0494.23]. Phone Data Correcting Software 20666c7b is the software program described in Paragraph [0494.24]. Phone Data Storing Software 20666c7 c is the software program described in Paragraph [0494.25]. Dialing Software 20666c7 d is the software program described in Paragraph [0494.26].

Paragraph [0494.11]—This Paragraph [0494.11] illustrates Image Data Scanning Software 20666c1 (Paragraph

[0494.10]) of Communication Device 200, which scans an image by utilizing CCD Unit (FIG. 1). In this embodiment, CPU 211 (FIG. 1) scans an image by utilizing CCD Unit (FIG. 1) (S1), and stores the extracted image data in Work Area 20666$b$6 (Paragraph [0494.04]) (S2). CPU 211 then retrieves the image data from Work Area 20666$b$6 (Paragraph [0494.04]) and displays the data on LCD 201 (FIG. 1) (S3).

Paragraph [0494.12]—This Paragraph [0494.12] illustrates Image Data Storing Software 20666$c$2 (Paragraph [0494.10]) of Communication Device 200, which stores the image data scanned by CCD Unit (FIG. 1). In this embodiment, CPU 211 (FIG. 1) retrieves the image data from Work Area 20666$b$6 (Paragraph [0494.04]) and displays the data On LCD 201 (FIG. 1) (S1). The user of Communication Device 200 inputs an image ID, i.e., a title of the image data by utilizing Input Device 210 (FIG. 1) or via voice recognition system (S2). CPU 211 then stores the image ID and the image data in Image Data Storage Area 20666$b$5 (Paragraph [0494.09]) (S3).

Paragraph [0494.13]—This Paragraph [0494.13] illustrates OCR Software 20666$c$3 (Paragraph [0494.10]) of Communication Device 200, which extracts alphanumeric data from image data by utilizing the method so-called 'optical character recognition' or 'OCR'. In this embodiment, CPU 211 (FIG. 1) retrieves the image IDs from Image Data Storage Area 20666$b$5 (Paragraph [0494.09]) and displays the data on LCD 201 (FIG. 1) (S1). The user of Communication Device 200 selects one of the image IDs by utilizing Input Device 210 (FIG. 1) or via voice recognition system (S2). CPU 211 then retrieves the image data of the image ID selected in S2 from Image Data Storage Area 20666$b$5 (Paragraph [0494.09]) and displays the image data on LCD 201 (FIG. 1) (S3). CPU 211 executes the OCR process, i.e., extracts alphanumeric data from the image data (S4), and stores the extracted alphanumeric data in Work Area 20666$b$6 (Paragraph [0494.04]) (S5).

Paragraph [0494.14]—This Paragraph [0494.14] illustrates Alphanumeric Data Storing Software 20666$c$4 (Paragraph [0494.10]) of Communication Device 200, which stores the extracted alphanumeric data in Alphanumeric Data Storage Area 20666$b$4 (Paragraph [0494.08]). In this embodiment, the user of Communication Device 200 inputs an alphanumeric ID (i.e., the title of the alphanumeric data) (S1). CPU 211 (FIG. 1) then retrieves the alphanumeric data from Work Area 20666$b$6 (Paragraph [0494.04]) (S2), and stores the data in Alphanumeric Data Storage Area 20666$b$4 (Paragraph [0494.08]) with the Alphanumeric ID (S3).

Paragraph [0494.15]—This Paragraph [0494.15] illustrates Web Address Data Identifying Software 20666$c$5$a$ (Paragraph [0494.10]) of Communication Device 200, which identifies the web address data among the Alphanumeric Data. In this embodiment, CPU 211 (FIG. 1) retrieves the alphanumeric IDs from Alphanumeric Data Storage Area 20666$b$4 (Paragraph [0494.08]) and displays the alphanumeric IDs on LCD 201 (FIG. 1) (S1). The user of Communication Device 200 selects one of the Alphanumeric IDs by utilizing Input Device 210 (FIG. 1) or via voice recognition system (S2). CPU 211 retrieves the corresponding alphanumeric data from Alphanumeric Data Storage Area 20666$b$4 (Paragraph [0494.08]) and displays the data on LCD 201 (FIG. 1) (S3). CPU 211 stores the alphanumeric data retrieved in S3 in Work Area 20666$b$6 (Paragraph [0494.04]) for the web address data identification explained in the next step (S4). CPU 211 scans the alphanumeric data, i.e., applies the web address criteria (for example, 'http://', 'www.', '.com', '.org', '.edu') to each alphanumeric data, and identifies the web address data included therein (S5). CPU 211 emphasizes the identified web address data by changing the font color (for example, blue) and drawing underlines to the identified web address data (S6). CPU 211 displays the alphanumeric data with the identified web address data emphasized on LCD 201 (FIG. 1) thereafter (S7).

Paragraph [0494.16]—This Paragraph [0494.16] illustrates Web Address Data Correcting Software 20666$c$5$b$ (Paragraph [0494.10]) of Communication Device 200, which corrects the misidentified web address data by manually selecting the start point and the end point of the web address data. For example, if the web address data is misidentified as 'www.yahoo' and leaves out the remaining '.com', the user of Communication Device 200 may manually correct the web address data by selecting the start point and the end point of 'www.yahoo.com'. In this embodiment, CPU 211 (FIG. 1) displays the alphanumeric data with web address data emphasized (S1). The user of Communication Device 200 selects the start point of the web address data (S2) and the end point of the web address data by utilizing Input Device 210 (FIG. 1) or via voice recognition system (S3). CPU 211 then identifies the alphanumeric data located between the start point and the end point as web address data (S4), and emphasizes the web address data by changing the font color (for example, blue) and drawing underlines thereto (S5). The alphanumeric data with the web address data emphasized are displayed on LCD 201 (FIG. 1) thereafter (S6).

Paragraph [0494.17]—This Paragraph [0494.17] illustrates Web Address Data Storing Software 20666$c$5$c$ (Paragraph [0494.10]) of Communication Device 200, which stores the web address data in Web Address Data Storage Area 20666$b$1 (Paragraph [0494.05]). In this embodiment, CPU 211 (FIG. 1) displays the alphanumeric data with web address data emphasized (S1). The user of Communication Device 200 selects one of the web address data by utilizing Input Device 210 (FIG. 1) or via voice recognition system, and CPU 211 emphasizes the data (for example, change to bold font) (S2). The user then inputs the web address ID (the title of the web address data) (S3). CPU 211 stores the web address ID and the web address data in Web Address Data Storage Area 20666$b$1 (Paragraph [0494.05]) (S4).

Paragraph [0494.18]—This Paragraph [0494.18] illustrates Web Address Accessing Software 20666$c$5$d$ (Paragraph [0494.10]) of Communication Device 200, which accesses the web site represented by the web address data. In this embodiment, CPU 211 (FIG. 1) displays the alphanumeric data with web address data emphasized (S1). The user of Communication Device 200 selects one of the web address data by utilizing Input Device 210 (FIG. 1) or via voice recognition system (for example, click one of the web address data) (S2). CPU 211 then opens an interne browser (for example, the Internet Explorer) and enters the web address data selected in S2 therein (S3). CPU 211 accesses the web site thereafter (S4).

Paragraph [0494.19]—This Paragraph [0494.19] illustrates Email Address Data Identifying Software 20666$c$6$a$ (Paragraph [0494.10]) of Communication Device 200, which identifies the email address data among the alphanumeric data. In this embodiment, CPU 211 (FIG. 1) retrieves the alphanumeric IDs from Alphanumeric Data Storage Area 20666$b$4 (Paragraph [0494.08]) and displays the alphanumeric IDs on LCD 201 (FIG. 1) (S1). The user of Communication Device 200 selects one of the alphanumeric IDs by utilizing Input Device 210 (FIG. 1) or via voice recognition system (S2). CPU 211 retrieves the corresponding alphanumeric data from Alphanumeric Data Storage Area 20666$b$4 (Paragraph [0494.08]) and displays the data on LCD 201 (FIG. 1) (S3). CPU 211 stores the alphanumeric data retrieved in S3 in Work Area 20666*b*6 (Paragraph [0494.04]) for the email address data identification explained in the next step (S4). CPU 211 scans the alphanumeric data, i.e., applies the email address criteria (for example, '@') to each alphanumeric data, and identifies the email address data included therein (S5). CPU 211 emphasizes the identified email address data by changing the font color (for example, green) and drawing underlines to the identified email address data (S6). CPU 211 displays the alphanumeric data with the identified email address data emphasized on LCD 201 (FIG. 1) thereafter (S7).

Paragraph [0494.20]—This Paragraph [0494.20] illustrates Email Address Data Correcting Software 20666*c*6*b* (Paragraph [0494.10]) of Communication Device 200, which corrects the misidentified email address data by manually selecting the start point and the end point of the email address data. For example, if the email address data is misidentified as 'iwaofujisaki@yahoo' and leaves out the remaining '.com', the user of Communication Device 200 may manually correct the email address data by selecting the start point and the end point of 'iwaofujisaki@yahoo.com'. In this embodiment, CPU 211 (FIG. 1) displays the alphanumeric data with email address data emphasized (S1). The user of Communication Device 200 selects the start point of the email address data (S2) and the end point of the email address data by utilizing Input Device 210 (FIG. 1) or via voice recognition system (S3). CPU 211 then identifies the alphanumeric data located between the start point and the end point as email address data (S4), and emphasizes the email address data by changing the font color (for example, green) and drawing underlines thereto (S5). The alphanumeric data with the email address data emphasized are displayed on LCD 201 (FIG. 1) thereafter (S6).

Paragraph [0494.21]—This Paragraph [0494.21] illustrates Email Address Data Storing Software 20666*c*6*c* (Paragraph [0494.10]) of Communication Device 200, which stores the email address data to Email Address Data Storage Area 20666*b*2 (Paragraph [0494.06]). In this embodiment, CPU 211 (FIG. 1) displays the alphanumeric data with the email address data emphasized (S1). The user of Communication Device 200 selects one of the email address data, and CPU 211 emphasizes the data (for example, change to bold font) (S2). The user then inputs the email address ID (the title of the email address data) by utilizing Input Device 210 (FIG. 1) or via voice recognition system (S3). CPU 211 stores the email address ID and the email address data in Email Address Data Storage Area 20666*b*2 (Paragraph [0494.06]) (S4).

Paragraph [0494.22]—This Paragraph [0494.22] illustrates Email Editing Software 20666*c*6*d* (Paragraph [0494.10]) of Communication Device 200, which opens an email editor (for example, the Outlook Express) wherein the email address data is set as the receiver's address. In this embodiment, CPU 211 (FIG. 1) displays the alphanumeric data with the email address data emphasized (S1). The user of Communication Device 200 selects one of the email address data (for example, click one of the email address data) by utilizing Input Device 210 (FIG. 1) or via voice recognition system (S2). CPU 211 then opens an email editor (for example, the Outlook Express) (S3), and sets the email address data selected in S2 as the receiver's address (S4).

Paragraph [0494.23]—This Paragraph [0494.23] illustrates Phone Data Identifying Software 20666*c*7*a* (Paragraph [0494.10]) of Communication Device 200, which identifies the phone data among the alphanumeric data. In this embodiment, CPU 211 (FIG. 1) retrieves the alphanumeric IDs from Alphanumeric Data Storage Area 20666*b*4 (Paragraph [0494.08]) and displays the alphanumeric IDs on LCD 201 (FIG. 1) (S1). The user of Communication Device 200 selects one of the alphanumeric IDs (S2). CPU 211 retrieves the corresponding alphanumeric data from Alphanumeric Data Storage Area 20666*b*4 (Paragraph [0494.08]) and displays the data on LCD 201 (FIG. 1) (S3). CPU 211 stores the alphanumeric data retrieved in S3 in Work Area 20666*b*6 (Paragraph [0494.04]) for the phone data identification explained in the next step (S4). CPU 211 scans the alphanumeric data, i.e., applies the phone criteria (for example, numeric data with 'xxx-xxx-xxxx' format) to each alphanumeric data, and identifies the phone data included therein (S5). CPU 211 emphasizes the identified phone data by changing the font color (for example, yellow) and drawing underlines to the identified phone data (S6). CPU 211 displays the alphanumeric data with the identified phone data emphasized on LCD 201 (FIG. 1) thereafter (S7).

Paragraph [0494.24]—This Paragraph [0494.24] illustrates Phone Data Correcting Software 20666*c*7*b* (Paragraph [0494.10]) of Communication Device 200, which corrects the misidentified phone data by manually selecting the start point and the end point of the phone data. For example, if the phone data is misidentified as '916-455-' and leaves out the remaining '1293', the user of Communication Device 200 may manually correct the phone data by selecting the start point and the end point of '916-455-1293'. In this embodiment, CPU 211 (FIG. 1) displays the alphanumeric data with phone data emphasized (S1). The user of Communication Device 200 selects the start point of the phone data (S2) and the end point of the phone data by utilizing Input Device 210 (FIG. 1) or via voice recognition system (S3). CPU 211 then identifies the alphanumeric data located between the start point and the end point as phone data (S4), and emphasizes the phone data by changing the font color (for example, yellow) and drawing underlines thereto (S5). The alphanumeric data with the phone data emphasized are displayed on LCD 201 (FIG. 1) thereafter (S6).

Paragraph [0494.25]—This Paragraph [0494.25] illustrates Phone Data Storing Software 20666*c*7*c* (Paragraph [0494.10]) of Communication Device 200, which stores the phone data to Phone Data Storage Area 20666*b*3 (Paragraph [0494.07]). In this embodiment, CPU 211 (FIG. 1) displays the alphanumeric data with the phone data emphasized (S1). The user of Communication Device 200 selects one of the phone data, and CPU 211 emphasizes the data (for example, change to bold font) (S2). The user then inputs the phone ID (the title of the phone data) (S3). CPU 211 stores the phone ID and the phone data in Phone Data Storage Area 20666*b*3 (Paragraph [0494.07]) (S4).

Paragraph [0494.26]—This Paragraph [0494.26] illustrates Dialing Software 20666*c*7 d (Paragraph [0494.10]) of Communication Device 200, which opens a phone dialer and initiates a dialing process by utilizing the phone data. In this embodiment, CPU 211 (FIG. 1) displays the alphanumeric data with the phone data emphasized (S1). The user of Communication Device 200 selects one of the phone data by utilizing Input Device 210 (FIG. 1) or via voice recognition system (for example, click one of the phone data) (S2). CPU 211 then opens a phone dialer (S3), and inputs the phone data selected in S2 (S4). A dialing process is initiated thereafter.

Paragraph [0495]—<<Multiple Mode Implementing Function>>

Paragraph [0496]—Paragraph [0497] through Paragraph [0502] illustrate the multiple mode implementing function of Communication Device 200 which enables to activate and implement a plurality of modes, functions, and/or systems described in this specification simultaneously.

Paragraph [0497]—This Paragraph [0497] illustrates the software programs stored in RAM 206 (FIG. 1) to implement the multiple mode implementing function (FIG. 1). RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f Mode List Displaying Software 20690c displays on LCD 201 (FIG. 1) a list of a certain amount or all modes, functions, and/or systems explained in this specification of which the sequence is explained in Paragraph [0498]. Mode Selecting Software 20690d selects a certain amount or all modes, functions, and/or systems explained in this specification of which the sequence is explained in Paragraph [0499]. Mode Activating Software 20690e activates a certain amount or all modes, functions, and/or systems selected by the Mode Selecting Software 20690d of which the sequence is explained in Paragraph [0500]. Mode Implementation Repeater 20690f executes Multiple Mode Implementer 20690b which reactivates Mode List Displaying Software 20690c, Mode Selecting Software 20690d, Mode Activating Software 20690e of which the sequence is explained in Paragraph [0501].

Paragraph [0498]—This Paragraph [0498] illustrates the sequence of Mode List Displaying Software 20690c (Paragraph [0497]). CPU 211 (FIG. 1), under the command of Mode List Displaying Software 20690c, displays a list of a certain amount or all modes, functions, and/or systems described in this specification on LCD 201 (FIG. 1).

Paragraph [0499]—This Paragraph [0499] illustrates the sequence of Mode Selecting Software 20690d (Paragraph [0497]). The user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

Paragraph [0500]—This Paragraph [0500] illustrates the sequence of Mode Activating Software 20690e (Paragraph [0497]). CPU 211 (FIG. 1), under the command of Mode Activating Software 20690e, activates the mode, function, or, system selected in S2 of Paragraph [0499]. CPU 211 thereafter implements the activated mode, function, or system as described in the relevant section of this specification.

Paragraph [0501]—This Paragraph [0501] illustrates the sequence of Mode Implementation Repeater 20690f (Paragraph [0497]). The user of Communication Device 200 inputs an input signal by utilizing Input Device 210 (FIG. 1) or via voice recognition system (S1). Once the activation of the selected mode, function, or system described in Paragraph [0500] hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b (Paragraph [0497]), which reactivates Mode List Displaying Software 20690c (Paragraph [0497]), Mode Selecting Software 20690d (Paragraph [0497]), and Mode Activating Software 20690e (Paragraph [0497]) to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

Paragraph [0502]—As another embodiment, Multiple Mode Implementer 20690b, Mode List Displaying Software 20690c, Mode Selecting Software 20690d, Mode Activating Software 20690e, and Mode Implementation Repeater 20690f described in Paragraph [0497] may be integrated into one software program, Multiple Mode Implementer 20690b. CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant section of this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

Paragraph [0503]—INCORPORATION BY REFERENCE

Paragraph [0504]—The following paragraphs and drawings described in U.S. Ser. No. 10/710,600, filed 2004-07-23, are incorporated to this application by reference: the preamble described in paragraph [1806] (no drawings); Communication Device 200 (Voice Communication Mode) described in paragraphs [1807] through [1812] (FIGS. 1 through 2*c*); Voice Recognition System described in paragraphs [1813] through [1845] (FIGS. 3 through 19); Positioning System described in paragraphs [1846] through [1877] (FIGS. 20*a* through 32*e*); Auto Backup System described in paragraphs [1878] through [1887] (FIGS. 33 through 37); Signal Amplifier described in paragraphs [1888] through [1893] (FIG. 38); Audio/Video Data Capturing System described in paragraphs [1894] through [1906] (FIGS. 39 through 44*b*); Digital Mirror Function (1) described in paragraphs [1907] through [1915] (FIGS. 44*c* through 44*e*); Caller ID System described in paragraphs [1916] through [1923] (FIGS. 45 through 47); Stock Purchasing Function described in paragraphs [1924] through [1933] (FIGS. 48 through 52); Timer Email Function described in paragraphs [1934] through [1940] (FIGS. 53*a* and 53*b*); Call Blocking Function described in paragraphs [1941] through [1954] (FIGS. 54 through 59); Online Payment Function described in paragraphs [1955] through [1964] (FIGS. 60 through 64); Navigation System described in paragraphs [1965] through [1987] (FIGS. 65 through 74*a*); Remote Controlling System described in paragraphs [1988] through [2006] (FIGS. 75 through 85); Auto Emergency Calling System described in paragraphs [2007] through [2015] (FIGS. 86 and 87); Cellular TV Function described in paragraphs [2016] through [2100] (FIGS. 88 through 135); 3D Video Game Function described in paragraphs [2101] through [2113] (FIGS. 136 through 144); Digital Mirror Function (2) described in paragraphs [2114] through [2123] (FIGS. 145 through 155); Voice Recognition Sys—E-mail (2) described in paragraphs [2124] through [2132] (FIGS. 156 through 160); Positioning System—GPS Search Engine described in paragraphs [2133] through [2175] (FIGS. 161 through 182); Mobile Ignition Key Function described in paragraphs through [2198] (FIGS. 183 through 201); Voice Print Authentication System described in paragraphs [2199] through [2209] (FIGS. 202 through 211); Fingerprint Authentication System described in paragraphs [2210] through [2222] (FIGS. 212 through 221); Auto Time Adjust Function described in paragraphs [2223] through [2227] (FIGS. 222 through 224); Video/Photo Mode described in paragraphs [2228] through [2256] (FIGS. 225 through 242); Call Taxi Function described in paragraphs [2257] through [2297] (FIGS. 243 through 269); Shooting Video Game Function described in paragraphs [2298] through [2314] (FIGS. 270 through 283); Driving Video Game Function described in paragraphs [2315] through [2328] (FIGS. 284 through 294); Address Book Updating Function described in paragraphs [2329] through [2349] (FIGS. 295 through 312); Batch Address Book Updating Function—With Host described in paragraphs through [2371] (FIGS. 313 through 329); Batch Address Book Updating Function—Peer-To-Peer Connection described in paragraphs [2372] through [2376] (FIGS. 329*a* through 329*c*); Batch Scheduler Updating Function—With Host described in paragraphs [2377] through (FIGS. 330 through 350); Batch Scheduler Updating Function—Peer-To-Peer Connection described in paragraphs [2401] through [2405] (FIGS. 351 and 352); Calculator Function described in paragraphs [2406] through [2411] (FIGS. 353 through 356); Spreadsheet Function described in paragraphs [2412] through [2419] (FIGS. 357 through 360); Word Processing Function described in paragraphs [2420] through [2435] (FIGS. 361 through 373); TV Remote Controller Function described in paragraphs [2436] through [2458] (FIGS. 374 through 394); CD/PC Inter-communicating Function described in paragraphs [2459] through [2483] (FIGS. 413 through 427); PDWR Sound Selecting Function described in paragraphs [2484] through [2520] (FIGS. 428 through 456); Start Up Software Function described in paragraphs [2521] through (FIGS. 457 through 466); Another Embodiment Of Communication Device 200 described in paragraphs [2538] through [2542] (FIGS. 467*a* through 467*d*); Stereo Audio Data Output Function described in paragraphs [2543] through [2562] (FIGS. 468 through 479); Stereo Visual Data Output Function described in paragraphs [2563] through [2582] (FIGS. 480 through 491); Multiple Signal Processing Function described in paragraphs [2583] through [2655] (FIGS. 492 through 529); Positioning System—Pin-pointing Function described in paragraphs [2656] through [2689] (FIGS. 530 through 553); Artificial Satellite Host described in paragraphs [2690] through [2708] (FIGS. 554 through 567); CCD Bar Code Reader Function described in paragraphs [2709] through [2730] (FIGS. 568 through 579); Online Renting Function described in paragraphs [2731] through [2808] (FIGS. 580 through 633); SOS Calling Function described in paragraphs [2809] through [2829] (FIGS. 634 through 645); Input Device described in paragraphs through [2835] (FIGS. 646 through 650); PC Remote Controlling Function described in paragraphs [2836] through [2871] (FIGS. 651 through 670); PC Remote Downloading Function described in paragraphs [2872] through [2921] (FIGS. 671 through 701); Audiovisual Playback Function described in paragraphs [2922] through [2947] (FIGS. 702 through 716); Audio Playback Function described in paragraphs [2948] through [2972] (FIGS. 717 through 731); Ticket Purchasing Function described in paragraphs [2973] through [3002] (FIGS. 732 through 753); Remote Data Erasing Function described in paragraphs [3003] through [3032] (FIGS. 754 through 774); Business Card Function described in paragraphs [3033] through [3049] (FIGS. 775 through 783); Game Vibrating Function described in paragraphs [3050] through [3060] (FIGS. 784 through 786); Part-time Job Finding Function described in paragraphs [3061] through [3081] (FIGS. 787 through 801); Parking Lot Finding Function described in paragraphs [3082] through [3121] (FIGS. 802 through 832); Parts Upgradable Communication Device described in paragraphs [3122] through [3147] (FIGS. 833*a* through 833*x*); On Demand TV Function described in paragraphs [3148] through [3178] (FIGS. 834 through 855); Inter-communicating TV Function described in paragraphs [3179] through [3213] (FIGS. 856 through 882); Display Controlling Function described in paragraphs [3214] through [3231] (FIGS. 883 through 894); Multiple Party Communicating Function described in paragraphs [3232] through [3265] (FIGS. 894*a* through 917); Display Brightness Controlling Function described in paragraphs [3266] through [3275] (FIGS. 918 through 923); Multiple Party Pin-pointing Function described in paragraphs [3276] through [3323] (FIGS. 924 through 9500; Digital Camera Function described in paragraphs [3324] through [3351] (FIGS. 951 through 968); Phone Number Linking Function described in paragraphs [3352] through [3375] (FIGS. 968*a* through 983); Multiple Window Displaying Function described in paragraphs [3376] through [3394] (FIGS. 984 through 995); Mouse Pointer Displaying Function described in paragraphs [3395] through [3432] (FIGS. 996 through 1021); House Item Pin-pointing Function described in paragraphs [3433] through [3592] (FIGS. 1022 through 1152); Membership Administrating Function described in paragraphs [3593] through [3635] (FIGS. 1153 through 1188); Keyword Search Timer Recording Function described in paragraphs [3636] through [3727] (FIGS. 1189 through 1254); Weather Forecast Displaying Function described in paragraphs [3728] through [3769] (FIGS. 1255 through 1288); Multiple Language Displaying Function described in paragraphs [3770] through [3827] (FIGS. 1289 through 1331); Caller's Information Displaying Function described in paragraphs [3828] through (FIGS. 1332 through 1375); Communication Device Remote Controlling Function (By Phone) described in paragraphs [3881] through [3921] (FIGS. 1394 through 1415); Communication Device Remote Controlling Function (By Web) described in paragraphs [3922] through [3962] (FIGS. 1416 through 1437); Shortcut Icon Displaying Function described in paragraphs [3963] through [3990] (FIGS. 1438 through 1455); Task Tray Icon Displaying Function described in paragraphs [3991] through [4013] (FIGS. 1456 through 1470); Multiple Channel Processing Function described in paragraphs [4014] through [4061] (FIGS. 1471 through 1498); Solar Battery Charging Function described in paragraphs [4062] through [4075] (FIGS. 1499 through 1509); OS Updating Function described in paragraphs [4076] through [4143] (FIGS. 1510 through 1575); Device Managing Function described in paragraphs [4144] through [4161] (FIGS. 1576 through 1587); Automobile Controlling Function described in paragraphs [4162] through [4210] (FIGS. 1588 through 1627); OCR Function described in paragraphs [4211] through [4246] (FIGS. 1628 through 1652); Multiple Mode Implementing Function described in paragraphs [4248] through [4255] (FIGS. 395 through 400); Multiple Software Download Function described in paragraphs [4256] through [4265] (FIGS. 401 through 407); Selected Software Distributing Function described in paragraphs [4266] through [4285] (FIGS. 1376 through 1393*d*); Multiple Software Download And Mode Implementation Function described in paragraphs [4286] through [4293] (FIGS. 408 through 412); and the last sentence described in paragraph [4295] (no drawings).

The invention claimed is:

1. A communication device comprising:
a microphone;
a speaker;
an input device;
a display;
a camera;
an antenna;
a voice communicating means to implement voice communication by utilizing said microphone and said speaker;
an automobile controlling means, by which said communication device remotely controls, in response to an automobile controlling command input via said input device, an automobile;
a caller ID means which retrieves a predetermined color data and/or sound data which is specific to the caller of the incoming call received by said communication device, and outputs the color and/or sound corresponding to said predetermined color data and/or sound data from said communication device;
a call blocking means which blocks the incoming call if the identification thereof is included in a call blocking list;
an auto time adjusting means which automatically adjusts the clock of said communication device in accordance with a wireless signal received by said antenna;
a calculating means which implements mathematical calculation by utilizing digits input via said input device;
a word processing means which includes a bold formatting means, an italic formatting means, and/or a font formatting means, wherein said bold formatting means changes alphanumeric data to bold, said italic formatting means changes alphanumeric data to italic, and said font formatting means changes alphanumeric data to a selected font;
a startup software means, wherein a startup software identification data storage area stores a startup software identification data which is an identification of a certain software program selected by the user, when the power of said communication device is turned on, said startup software means retrieves said startup software identification data from said startup software identification data storage area and activates said certain software program;
a stereo audio data output means which enables said communication device to output audio data in a stereo fashion;
a digital camera means, wherein a photo quality identifying command is input via said input device, when a photo taking command is input via said input device, a photo data retrieved via said camera is stored in a photo data storage area with the quality indicated by said photo quality identifying command;
a multiple language displaying means, wherein a specific language is selected from a plurality of languages, where said specific language is utilized to operate said communication device;
a caller's information displaying means which displays a personal information regarding caller on said display when said communication device receives a phone call;
a communication device remote controlling means which enables said communication device to be remotely controlled by a computer via a network;
a shortcut icon displaying means, wherein a shortcut icon is displayed on said display, and a software program indicated by said shortcut icon is activated when said shortcut icon is selected;
a voice recognition means which retrieves alphanumeric information from the user's voice input via said microphone; and
a voice tag means, wherein when a voice tag is detected in the voice data retrieved via said microphone, a phone number corresponding to said voice tag is identified.

2. A communication device comprising:
a microphone;
a speaker;
an input device;
a display;
a camera;
an antenna;
a voice communicating means to implement voice communication by utilizing said microphone and said speaker;
an OCR means, wherein an image data is input via said camera and alphanumeric data is extracted from said image data;
a caller ID means which retrieves a predetermined color data and/or sound data which is specific to the caller of the incoming call received by said communication device, and outputs the color and/or sound corresponding to said predetermined color data and/or sound data from said communication device;
a call blocking means which blocks the incoming call if the identification thereof is included in a call blocking list;
an auto time adjusting means which automatically adjusts the clock of said communication device in accordance with a wireless signal received by said antenna;

a calculating means which implements mathematical calculation by utilizing digits input via said input device;

a word processing means which includes a bold formatting means, an italic formatting means, and/or a font formatting means, wherein said bold formatting means changes alphanumeric data to bold, said italic formatting means changes alphanumeric data to italic, and said font formatting means changes alphanumeric data to a selected font;

a startup software means, wherein a startup software identification data storage area stores a startup software identification data which is an identification of a certain software program selected by the user, when the power of said communication device is turned on, said startup software means retrieves said startup software identification data from said startup software identification data storage area and activates said certain software program;

a stereo audio data output means which enables said communication device to output audio data in a stereo fashion;

a digital camera means, wherein a photo quality identifying command is input via said input device, when a photo taking command is input via said input device, a photo data retrieved via said camera is stored in a photo data storage area with the quality indicated by said photo quality identifying command;

a multiple language displaying means, wherein a specific language is selected from a plurality of languages, where said specific language is utilized to operate said communication device;

a caller's information displaying means which displays a personal information regarding caller on said display when said communication device receives a phone call;

a communication device remote controlling means which enables said communication device to be remotely controlled by a computer via a network;

a shortcut icon displaying means, wherein a shortcut icon is displayed on said display, and a software program indicated by said shortcut icon is activated when said shortcut icon is selected;

a voice recognition means which retrieves alphanumeric information from the user's voice input via said microphone; and a voice tag means, wherein when a voice tag is detected in the voice data retrieved via said microphone, a phone number corresponding to said voice tag is identified.

3. A communication device comprising:

a microphone;

a speaker;

an input device;

a display;

a camera;

an antenna;

a voice communicating means to implement voice communication by utilizing said microphone and said speaker;

an automobile controlling means, by which said communication device remotely controls, in response to an automobile controlling command input via said input device, an automobile;

an OCR means, where an image data is input via said camera and alphanumeric data is extracted from said image data;

a caller ID means which retrieves a predetermined color data and/or sound data which is specific to the caller of the incoming call received by said communication device, and outputs the color and/or sound corresponding to said predetermined color data and/or sound data from said communication device;

a call blocking means which blocks the incoming call if the identification thereof is included in a call blocking list;

an auto time adjusting means which automatically adjusts the clock of said communication device in accordance with a wireless signal received by said antenna;

a calculating means which implements mathematical calculation by utilizing digits input via said input device;

a word processing means which includes a bold formatting means, an italic formatting means, and/or a font formatting means, wherein said bold formatting means changes alphanumeric data to bold, said italic formatting means changes alphanumeric data to italic, and said font formatting means changes alphanumeric data to a selected font;

a startup software means, wherein a startup software identification data storage area stores a startup software identification data which is an identification of a certain software program selected by the user, when the power of said communication device is turned on, said startup software means retrieves said startup software identification data from said startup software identification data storage area and activates said certain software program;

a stereo audio data output means which enables said communication device to output audio data in a stereo fashion;

a digital camera means, wherein a photo quality identifying command is input via said input device, when a photo taking command is input via said input device, a photo data retrieved via said camera is stored in a photo data storage area with the quality indicated by said photo quality identifying command;

a multiple language displaying means, wherein a specific language is selected from a plurality of languages, where said specific language is utilized to operate said communication device;

a caller's information displaying means which displays a personal information regarding caller on said display when said communication device receives a phone call;

a communication device remote controlling means which enables said communication device to be remotely controlled by a computer via a network;

a shortcut icon displaying means, wherein a shortcut icon is displayed on said display, and a software program indicated by said shortcut icon is activated when said shortcut icon is selected;

a voice recognition means which retrieves alphanumeric information from the user's voice input via said microphone; and a voice tag means, wherein when a voice tag is detected in the voice data retrieved via said microphone, a phone number corresponding to said voice tag is identified.

\* \* \* \* \*